(12) United States Patent
Rowe et al.

(10) Patent No.: US 7,274,976 B2
(45) Date of Patent: *Sep. 25, 2007

(54) TURRET POSITIONING SYSTEM AND METHOD FOR A VEHICLE

(75) Inventors: Ryan F. Rowe, Oshkosh, WI (US);
Duane R. Pillar, Oshkosh, WI (US);
Neil Bjornstad, Oshkosh, WI (US);
William M. Woolman, Oshkosh, WI (US); Bradley C. Squires, New London, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/518,870

(22) Filed: Sep. 11, 2006

(65) Prior Publication Data

US 2007/0061054 A1   Mar. 15, 2007

Related U.S. Application Data

(63) Continuation of application No. 10/668,623, filed on Sep. 23, 2003, now Pat. No. 7,107,129, which is a continuation-in-part of application No. 10/364,668, filed on Feb. 11, 2003, now Pat. No. 7,162,332.

(60) Provisional application No. 60/469,661, filed on May 12, 2003, provisional application No. 60/360,479, filed on Feb. 28, 2002.

(51) Int. Cl.
*G05D 1/00* (2006.01)

(52) U.S. Cl. .............................. 701/1; 169/24; 169/52

(58) Field of Classification Search .................... 701/1, 701/23; 169/46–47, 23–24, 61–62, 70, 51–54; 239/166, 172, 146, 547, 587, 507
See application file for complete search history.

(56) References Cited

U.S. PATENT DOCUMENTS 2,520,943 A   9/1950   Ludeman (Continued)

FOREIGN PATENT DOCUMENTS

DE   977 732   12/1968

(Continued)

OTHER PUBLICATIONS

"Dana Spicer Central Tire Inflation System Specifications," Dana Corporation, Kallamazoo, Michigan, May 2000 (2 pgs.).

(Continued)

*Primary Examiner*—Gertrude A. Jeanglaude
(74) *Attorney, Agent, or Firm*—Foley & Lardner LLP

(57) ABSTRACT

A turret is configured to be rotationally coupled to a vehicle which includes a first apparatus that is immovably coupled to the vehicle. The turret comprises a second apparatus coupled to the turret. The second apparatus is configured to be rotationally coupled to the first apparatus. The turret further comprises a turret controller which uses feedback control to control rotation of the turret relative to the vehicle. The turret further comprises a position sensor coupled to the second apparatus. The position sensor being configured to provide information related to the position of the turret to the turret controller. The turret is configured to engage the first apparatus to rotate the turret relative to the vehicle.

38 Claims, 26 Drawing Sheets

U.S. PATENT DOCUMENTS

| | | |
|---|---|---|
| 3,567,136 A | 3/1971 | Garrett |
| 3,599,722 A | 8/1971 | Davidson et al. |
| 3,669,191 A | 6/1972 | Livingston |
| 3,762,478 A | 10/1973 | Cummins |
| 3,840,074 A | 10/1974 | Clark |
| 3,989,109 A | 11/1976 | Gagliardo |
| 4,041,470 A | 8/1977 | Slane et al. |
| 4,162,714 A | 7/1979 | Correll |
| 4,167,247 A | 9/1979 | Sons et al. |
| 4,180,803 A | 12/1979 | Wesemeyer et al. |
| 4,196,380 A | 4/1980 | Gustavsson et al. |
| 4,355,385 A | 10/1982 | Hampshire et al. |
| 4,453,672 A | 6/1984 | Garnett |
| 4,497,442 A | 2/1985 | Williams |
| 4,516,121 A | 5/1985 | Moriyama et al. |
| 4,535,846 A | 8/1985 | Gagliardo et al. |
| 4,542,802 A | 9/1985 | Garvey et al. |
| 4,574,685 A * | 3/1986 | Sanborn et al. ............ 89/37.14 |
| 4,583,444 A | 4/1986 | Jackson |
| RE32,140 E | 5/1986 | Tokuda et al. |
| 4,593,359 A | 6/1986 | Sadeh |
| 4,639,609 A | 1/1987 | Floyd et al. |
| 4,646,232 A | 2/1987 | Chang et al. |
| 4,678,041 A | 7/1987 | Staudinger |
| 4,686,888 A * | 8/1987 | Sanborn et al. ............ 89/37.13 |
| 4,744,218 A | 5/1988 | Edwards et al. |
| 4,760,275 A | 7/1988 | Sato et al. |
| 4,785,513 A | 11/1988 | Lee et al. |
| 4,809,177 A | 2/1989 | Windle et al. |
| 4,809,803 A | 3/1989 | Ahern et al. |
| 4,843,557 A | 6/1989 | Ina et al. |
| 4,860,633 A | 8/1989 | Wiethoff et al. |
| 4,864,154 A | 9/1989 | Copeland et al. |
| 4,864,568 A | 9/1989 | Sato et al. |
| 4,894,781 A | 1/1990 | Sato et al. |
| 4,909,329 A | 3/1990 | Yoshida et al. |
| 4,941,546 A | 7/1990 | Nist et al. |
| 4,949,794 A * | 8/1990 | Petit et al. .................... 169/52 |
| 4,949,808 A | 8/1990 | Garnett |
| 5,025,253 A | 6/1991 | DiLullo et al. |
| 5,091,856 A | 2/1992 | Hasegawa et al. |
| 5,174,383 A | 12/1992 | Haugen et al. |
| 5,189,617 A | 2/1993 | Shiraishi |
| 5,202,830 A | 4/1993 | Tsurumiya et al. |
| 5,211,245 A | 5/1993 | Relyea et al. |
| 5,279,481 A | 1/1994 | Trotter et al. |
| 5,300,918 A | 4/1994 | Becker |
| 5,301,756 A | 4/1994 | Relyea et al. |
| 5,365,436 A | 11/1994 | Schaller et al. |
| 5,411,100 A | 5/1995 | Laskaris et al. |
| 5,416,702 A | 5/1995 | Kitagawa et al. |
| 5,420,828 A | 5/1995 | Geiger |
| 5,463,992 A | 11/1995 | Swenson et al. |
| 5,508,689 A | 4/1996 | Rado et al. |
| 5,548,276 A | 8/1996 | Thomas |
| 5,555,171 A | 9/1996 | Sonehara et al. |
| 5,557,257 A | 9/1996 | Gieffers |
| RE35,362 E | 10/1996 | Arvidson et al. |
| 5,623,169 A | 4/1997 | Sugimoto et al. |
| 5,626,194 A | 5/1997 | White |
| 5,637,933 A | 6/1997 | Rawlings et al. |
| 5,638,272 A | 6/1997 | Minowa et al. |
| 5,657,224 A | 8/1997 | Lonn et al. |
| 5,657,544 A | 8/1997 | Ota et al. |
| 5,670,845 A | 9/1997 | Grant et al. |
| 5,734,335 A | 3/1998 | Brogi et al. |
| 5,736,925 A | 4/1998 | Knauff et al. |
| 5,739,592 A | 4/1998 | Rigsby et al. |
| 5,754,021 A | 5/1998 | Kojima |
| 5,765,644 A | 6/1998 | Arvidson et al. |
| 5,781,437 A | 7/1998 | Wiemer et al. |
| 5,788,158 A | 8/1998 | Relyea |
| 5,793,648 A | 8/1998 | Nagle et al. |
| 5,794,165 A | 8/1998 | Minowa et al. |
| 5,819,188 A | 10/1998 | Vos |
| 5,827,957 A | 10/1998 | Wehinger |
| 5,836,398 A | 11/1998 | White |
| 5,839,664 A | 11/1998 | Relyea |
| 5,844,473 A | 12/1998 | Kaman |
| 5,845,221 A | 12/1998 | Hosokawa et al. |
| 5,848,365 A | 12/1998 | Coverdill |
| 5,860,479 A | 1/1999 | LaFollette |
| 5,864,781 A | 1/1999 | White |
| 5,881,818 A | 3/1999 | Lee et al. |
| 5,884,206 A | 3/1999 | Kim |
| 5,890,080 A | 3/1999 | Coverdill et al. |
| 5,896,418 A | 4/1999 | Hamano et al. |
| 5,899,276 A | 5/1999 | Relyea et al. |
| 5,919,237 A | 7/1999 | Balliet |
| 5,948,025 A | 9/1999 | Sonoda |
| 5,949,330 A | 9/1999 | Hoffman et al. |
| 5,957,985 A | 9/1999 | Wong et al. |
| 5,987,365 A | 11/1999 | Okamoto |
| 5,997,338 A | 12/1999 | Pohjola |
| 5,999,104 A | 12/1999 | Symanow et al. |
| 6,012,004 A | 1/2000 | Sugano et al. |
| 6,029,529 A | 2/2000 | Recker et al. |
| 6,033,041 A | 3/2000 | Koga et al. |
| 6,038,500 A | 3/2000 | Weiss |
| 6,066,075 A | 5/2000 | Poulton |
| 6,096,978 A | 8/2000 | Pohjola |
| 6,101,917 A * | 8/2000 | Klatte et al. ................ 89/41.01 |
| 6,135,806 A | 10/2000 | Pohjola |
| 6,141,610 A | 10/2000 | Rothert et al. |
| 6,154,122 A | 11/2000 | Menze |
| 6,157,875 A | 12/2000 | Hedman et al. |
| 6,182,807 B1 | 2/2001 | Saito et al. |
| 6,199,550 B1 | 3/2001 | Wiesmann et al. |
| 6,223,104 B1 | 4/2001 | Kamen et al. |
| 6,263,269 B1 | 7/2001 | Dannenberg |
| 6,281,790 B1 | 8/2001 | Kimmel et al. |
| 6,338,010 B1 | 1/2002 | Sparks et al. |
| 6,356,826 B1 | 3/2002 | Pohjola |
| 6,404,607 B1 | 6/2002 | Burgess et al. |
| 6,405,114 B1 | 6/2002 | Priestley et al. |
| 6,496,775 B2 | 6/2002 | McDonald, Jr. et al. |
| 6,421,593 B1 | 7/2002 | Kempen et al. |
| 6,430,488 B1 | 8/2002 | Goldman et al. |
| 6,434,512 B1 | 8/2002 | Discenzo |
| 6,454,540 B1 | 9/2002 | Terefinko et al. |
| 6,457,655 B1 | 10/2002 | Reighard et al. |
| 6,501,368 B1 | 12/2002 | Wiebe et al. |
| 6,553,290 B1 | 4/2003 | Pillar |
| 6,580,953 B1 | 6/2003 | Wiebe et al. |
| 6,611,755 B1 | 8/2003 | Coffee et al. |
| 6,655,613 B1 | 12/2003 | Brown |
| 6,755,258 B1 | 6/2004 | Hunke et al. |
| 6,757,597 B2 | 6/2004 | Yakes et al. |
| 6,860,187 B2 | 3/2005 | O'Dwyer |
| 6,882,917 B2 | 4/2005 | Pillar et al. |
| 6,885,920 B2 | 4/2005 | Yakes et al. |
| 6,917,288 B2 | 7/2005 | Kimmel et al. |
| 6,922,615 B2 | 7/2005 | Pillar et al. |
| 6,933,421 B2 | 8/2005 | Topolkaraev et al. |
| 2002/0065594 A1 | 5/2002 | Squires et al. |
| 2002/0196152 A1 | 12/2002 | Wilson et al. |
| 2003/0010185 A1 | 1/2003 | O'Dwyer |
| 2003/0066659 A1 | 4/2003 | Bissen et al. |
| 2003/0080619 A1 | 5/2003 | Bray et al. |
| 2003/0130765 A1 | 7/2003 | Pillar et al. |
| 2003/0158635 A1 | 8/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |

| | | |
|---|---|---|
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0195680 A1 | 10/2003 | Pillar |
| 2003/0200015 A1 | 10/2003 | Pillar |
| 2003/0205422 A1 | 11/2003 | Morrow et al. |
| 2004/0002794 A1 | 1/2004 | Pillar et al. |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |
| 2004/0129434 A1 | 7/2004 | Tan |
| 2004/0133319 A1 | 7/2004 | Pillar et al. |
| 2004/0133332 A1 | 7/2004 | Yakes et al. |
| 2004/0199302 A1 | 10/2004 | Pillar et al. |
| 2004/0203974 A1 | 10/2004 | Seibel |
| 2005/0004733 A1 | 1/2005 | Pillar et al. |
| 2005/0038934 A1 | 2/2005 | Gotze et al. |
| 2005/0060246 A1 | 3/2005 | Lastinger et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |

FOREIGN PATENT DOCUMENTS

| | | |
|---|---|---|
| DE | 35 09 313 A1 | 9/1985 |
| DE | 34 34 287 A1 | 3/1986 |
| DE | 36 20 603 A1 | 1/1987 |
| DE | 38 43 043 A1 | 6/1990 |
| DE | 195 16 157 A1 | 11/1996 |
| DE | 196 01 282 C1 | 6/1997 |
| DE | 197 31 633 A1 | 1/1998 |
| DE | 198 25 690 A1 | 12/1999 |
| DE | 200 15 197 U1 | 11/2000 |
| DE | 101 03 922 A1 | 8/2002 |
| EP | 0 410 060 B1 | 12/1981 |
| EP | 0 266 704 B1 | 5/1988 |
| EP | 0 504 913 A1 | 9/1992 |
| EP | 0 564 943 B1 | 10/1993 |
| EP | 0 791 506 A2 | 8/1997 |
| EP | 1 088 960 A2 | 4/2001 |
| EP | 1 229 636 A2 | 8/2002 |
| EP | 1 424 103 A2 | 6/2004 |
| EP | 1 424 103 A3 | 6/2004 |
| JP | 60-008132 A | 1/1985 |
| SE | 507 046 C2 | 3/1998 |
| WO | WO-95/15594 A1 | 6/1995 |
| WO | WO-97/02965 A1 | 1/1997 |
| WO | WO-98/30961 A1 | 7/1998 |
| WO | WO-00/69662 A1 | 11/2000 |
| WO | WO-01/43827 A1 | 6/2001 |
| WO | WO-03/059455 A2 | 7/2003 |
| WO | WO-03/059455 A3 | 7/2003 |
| WO | WO-2004/102105 A1 | 11/2004 |

OTHER PUBLICATIONS

"HEMTT—Heavy Expanded Mobility Tactical Truck M977 Series Truck," Product of Oshkosh Truck Corporation, Mar. 2000 (12 pgs. as photocopied).

"LHS Decontamination Mission Module," Product of Oshkosh Truck Corporation, see IDS for date (2 pgs. as photocopied).

"LVS—Logistic Vehicle System (MK48 Series)," Product of Oshkosh Truck Corporation, see IDS for date information (6 pgs.).

"M1070F Heavy Equipment Transporter & Trailer"; Product of Oshkosh Truck Corporation, Sep. 2001 (8 pgs. as photocopied).

"M1977 CBT (Common Bridge Transporter)," Product of Oshkosh Truck Corporation, see IDS for date information (2 pgs. as photocopied).

"Medium Tactical Vehicle Replacement," Product of Oshkosh Truck Corporation, Aug. 2000 (6 pgs. as photocopied).

"MTVR Dump Body Variant (Medium Tactical Vehicle Replacement)," Product of Oshkosh Truck Corporation, Sep. 2001 (2 pgs. as photocopied).

"MTVR Wrecker Variant (MK36 Wrecker Recovery Vehicle)," Product of Oshkosh Truck Corporpation, Sep. 2001 (2 pgs. as photocopied).

"Oshkosh Demonstrates ProPulse, the First Electric Hybrid-Drive Heavy Defense Truck," Oshkosh Truck Corp., Feb. 27, 2000 (2 pgs.).

"Oshkosh Receives Federal Government Funding to Develop ProPulse Alternative Drive System for Military Trucks," Oshkosh Truck Corp., Aug. 31, 2001 (2 pgs.).

"Oshkosh Showcases ProPulse Hybrid Electric System at Major Defense Exhibition," Oshkosh Truck Corp., Oct. 21, 2002 (1 pg.).

"Oshkosh Truck and Ohio State University Design Robotic Vehicle to Compete in Desert Race," Oshkosh Truck Corp., Feb. 11, 2004 (2 pgs.).

"Oshkosh Truck Awarded Contract for U.S. Army Future Tactical Truck Concepts and Technology Evaluations," Oshkosh Truck Corp., Dec. 2, 2003 (2 pgs.).

"Oshkosh Truck Rolls Out Next Generation of Command Zone Advanced Electronics System to Military Market," Oshkosh Truck Corp., Oct. 21, 2002 (2 pgs.).

"Oshkosh Trucks—75 Years of Specialty Truck Production," Wright et al., Motorbooks International Publishers & Wholesalers, 1992, pp. 119-126 (10 pgs.).

"Oshkosh Truck's Robotic Truck Qualifies for Pentagon's $1 Million Desert Race," Oshkosh Truck Corp., Mar. 12, 2004 (2 pgs.).

"Palletized Load System (PLS)—Concrete Mobile Mixer Module," Product of Oshkosh Truck Corporation, see IDS for date information (2 pgs.).

"Palletized Load System (PLS)—Potable Water Distributor Module," Product of Oshkosh Truck Corporation, see IDS for date information (2 pgs.).

"Snozzle Model C-50A Operational Features," Crash Rescue Equipment Service, Inc., May 6, 2003 (7 pgs.).

"Snozzle Model P-50 Operational Features," Crash Rescue Equipment Service, Inc., May 6, 2003 (9 pgs.).

"Snozzle S2000-C Series Operational Features," Crash Rescue Equipment Service, Inc., May 6, 2003 (12 pgs.).

"Snozzle S2000-CA Series (Auto-Controls and Clash Point Protection) Operational Features," Crash Rescue Equipment Service, Inc., May 6, 2003 (13 pgs.).

"The One to Count on Through Hell and High Water," Product of Oshkosh Truck Corporation, Sep. 2000 (4 pgs.).

Aircraft Internal Time Division Multiplex Data Bus, MIL-STD-1553 (USAF), Aug. 30, 1973 (29 pgs.).

Office Action from the Austrian Patent Office related to a turret envelope control system and method for a fire fighting vehicle, Stamped Aug. 4, 2004 (6 pgs. including original and English translation).

Office action from the Austrian Patent Office related to the turret targeting system and method for a fire fighting vehicle, stamped Aug. 2, 2004 (6 pgs. including original and English translation).

Price Schedule, Snozzle Model C-50, Mar. 15, 1995, 4 pages, Crash Rescue Equipment Service, Inc.

* cited by examiner

| | | | | | | | | |
|---|---|---|---|---|---|---|---|---|
| I-11 | I-12 | I-13 | I-14 | I-15 | IM-11 | O-11 | O-12 | O-13 |
| O-14 | O-15 | I-21 | I-22 | I-23 | I-24 | I-25 | IM-21 | IM-22 |
| O-21 | O-22 | O-23 | O-24 | O-25 | I-31 | I-32 | I-33 | I-34 |
| I-35 | O-31 | O-32 | O-33 | O34 | O-35 | I-41 | I-42 | I-43 |
| I-44 | I-45 | IM-41 | O41 | O-42 | O-43 | O-44 | O-45 | I-51 |
| I-52 | I-53 | I-54 | I-55 | O-51 | O-52 | O-53 | O-54 | O-55 |

FIG. 10

TURRET POSITIONING SYSTEM AND METHOD FOR A VEHICLE

CROSS REFERENCE TO RELATED APPLICATIONS

This application is a continuation of U.S. Ser. No. 10/668,623, filed Sep. 23, 2003, entitled "Turret Positioning System and Method for a Fire Fighting Vehicle," now U.S. Pat. No. 7,107,129, which (1) claims priority to U.S. Prov. No. 60/469,661 filed on May 12, 2003, entitled "Turret Positioning System and Method for a Fire Fighting Vehicle," which is expressly incorporated by reference herein, and (2) is a continuation in part of U.S. Ser. No. 10/364,668, filed on Feb. 11, 2003, entitled "Turret Deployment System and Method for a Fire Fighting Vehicle," pending, which claims priority to U.S. Prov. No. 60/360,479, filed on Feb. 28, 2002, entitled "Turret Control System and Method for a Fire Fighting Vehicle," each of which is also expressly incorporated by reference herein.

FIELD OF THE INVENTION

The present invention relates generally to the field of fire fighting vehicles. More specifically, the present invention relates to turret control systems and methods for fire fighting vehicles.

BACKGROUND

Various vehicles are known for use in fire fighting. Fire fighting vehicles, including aerial platform trucks, ladder trucks, pumpers, tankers, etc., often employ a turret for dispensing fire fighting agents (e.g. water, foams, foaming agents, etc.) onto areas such as fires, chemical spills, smoldering remains of a fire, or other similar areas. Such turrets typically comprise one or more arms which are extendable, rotatable, or otherwise moveable with electric, hydraulic, or pneumatic actuator systems. While fighting a fire, the turret may be moved around in a three-dimensional space by using the actuator system to move individual arms. Once a nozzle of the turret is brought to a particular position and orientation relative to a fire, a fire fighting agent may be dispensed from the nozzle and directed at the fire.

Typically, this positioning and aiming of turrets is controlled by a human operator. According to one approach, the operator positions and aims the turret using a joystick which is coupled to the turret actuators. Unfortunately, in situations where the fire produces a large amount of smoke, the turret and the precise location of the fire become obscured from an operator's view. This situation is exacerbated by the fact that the tremendous flow of water or other fire fighting agent through the turret creates forces which affect turret positioning, making it even more difficult for the operator to know the precise position of the turret. The result is that the operator is often susceptible to inadvertently causing the turret to collide with other objects, including for example the fire fighting vehicle upon which the turret is mounted. Additionally, because the operator's view of the turret nozzle as well as the fire may be severely limited, the operator's ability to control the position and orientation of the nozzle for maximum fire fighting effectiveness is also severely limited.

Further, existing turret systems are often cumbersome or difficult to operate. For example, turret systems typically allow the turret to be manually stored and locked into place to avoid damage during vehicle travel. However, the process of storing and locking the turret can be time consuming because the proximity of the turret to other equipment on the fire fighting vehicle requires that the turret be controlled with great care. Additionally, when the fire fighting vehicle arrives at the scene of the fire and the turret is first deployed, it is necessary for a fire fighter to manually deploy the turret from the stored position, thereby diverting the fire fighter's attention away from other important activities. Finally, the operator interface used to control the turret limits the operator's ability to control the turret from a variety of different vantage points and with the benefit of a variety of different views of the turret and the fire. A variety of other problems exist which relate to the difficulty and/or amount of operator involvement required to operate turrets.

Also, existing turret systems often use unreliable and/or complex systems to measure the rotary position of the turret. This problem is exacerbated by the generally large size of the turret and its relatively small range of rotation. Thus, it would be advantageous to provide an improved position sensor for a turret.

Accordingly, it would be desirable to provide a control system for a turret which overcomes one or more of the above-mentioned problems. Advantageously, such a control system would enhance fire fighter safety by increasing fire fighting effectiveness. The techniques below extend to those embodiments which fall within the scope of the appended claims, regardless of whether they provide any of the above-mentioned advantageous features.

BRIEF DESCRIPTION OF THE DRAWINGS

FIG. 10 is an I/O status table of FIG. 9 shown in greater detail;

DETAILED DESCRIPTION

Patent application Ser. No. 10/364,683, filed Feb. 11, 2003, discloses various embodiments of a control system architecture in connection with fire trucks and other types of equipment service vehicles. The turret control systems and methods disclosed herein may be implemented using a stand-alone control system or using one of the control system architecture embodiments described in the aforementioned application. For convenience, the content of the above-mentioned application is repeated below, followed by a description of one or more exemplary embodiments of systems and methods for positioning the turret of a fire fighting vehicle.

A. Fire Truck Control System

1. Architecture of Fire Truck Control System

Figure 1:
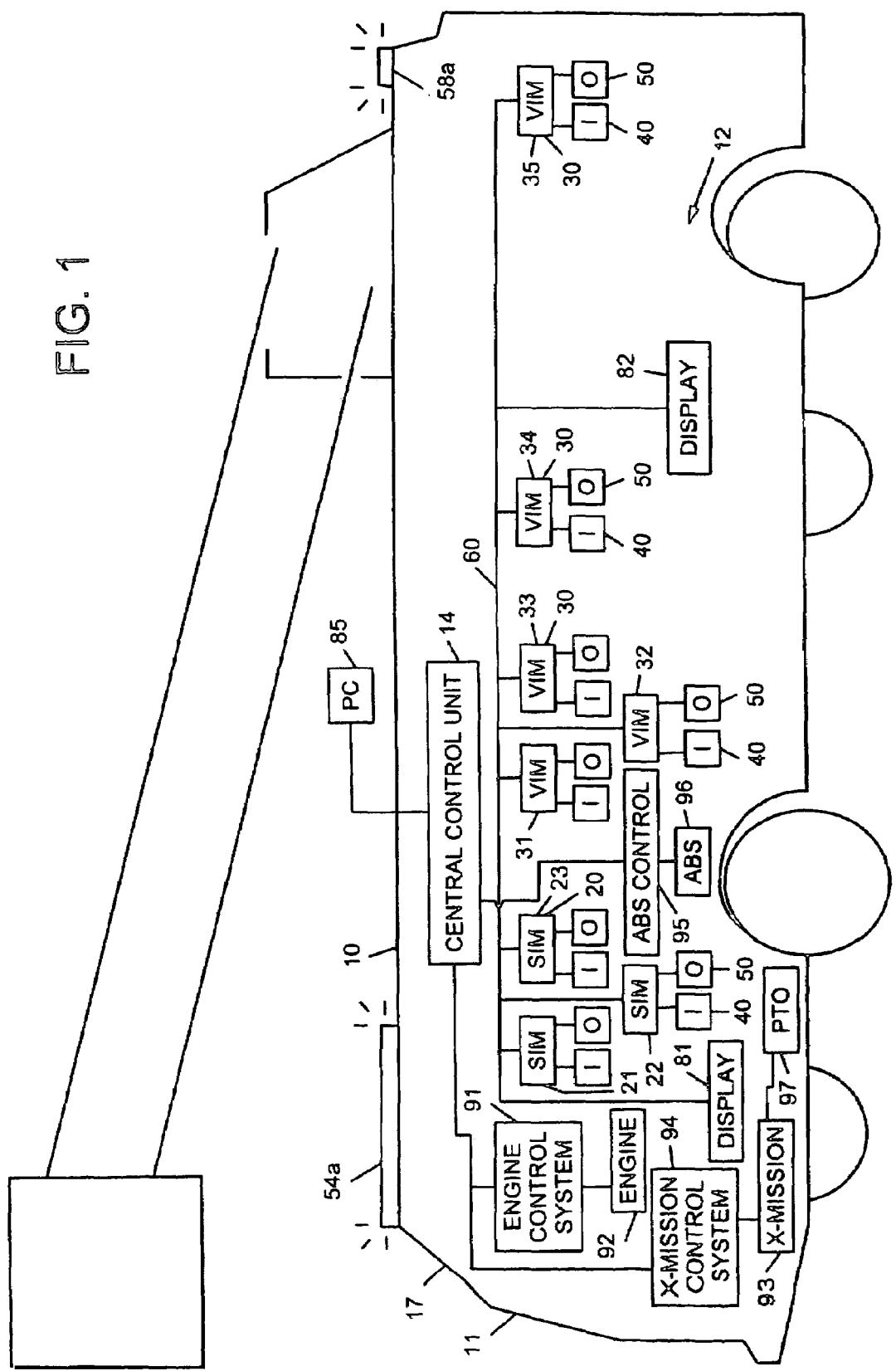
FIG. 1 is a schematic view of a fire truck having a control system according to one embodiment of the present invention.

Referring now to FIG. 1, a fire truck 10 having a control system 12 is illustrated. By way of overview, the control system 12 comprises a central control unit 14, a plurality of microprocessor-based interface modules 20 and 30, a plurality of input devices 40 and a plurality of output devices 50. The central control unit 14 and the interface modules 20 and 30 are connected to each other by a communication network 60.

More specifically, the central control unit 14 is a microprocessor-based device and includes a microprocessor 15 that executes a control program 16 (see FIG. 2) stored in memory of the central control unit 14. In general, the control unit 14 executes the program to collect and store input status information from the input devices 40, and to control the output devices 50 based on the collected status information. The control program may implement such features as an interlock system, a load manager, and a load sequencer. As described below, the central control unit 14 is preferably not connected to the I/O devices 40 and 50 directly but rather only indirectly by way of the interface modules 20 and 30, thereby enabling distributed data collection and power distribution. The I/O devices 40 and 50 are located on a chassis 11 of the fire truck 10, which includes both the body and the underbody of the fire truck 10.

In the illustrated embodiment, two different types of interface modules are used. The interface modules 20 interface mainly with switches and low power indicators, such as LEDs that are integrally fabricated with a particular switch and that are used to provide visual feedback to an operator regarding the state of the particular switch. For this reason, the interface modules 20 are sometimes referred to herein as "SIMs" ("switch interface modules"). Herein, the reference numeral "20" is used to refer to the interface modules 20 collectively, whereas the reference numerals 21, 22 and 23 are used to refer to specific ones of the interface modules 20.

The interface modules 30 interface with the remaining I/O devices 40 and 50 on the vehicle that do not interface to the interface modules 20, and therefore are sometimes referred to herein as "VIMs" ("vehicle interface modules"). The interface modules 30 are distinguishable from the interface modules 20 mainly in that the interface modules 30 are capable of handling both analog and digital inputs and outputs, and in that they are capable of providing more output power to drive devices such as gauges, valves, solenoids, vehicle lighting and so on. The analog outputs may be true analog outputs or they may be pulse width modulation outputs that are used to emulate analog outputs. Herein, the reference numeral "30" is used to refer to the interface modules 30 collectively, whereas the reference numerals 31, 32, 33, 34 and 35 are used to refer to specific ones of the interface modules 30.

Although two different types of interface modules are used in the illustrated embodiment, depending on the application, it may be desirable to use only a single type of interface module in order to reduce inventory requirements. Additionally, while in FIG. 1 three of the interface modules 20 and five of the interface modules 30 are shown, this arrangement is again simply one example. It may be desirable to provide each interface module with more I/O points in order to reduce the number of interface modules that are required, or to use more interface modules with a smaller number of I/O points in order to make the control system 12 more highly distributed. Of course, the number of interface modules will also be affected by the total number of I/O points in the control system.

FIG. 1 shows an approximate distribution of the interface modules 20 and 30 throughout the fire truck 10. In general, in order to minimize wiring, the interface modules 20 and 30 are placed so as to be located as closely as possible to the input devices 40 from which input status information is received and the output devices 50 that are controlled. As shown in FIG. 1, there is a large concentration of interface modules 20 and 30 near the front of the fire truck 10, with an additional interface module 34 at mid-length of the fire truck 10 and another interface module 35 at the rear of the fire truck 10. The large concentration of interface modules 20 and 30 at the front of the fire truck 10 is caused by the large number of switches (including those with integral LED feedback output devices) located in a cab of the fire truck 10, as well as the large number of other output devices (gauges, lighting) which tend to be located in the cab or otherwise near the front of the fire truck 10. The interface module 34 that is located in the middle of the truck is used in connection with I/O devices 40 and 50 that are located at the fire truck pump panel (i.e., the operator panel that has I/O devices for operator control of the fire truck's pump system). The interface module 35 that is located at the rear of the fire truck 10 is used in connection with lighting and other equipment at the rear of the fire truck 10.

Figure 2:
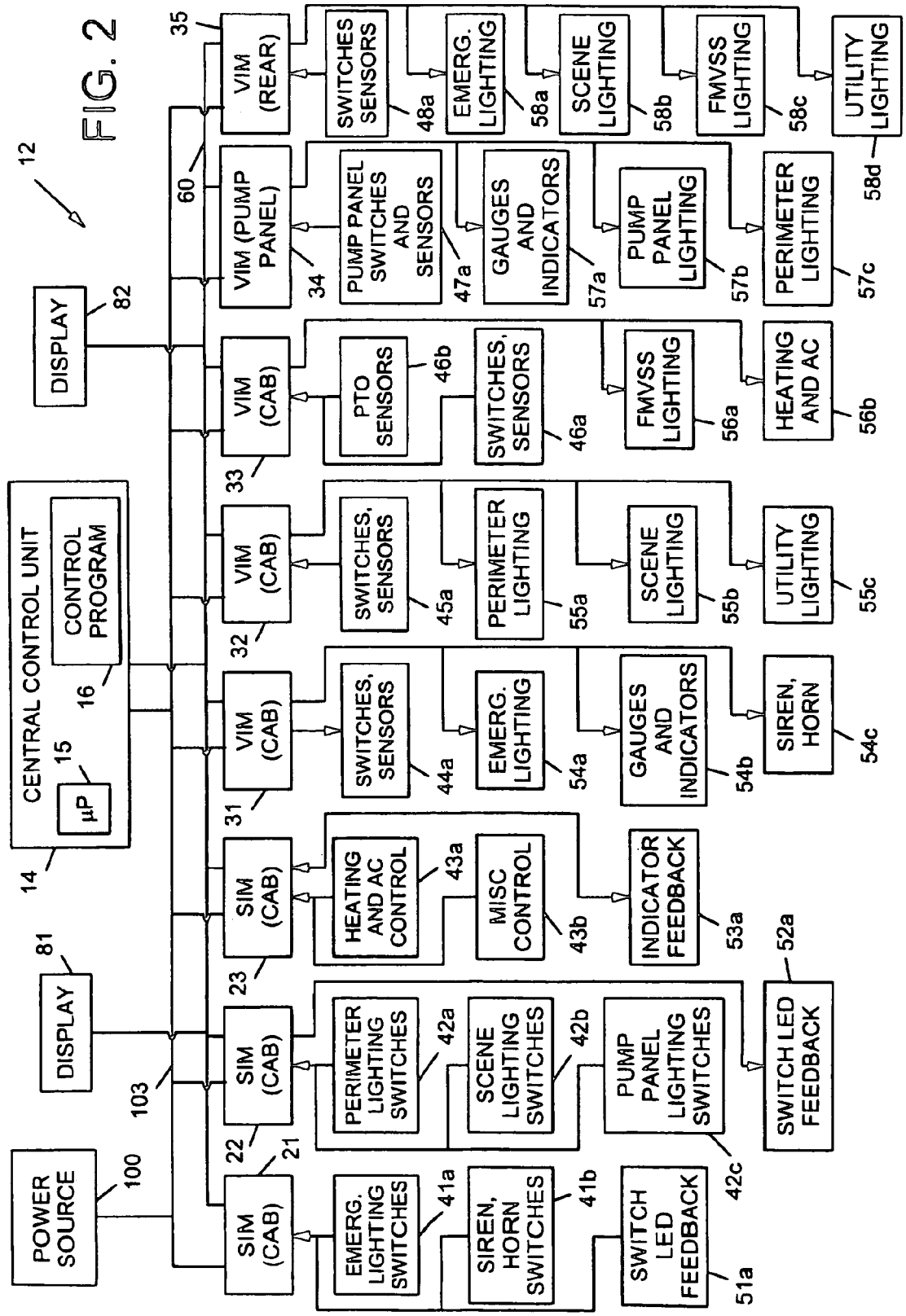
FIG. 2 is a block diagram of the control system of FIG. 1 showing selected aspects of the control system in greater detail.

The advantage of distributing the interface modules 20 and 30 in this manner can be more fully appreciated with reference to FIG. 2, which shows the interconnection of the interface modules 20 and 30. As shown in FIG. 2, the interface modules 20 and 30 receive power from a power source 100 by way of a power transmission link 103. The power transmission link 103 may comprise for example a single power line that is routed throughout the fire truck 10 to each of the interface modules 20 and 30. The interface modules then distribute the power to the output devices 50, which are more specifically designated with the reference numbers 51a, 52a, 53a, 54a-c, 55a-c, 56a-b, 57a-c and 58a-d in FIG. 2.

It is therefore seen from FIGS. 1 and 2 that the relative distribution of the interface modules 20 and 30 throughout the fire truck 10 in combination with the arrangement of the power transmission link 103 allows the amount of wiring on the fire truck 10 to be dramatically reduced. The power source 100 delivers power to the interface modules 20 and 30, which act among other things as power distribution centers, and not directly to the output devices 50. Because the interface modules 20 and 30 are located so closely to the I/O devices 40 and 50, most of the I/O devices can be connected to the interface modules 20 and 30 using only a few feet of wire or less. This eliminates the need for a wire harness that extends the length of the fire truck (about forty feet) to establish connections for each I/O devices 40 and 50 individually.

Continuing to refer to FIG. 2, the switch interface modules 20 and the interconnection of the interface modules 20 with various I/O devices will now be described in greater detail. The interface modules 20 are microprocessor-based, as previously noted, and include a microprocessor that executes a program to enable communication over the communication network 60, as detailed below.

The same or a different microprocessor of the interface modules 20 may also be used to process input signals received from the input devices 40. In particular, the interface modules 20 preferably perform debounce filtering of the switch inputs, so as to require that the position of the switch become mechanically stable before a switch transition is reported to the central control unit 14. For example, a delay of fifty milliseconds may be required before a switch transition is reported. Performing this filtering at the interface modules 20 reduces the amount of processing that is required by the central control unit 14 to interpret switch inputs, and also reduces the amount of communication that is required over the communication network 60 because each switch transition need not be reported.

Physically, the interface modules 20 may be placed near the headliner of a cab 17 of the fire truck 10. Traditionally, it is common practice to locate panels of switches along the headliner of the cab for easy access by an operator of the fire truck. Additionally, as detailed below, in the preferred embodiment, the interface modules 20 are connected to switches that have integrally fabricated LEDs for indicating the state of the output device controlled by the switch to provide maximum operator feedback. These LEDs are output devices which are connected to the interface modules 20. Therefore, by locating the interface modules near the headliner of the cab, the amount of wiring required to connect the interface modules 20 not only to the switches and but also to the LED indicators is reduced.

In the preferred embodiment, the interface modules 20 have between ten and twenty-five each of inputs and outputs and, more preferably, have sixteen digital (on/off switch) inputs and sixteen LED outputs. Most of these inputs and outputs are utilized in connection with switches having integrally fabricated LEDs. However, it should be noted that there need not be a one-to-one correspondence between the switches and the LEDs, and that the inputs and the outputs of the interface modules 20 need not be in matched pairs. For example, some inputs may be digital sensors (without a corresponding output device) and some of the outputs may be ordinary digital indicators (without a corresponding input device). Additionally, the LED indicators associated with the switch inputs for the interface module 21 could just as easily be driven by the interface module 23 as by the interface module 21, although this arrangement is not preferred. Of course, it is not necessary that all of the inputs and outputs on a given interface module 20 be utilized and, in fact, it is likely that some will remain unutilized.

One way of establishing a dedicated link between the I/O devices 40 and 50 and the interface modules 20 is through the use of a simple hardwired link. Considering for example an input device which is a switch, one terminal of the switch may be connected (e.g., by way of a harness connector) to an input terminal of the interface module 20 and the other terminal of the switch may be tied high (bus voltage) or low (ground). Likewise, for an output device which is an LED, one terminal of the LED may be connected to an output terminal of the interface module 20 and the other terminal of the LED may again be tied high or low. Other dedicated links, such as RF links, could also be used.

To provide maximum operator feedback, the LEDs that are located with the switches have three states, namely, off, on, and blinking. The off state indicates that the switch is off and therefore that the device controlled by the switch is off. Conversely, the on state indicates that the switch is on and that the device controlled by the switch is on. The blinking state indicates that the control system 12 recognizes that a switch is on, but that the device which the switch controls is nevertheless off for some other reason (e.g., due to the failure of an interlock condition, or due to the operation of the load manager or load sequencer). Notably, the blinking LED feedback is made possible by the fact that the LEDs are controlled by the control unit 14 and not directly by the switches themselves, since the switches themselves do not necessarily know the output state of the devices they control.

A specific example will now be given of a preferred interconnection of the interface modules 21, 22, and 23 with a plurality of I/O devices 40 and 50. Many or all of the I/O devices 40 and 50 could be the same as those that have previously been used on fire trucks. Additionally, it should be noted that the example given below is just one example, and that a virtually unlimited number of configurations are possible. This is especially true since fire trucks tend to be sold one or two at a time and therefore each fire truck that is sold tends to be unique at least in some respects.

In FIG. 2, the interface module 21 receives inputs from switches 41a that control the emergency lighting system of the fire truck. As previously noted, the emergency lighting system includes the flashing emergency lights (usually red and white) that are commonly associated with fire trucks and that are used to alert other motorists to the presence of the fire truck on the roadway or at the scene of a fire. One of the switches 41a may be an emergency master on/off (E-master) switch used to initiate load sequencing, as described in greater detail below. The interface module 21 may also be connected, for example, to switches 41b that control the emergency siren and horn. The interface module 21 is also connected to LEDs 51a that are integrally located in the switches 41a and 41b and that provide operator feedback regarding the positions of the switches 41a and 41b, as previously described.

The interface module 22 receives inputs from switches 42a that control lighting around the perimeter of the fire truck 10, switches 42b that control scene lighting, and switches 42c that control lighting which aids the operators in viewing gauges and other settings at the pump panel. The interface module 22 is also connected to LEDs 52a that are integrally located in the switches 42a, 42b and 42c and that provide operator feedback regarding the positions of the switches 42a, 42b and 42c.

The interface module 23 receives inputs from switches 43a that control heating and air conditioning, and switches 43b that controls miscellaneous other electrical devices. The interface module 23 is connected to LED indicators, some of which may be integrally located with the switches 43a and 43b and others of which may simply be an LED indicator that is mounted on the dashboard or elsewhere in the cab of the fire truck 10.

Continuing to refer to FIG. 2, the vehicle interface modules 30 and the interconnection of the interface modules 20 with various I/O devices will now be described in greater detail. As previously mentioned, the interface modules 30 are distinguishable from the interface modules 20 mainly in that the interface modules 30 are capable of handling both analog and digital inputs and outputs, and in that they are capable of providing more output power to drive output devices such as digitally-driven gauges, solenoids, and so on. The interface modules 30 preferably have between fifteen and twenty-five each inputs and outputs and, more preferably, have twenty inputs (including six digital inputs, two frequency counter inputs, and six analog inputs) and twenty outputs (including six outputs that are configurable as analog outputs).

Like the interface modules 20, the interface modules 30 are microprocessor-based and include a microprocessor that executes a program to enable communication over the communication network 60. The same or a different microprocessor of the interface modules 30 may also be used to process input signals received from the input devices 40 and to process output signals transmitted to the output devices 50.

For the interface modules 30, this processing includes not only debounce filtering, in the case of switch inputs, but also a variety of other types of processing. For example, for analog inputs, this processing includes any processing that is required to interpret the inputs from analog-to-digital (A/D) converters, including converting units. For frequency inputs, this processing includes any processing that is required to interpret inputs from frequency-to-digital converters, including converting units. This processing also includes other simple filtering operations. For example, in connection with one analog input, this processing may include notifying the central control unit 14 of the status of an input device only every second or so. In connection with another analog input, this processing may include advising the central control unit 14 only when the status of the input device changes by a predetermined amount. For analog output devices, this processing includes any processing that is required to interpret the outputs for digital-to-analog (D/A) converters, including converting units. For digital output devices that blink or flash, this processing includes implementing the blinking or flashing (i.e., turning the output device on and off at a predetermined frequency) based on an instruction from the central control unit 14 that the output device should blink or flash. In general, the processing by the interface modules 30 reduces the amount of information which must be communicated over the communication link, and also reduces the amount of time that the central control unit 14 must spend processing minor changes in analog input status.

Preferably, the configuration information required to implement the I/O processing that has just been described is downloaded from the central control unit 14 to each interface module 30 (and each interface module 20) at power-up. Additionally, the harness connector that connects to each of the interface modules 20 and 30 are preferably electronically keyed, such that being connected to a particular harness connector provides the interface modules 20 and 30 with a unique identification code (for example, by tying various connector pins high and low to implement a binary code). The advantage of this approach is that the interface modules 20 and 30 become interchangeable devices that are customized only at power-up. As a result, if one of the interface modules 30 malfunctions, for example, a new interface module 30 can be plugged into the control system 12, customized automatically at power-up (without user involvement), and the control system 12 then becomes fully operational. This enhances the maintainability of the control system 12.

A specific example will now be given of a preferred interconnection of the interface modules 31, 32, and 33 with a plurality of I/O devices 40 and 50. This example continues the example that was started in connection with the interface modules 21, 22, and 23. Again, it should be noted that the configuration described herein is just one example.

The interface modules 31, 32, 33, 34 and 35 all receive inputs from additional switches and sensors 44a, 45a, 46a, 47a and 48a. The switches may be additional switches that are located in the cab of the fire truck or elsewhere throughout the vehicle, depending on the location of the interface module. The sensors may be selected ones of a variety of sensors that are located throughout the fire truck. The sensors may be used to sense the mechanical status of devices on the fire truck, for example, whether particular devices are engaged or disengaged, whether particular devices are deployed, whether particular doors on the fire truck are open or closed, and so on. The sensors may also be used to sense fluid levels such as fuel level, transmission fluid level, coolant level, foam pressure, oil level, and so on.

In addition to the switches and sensors 44a, the interface module 31 is also connected to a portion 54a of the emergency lighting system. The emergency lighting system includes emergency-lights (usually red and white) at the front, side and rear of the fire truck 10. The emergency lights may, for example, be in accordance with the guidelines provided by the National Fire Protection Association. Because the interface module 31 is located at the front of the fire truck, the interface module 31 is connected to the red and white emergency lights at the front of the fire truck.

The interface module 31 is also connected to gauges and indicators 54b which are located on the dashboard of the fire truck 10. The gauges may indicate fluid levels such as fuel level, transmission fluid level, coolant level, foam pressure, oil level and so on. The indicators may include, for example, indicators that are used to display danger, warning and caution messages, warning lights, and indicators that indicate the status of various mechanical and electrical systems on the fire truck. The interface module 31 may also be connected, for example, to an emergency sound system including an emergency siren and emergency air horns 54c, which are used in combination with the emergency lights 54a.

In addition to the switches and sensors 45a, the interface module 32 is also connected to perimeter lighting 55a, scene lighting 55b and utility lighting 55c. The perimeter lighting 55a illuminates the perimeter of the fire truck 10. The scene lighting 55b includes bright flood lights and/or spot lights to illuminate the work area at a fire. The utility lighting 55c includes lighting used to light operator panels, compartments and so on of the fire truck 10.

In addition to the switches and sensors 46a, the interface module 33 is also connected to PTO sensors 46b. The PTO sensors 46b monitor the status of a power take-off mechanism 97 (see FIG. 1), which diverts mechanical power from the engine/transmission from the wheels to other mechanical subsystems, such as the pump system, an aerial system and so on. The interface module 33 is also connected to a portion 56a of the FMVSS (Federal Motor Vehicle Safety Standard) lighting. The FMVSS lighting system includes the usual types of lighting systems that are commonly found on most types of vehicles, for example, head lights, tail lights, brake lights, directional lights (including left and right directionals), hazard lights, and so on. The interface module 33 is also connected to the heating and air conditioning 56b.

In addition to the switches and sensors 47a, the interface module 34, which is disposed near the pump panel, is connected to pump panel switches and sensors 47a, pump panel gauges and indicators 57a, pump panel lighting 57b, and perimeter lighting 57c. The pump system may be manually controlled or may be automatically controlled through the use of electronically controlled valves. In either case, the various fluid pressures are measured by sensors and displayed on the gauges and indicators 57a.

Finally, in addition to the switches and sensors 48a, the interface module 35 is also connected to emergency lighting 58a, scene lighting 58b, FMVSS lighting 58c, and the utility lighting 58d. These lighting systems have been described above.

The interface modules 20 and the interface modules 30 are connected to the central control unit 14 by the communication network 60. The communication network may be implemented using a network protocol, for example, which is in compliance with the Society of Automotive Engineers (SAE) J1708/1587 and/or J1939 standards. The particular network protocol that is utilized is not critical, although all of the devices on the network should be able to communicate effectively and reliably.

The transmission medium may be implemented using copper or fiber optic cable. Fiber optic cable is particularly advantageous in connection with fire trucks because fiber optic cable is substantially immune to electromagnetic interference, for example, from communication antennae on mobile news vehicles, which are common at the scenes of fires. Additionally, fiber optic cable is advantageous because it reduces RF emissions and the possibility of short circuits as compared to copper-based networks. Finally, fiber optic cable is advantageous because it reduces the possibility of electrocution as compared to copper in the event that the cable accidentally comes into contact with power lines at the scene of a fire.

Also connected to the communication network 60 are a plurality of displays 81 and 82. The displays 81 and 82 permit any of the data collected by the central control unit 14 to be displayed to the firefighters in real time. In practice, the data displayed by the displays 81 and 82 may be displayed in the form of text messages and may be organized into screens of data (given that there is too much data to display at one time) and the displays 81 and 82 may include membrane pushbuttons that allow the firefighters to scroll through, page through, or otherwise view the screens of data that are available. Additionally, although the displays 81 and 82 are both capable of displaying any of the information collected by the central control unit 14, in practice, the displays 81 and 82 are likely to be used only to display selected categories of information. For example, assuming the display 81 is located in the cab and the display 82 is located at the pump panel, the display 81 is likely to be used to display information that pertains to devices which are controlled from within the cab, whereas the display 82 is likely to be used to display information pertaining to the operation of the pump panel. Advantageously, the displays 81 and 82 give firefighters instant access to fire truck information at a single location, which facilitates both normal operations of the fire truck as well as troubleshooting if problems arise.

Also shown in FIG. 2 is a personal computer 85 which is connected to the control unit 14 by way of a communication link 86, which may be a modem link, an RS-232 link, an Internet link, and so on. The personal computer 85 allows diagnostic software to be utilized for remote or local troubleshooting of the control system 12, for example, through direct examination of inputs, direct control of outputs, and viewing and controlling internal states, including interlock states. Because all I/O status information is stored in the central control unit 14, this information can be easily accessed and manipulated by the personal computer 85. If a problem is encountered, the personal computer can be used to determine whether the central control unit 14 considers all of the interface modules 20 and 30 to be "on-line" and, if not, the operator can check for bad connections and so on. If a particular output device is not working properly, the personal computer 85 can be used to trace the I/O status information from the switch or other input device through to the malfunctioning output device. For example, the personal computer 85 can be used to determine whether the switch state is being read properly, whether all interlock conditions are met, and so on.

The personal computer 85 also allows new firmware to be downloaded to the control unit 14 remotely (e.g., from a different city or state or other remote location by way of the Internet or a telephone link) by way of the communication link 86. The firmware can be firmware for the control unit 14, or it can be firmware for the interface modules 20 and 30 that is downloaded to the control unit 14 and then transmitted to the interface modules 20 and 30 by way of the communication network 60.

Finally, referring back to FIG. 1, several additional systems are shown which will now be briefly described before proceeding to a discussion of the operation of the control system 12. In particular, FIG. 1 shows an engine system including an engine 92 and an engine control system 91, a transmission system including a transmission 93 and a transmission control system 94, and an anti-lock brake system including an anti-lock brake control system 95 and anti-lock brakes 96. The transmission 93 is mechanically coupled to the engine 92, and is itself further mechanically coupled to a PTO system 97. The PTO system 97 allows mechanical power from the engine to be diverted to water pumps, aerial drive mechanisms, stabilizer drive mechanisms, and so on. In combination, the engine system, the transmission system and the PTO system form the power train of the fire truck 10.

The control systems 92, 94 and 95 may be connected to the central control unit 14 using the same or a different communication network than is used by the interface modules 30 and 40. In practice, the control systems 92, 94 and 95 are likely to be purchased as off-the-shelf systems, since most fire truck manufacturers purchase rather than manufacture engine systems, transmission systems and anti-lock brake systems. As a result, it is likely that the control systems 92, 94 and 95 will use a variety of different communication protocols and therefore that at least one additional communication network will be required.

By connecting the systems 92, 94 and 95 to the central control unit 14, an array of additional input status information becomes available to the control system 12. For example, for the engine, this allows the central control unit 14 to obtain I/O status information pertaining to engine speed, engine hours, oil temperature, oil pressure, oil level, coolant level, fuel level, and so on. For the transmission, this allows the central control unit 14 to obtain, for example, information pertaining transmission temperature, transmission fluid level and/or transmission state (1st gear, 2nd gear, and so on). Assuming that an off-the-shelf engine or transmission system is used, the information that is available depends on the manufacturer of the system and the information that they have chosen to make available.

Connecting the systems 92, 94 and 95 to the central control unit 14 is advantageous because it allows information from these subsystems to be displayed to firefighters using the displays 81 and 82. This also allows the central control unit 14 to implement various interlock conditions as a function of the state of the transmission, engine or brake systems. For example, in order to turn on the pump system (which is mechanically driven by the engine and the transmission), an interlock condition may be implemented that requires that the transmission be in neutral or 4th lockup (i.e., fourth gear with the torque converter locked up), so that the pump can only be engaged when the wheels are disengaged from the power train. The status information from these systems can therefore be treated in the same manner as I/O status information from any other discrete I/O device on the fire truck 10. It may also be desirable to provide the central control unit 14 with a limited degree of control over the engine and transmission systems, for example, enabling the central control unit 14 to issue throttle command requests to the engine control system 91. This allows the central control unit to control the speed of the engine and therefore the voltage developed across the alternator that forms part of the power source 100.

2. Aerial Control

Figure 3:
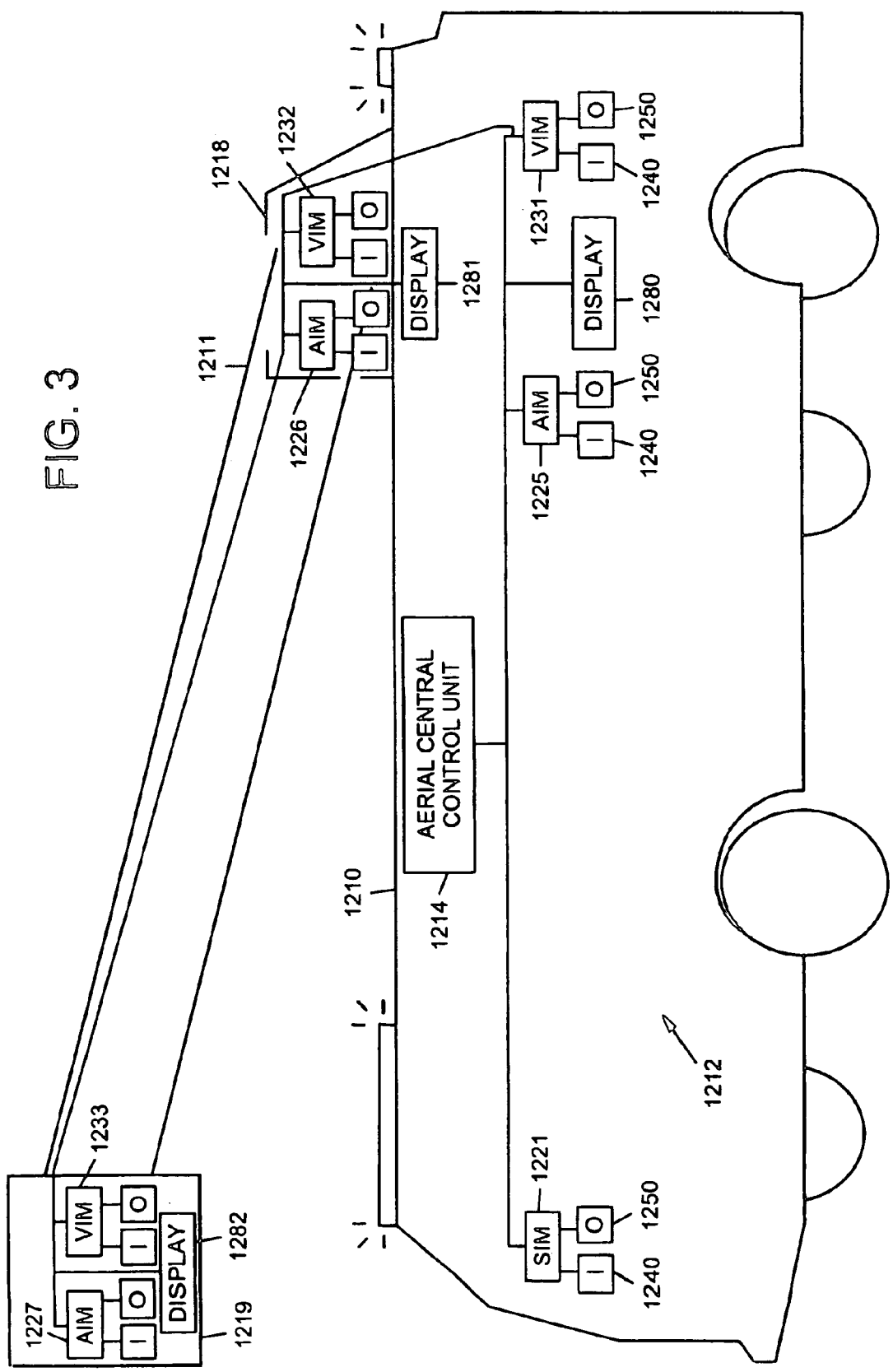
FIG. 3 is a schematic view of an aerial device having a control system according to another embodiment of the present invention.

Referring now to FIG. 3, a preferred embodiment of a fire truck 1210 with an aerial 1211 having an aerial control system 1212 is illustrated. By way of overview, the control system 1212 comprises an aerial central control unit 1214, a plurality of microprocessor-based interface modules 1220, 1230 and 1235, a plurality of input devices 1240, and a plurality of output devices 1250. The central control unit 1214 and the interface modules 1220, 1230 and 1235 are connected to each other by a communication network 1260.

The control system 1212 is similar in most respect to the control system 12, with the primary difference being that the control system 1212 is used to control the output devices 1250 on the aerial 1211 based on input status information from the input devices 1240, rather than to control the output devices 50 on the chassis 11. The interface modules 1220 and 1230 may be identical to the interface modules 20 and 30, respectively, and the central control unit 1214 may be identical to the central control unit 14 except that a different control program is required in connection with the aerial 1211. Accordingly, the discussion above regarding the interconnection and operation of the interface modules 20 and 30 with the input devices 40 and output devices 50 applies equally to the central control unit 1214, except to the extent that the control system 1212 is associated with the aerial 1211 and not with the chassis 11.

The aerial control system 1212 also includes the interface modules 1225-1227, which are similar to the interface modules 20 and 30 except that different I/O counts are utilized. In the preferred embodiment, the interface modules 1225-1227 have twenty-eight switch inputs (two of which are configurable as frequency inputs). As previously noted, rather than using several different types of interface modules, it may be desirable to use only a single type of interface module in order to reduce inventory requirements. Additionally, the number of interface modules and the I/O counts are simply one example of a configuration that may be utilized.

It is desirable to use a control system 1212 for the aerial 1211 which is separate from the control system 12 in order to provide a clear separation of function between systems associated with the aerial 1211 and systems associated with the chassis 11. Additionally, as a practical matter, many fire trucks are sold without aerials and therefore providing a separate aerial control system enables a higher level commonality with respect to fire trucks that have aerials and fire trucks that do not have aerials.

Figure 4:
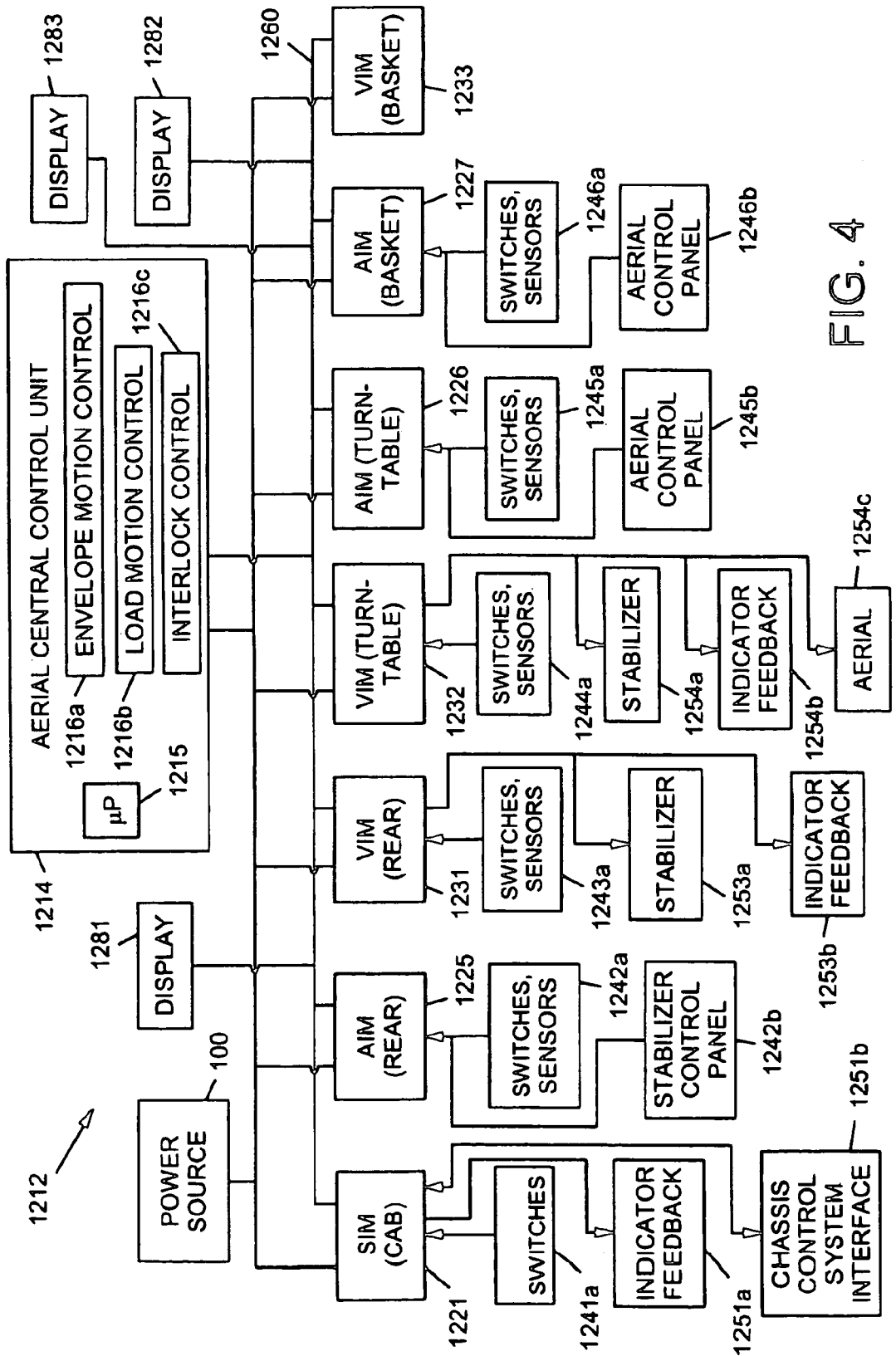
FIG. 4 is a more detailed block diagram of the control system of FIG. 3.

With reference to FIG. 4, a specific example will now be given of a preferred interconnection of the interface modules with a plurality of input devices 1240 and output devices 1250. The interface module 1221 receives inputs from switches 1241*a* which may include for example an aerial master switch that activates aerial electrical circuits, an aerial PTO switch that activates the transmission to provide rotational input power for the hydraulic pump, and a platform leveling switch that momentarily activates a platform (basket) level electrical circuit to level the basket relative to the current ground grade condition. The LED indicators 1251 provide visual feedback regarding the status of the input switches 1241*a*.

The interface modules 1225 and 1231 are located near a ground-level control station at a rear of the fire truck 10. The interface modules 1225 and 1231 receive inputs from switches 1242*a* and 1243*a* that include, for example, an auto level switch that activates a circuit to level the fire truck using the stabilizer jacks and an override switch that overrides circuits for emergency operation. The interface modules 1225 and 1231 may also receive inputs from an operator panel such as a stabilizer control panel 1242*b*, which includes switches that control the raising and lowering of front and rear stabilizer jacks, and the extending and retracting of front and rear stabilizer jacks. The stabilizer is an outrigger system which is deployed to prevent the fire truck from becoming unstable due to the deployment of an aerial system (e.g., an eighty-five foot extendable ladder). The interface module 1231 may drive outputs that are used to control deployment the stabilizer, which can be deployed anywhere between zero and five feet.

The interface modules 1226 and 1232 are located near a turn table 1218 at the rear of the fire truck 10. The interface modules may receive inputs from switches and sensors 1244*a* and 1245*a*, as well as switches that are part of an aerial control panel 1245*b* and are used to control the extension/retraction, raising/lowering, and rotation of the aerial 1211. The interface modules 1226 and 1232 drive outputs that control the extension/retraction, raising/lowering, and rotation of the aerial 1211, as well as LED indicators 1254*b* that provide operator feedback regarding the positions of switches and other I/O status information. The interface modules 1227 and 1233 are located in the basket of the aerial and provide duplicate control for the extension/retraction, raising/lowering, and rotation of the aerial.

Additional inputs and outputs 1251*b* may be used to establish a communication link between the control system 12 and the control system 1212. In other words, the digital on/off outputs of one control system can be connected to the switch inputs of the other control system, and vice versa. This provides for a mechanism of transferring I/O status information back and forth between the two control systems 12 and 1212.

In another embodiment, the portion of the communication network that connects the interface modules 1227 and 1233 to the remainder of the control system 1212 may be implemented using a wireless link. The wireless link may be implemented by providing the interface module s 1227 and 1233 with wireless RF communication interfaces such as a Bluetooth interfaces. A wireless link may be advantageous in some instances in order to eliminate maintenance associated with the network harness that extends from the main vehicle body along the articulated arm formed by the aerial 1211 to the interface modules 1227 and 1233. Also, given that portions of the network harness can be positioned at significant distances from the center of gravity of the vehicle 10, the use of a wireless link is advantageous in that it reduces the weight of the articulated arm, thereby enhancing the mechanical stability of the vehicle. In this regard, it may also be noted that it is possible to provide all of the interface modules on the vehicle 10 with the ability to communicate wirelessly with each other (e.g., using Bluetooth), thereby completely eliminating the need for a separate network harness.

The control system 1212 has complete motion control of the aerial 1211. To this end, the control program 1216 includes an envelope motion controller 1216*a*, load motion controller 1216*b* and interlock controller 1216*c*. Envelope motion control refers to monitoring the position of the aerial and preventing the aerial from colliding with the remainder of the fire truck 10, and otherwise preventing undesirable engagement of mechanical structures on the fire truck due to movement of the aerial. Envelope motion control is implemented based on the known dimensions of the aerial 1211 and the known dimensions and position of other fire truck structures relative to the aerial 1211 (e.g., the position and size of the cab 17 relative to the aerial 1211) and the position of the aerial 1211 (which is measured with feedback sensors 1244*a* and 1245*a*). The control system 1212 then disallows inputs that would cause the undesirable engagement of the aerial 1211 with other fire truck structures.

Load motion control refers to preventing the aerial from extending so far that the fire truck tips over due to unbalanced loading. Load motion control is implemented by using an appropriate sensor to measure the torque placed on the cylinder that mechanically couples the aerial 1211 to the remainder of the fire truck. Based on the torque and the known weight of the fire truck, it is determined when the fire truck is close to tipping, and warnings are provided to the operator by way of text messages and LED indicators.

Interlock control refers to implementing interlocks for aerial systems. For example, an interlock may be provided that require the parking brake be engaged before allowing the aerial to move, that require the stabilizers to be extended and set before moving the aerial 1211, that require that the aerial PTO be engaged before attempting to move the aerial, and so on.

Advantageously, therefore, the control system makes the operation of the aerial much safer. For example, with respect to load motion control, the control system 1212 automatically alerts firefighters if the extension of the aerial is close to causing the fire truck to tip over. Factors such as the number and weight of people in the basket 1219, the amount and weight of equipment in the basket 1219, the extent to which the stabilizers are deployed, whether and to what extent water is flowing through aerial hoses, and so on, are taken into account automatically by the torque sensors associated with the cylinder that mounts the aerial to the fire truck. This eliminates the need for a firefighter to have to monitor these conditions manually, and makes it possible for the control system 1212 to alert an aerial operator to unsafe conditions, and puts less reliance on the operator to make sure that the aerial is operating under safe conditions.

3. Alternative Control System Architecture

Figure 5:
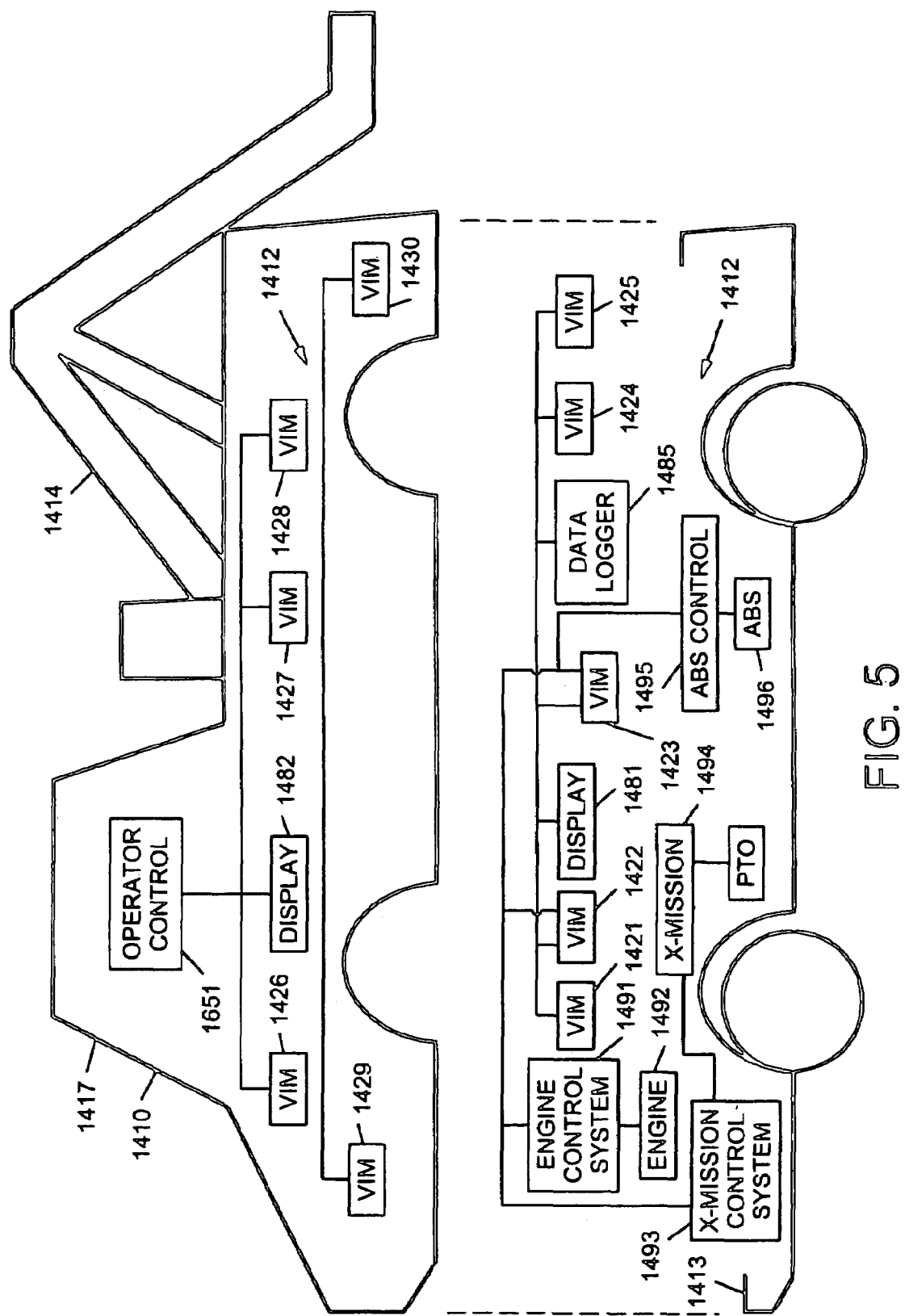
FIG. 5 is a schematic view of a vehicle having a control system according to another embodiment of the present invention.

Referring now to FIG. 5, an architecture for an alternative control system 1412 according to another preferred embodiment of the invention is illustrated. By way of overview, the control system 1412 comprises a plurality of microprocessor-based interface modules 1420, a plurality of input and output devices 1440 and 1450 (see FIG. 6) that are connected to the interface modules 1420, and a communication network 1460 that interconnects the interface modules 1420. The control system 1412 is generally similar to the control system 12, but includes several enhancements. The control system 1412 preferably operates in the same manner as the control system 12 except to the extent that differences are outlined are below.

The interface modules 1420 are constructed in generally the same manner as the interface modules 20 and 30 and each include a plurality of analog and digital inputs and outputs. The number and type of inputs and outputs may be the same, for example, as the vehicle interface modules 30. Preferably, as described in greater detail below, only a single type of interface module is utilized in order to increase the field serviceability of the control system 1412. Herein, the reference numeral 1420 is used to refer to the interface modules 1420 collectively, whereas the reference numerals 1421-1430 are used to refer to specific ones of the interface modules 1420. The interface modules are described in greater detail in connection with FIGS. 6-8.

Also connected to the communication network 1460 are a plurality of displays 1481 and 1482 and a data logger 1485. The displays 1481 and 1482 permit any of the data collected by the control system 1412 to be displayed in real time, and also display warning messages. The displays 1481 and 1482 also include membrane pushbuttons that allow the operators to scroll through, page through, or otherwise view the screens of data that are available. The membrane pushbuttons may also allow operators to change values of parameters in the control system 1412. The data logger 1485 is used to store information regarding the operation of the vehicle 1410. The data logger 1485 may also be used as a "black box recorder" to store information logged during a predetermined amount of time (e.g., thirty seconds) immediately prior to the occurrence of one or more trigger events (e.g., events indicating that the vehicle 1410 has been damaged or rendered inoperative, such as when an operational parameter such as an accelerometer threshold has been exceeded).

Finally, FIG. 5 shows an engine system including an engine 1492 and an engine control system 1491, a transmission system including a transmission 1493 and a transmission control system 1494, and an anti-lock brake system including an anti-lock brake control system 1495. These systems may be interconnected with the control system 1412 in generally the same manner as discussed above in connection with the engine 92, the engine control system 91, the transmission 93, the transmission control system 94, and the anti-lock brake system 36 of FIG. 1.

Figure 6:
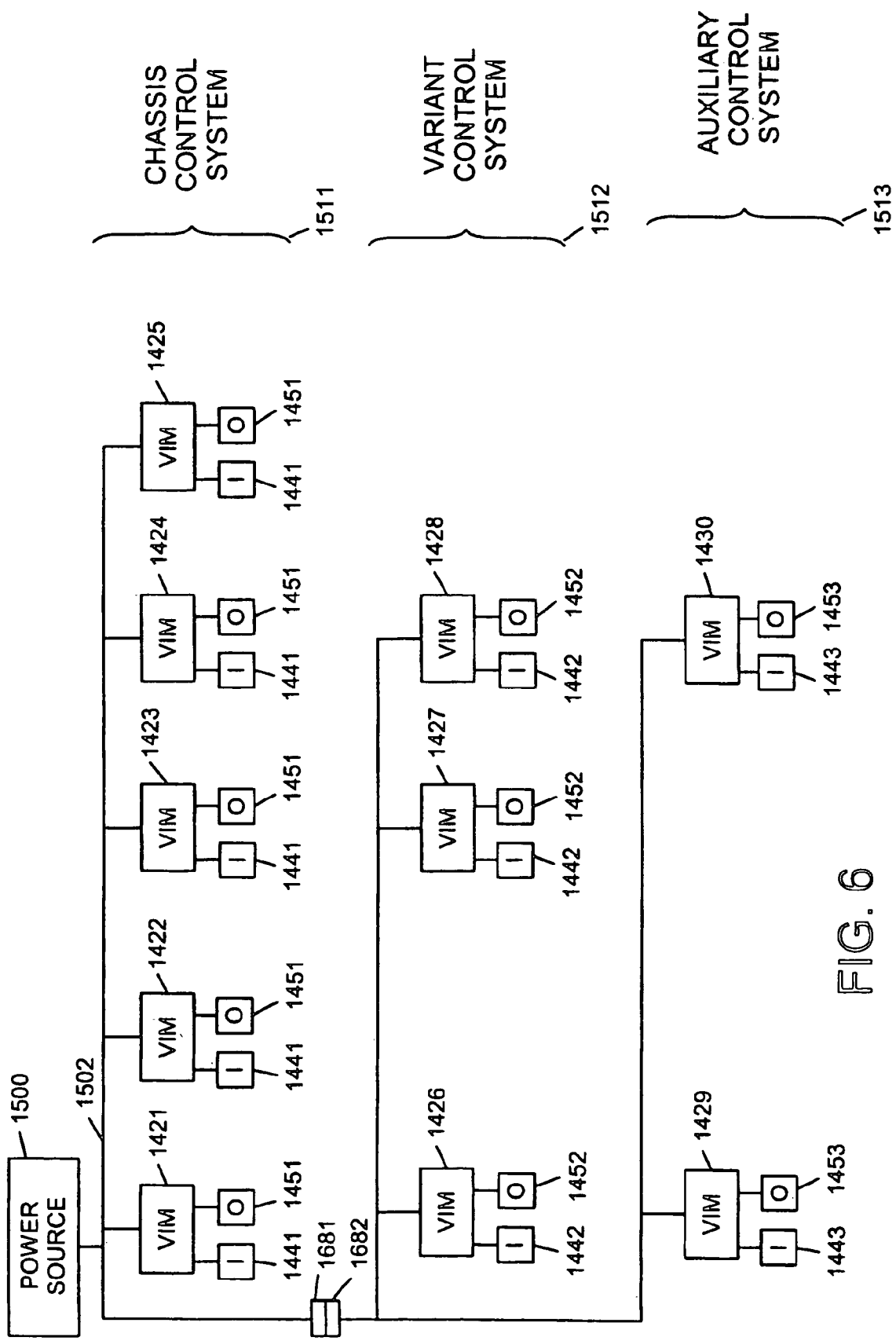
FIGS. 6-7 are block diagrams of the control system of FIG. 5 showing selected aspects of the control system in greater detail.
Figure 7:
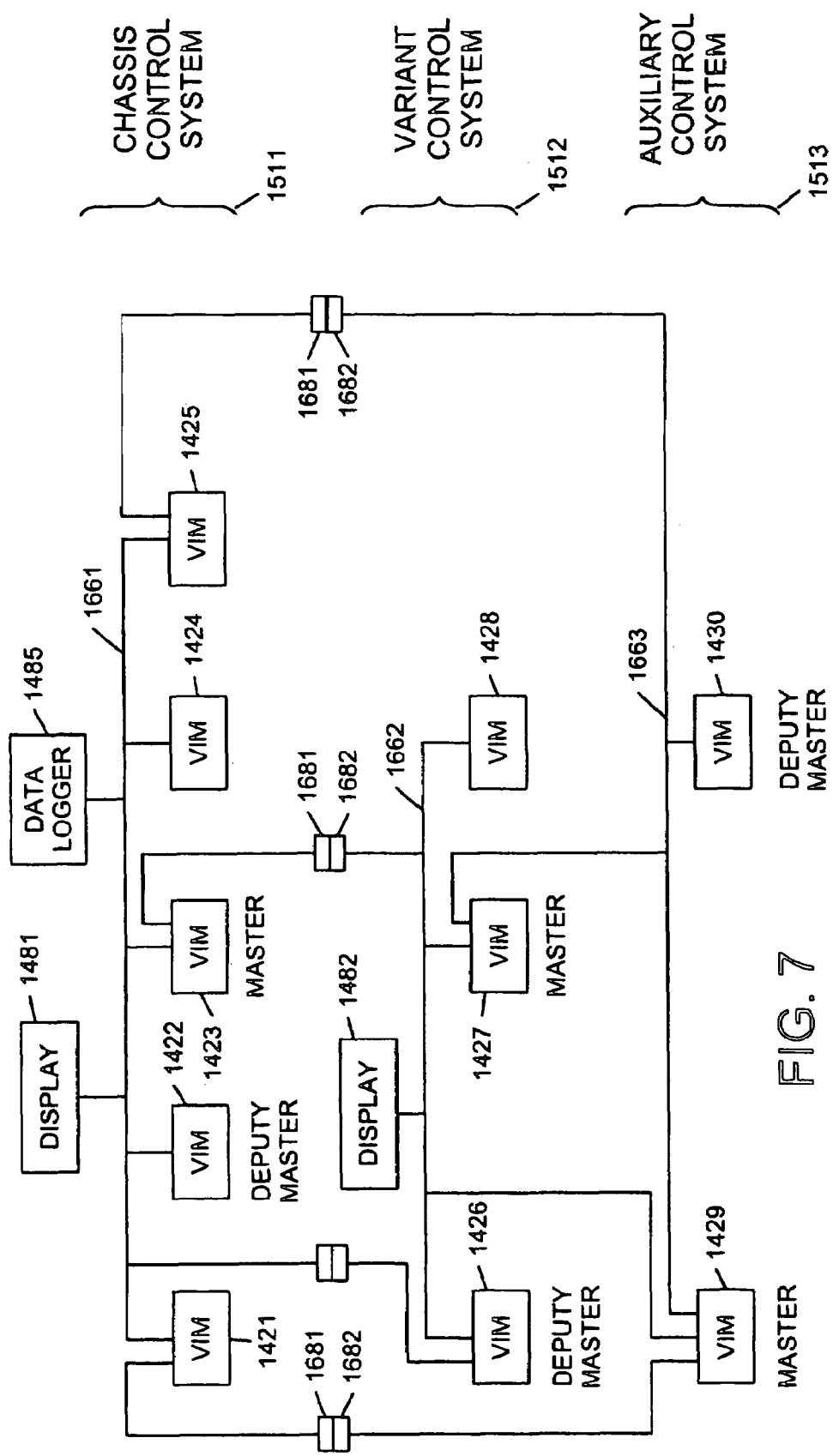
Figure 8:
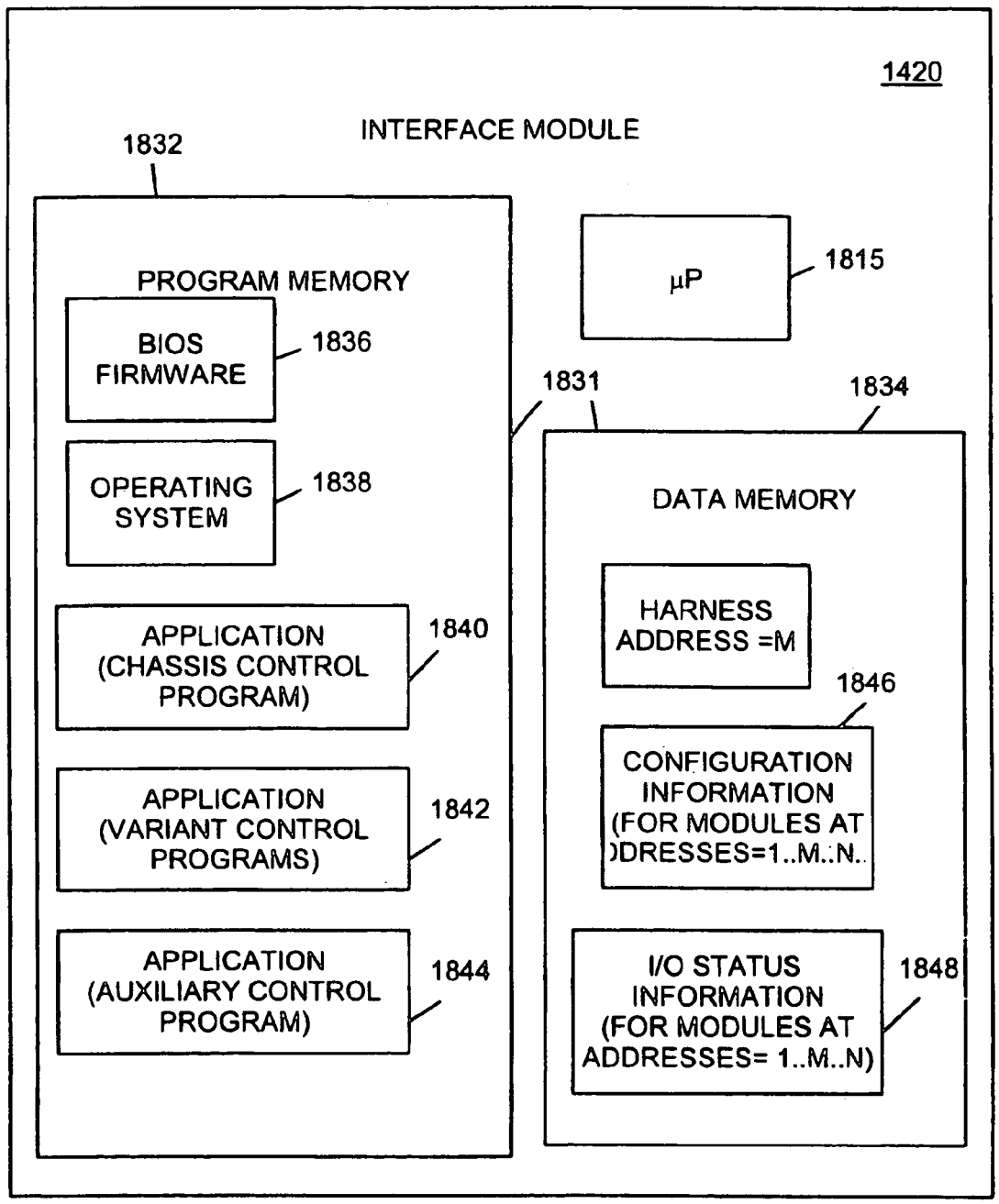
FIG. 8 is a diagram showing the memory contents of an exemplary interface module in greater detail.

Referring now also to FIG. 6-8, the structure and interconnection of the interface modules 1420 is described in greater detail. Referring first to FIG. 6, the interconnection of the interface modules 1420 with a power source 1500 is described. The interface modules 1420 receive power from the power source 1500 by way of a power transmission link 1502. The interface modules 1420 are distributed throughout the vehicle 1410, with some of the interface modules 1420 being located on the chassis 1417 and some of the interface modules 1420 being located on a variant module 1413. The variant module 1413 may be a module that is removable/replaceable to provide the vehicle 1410 with different types of functionality.

The control system is subdivided into three control systems including a chassis control system 1511, a variant control system 1512, and an auxiliary control system 1513. The chassis control system 1511 includes the interface modules 1421-1425 and the I/O devices 1441 and 1451, which are all mounted on the chassis 1417. The variant control system 1512 includes the interface modules 1426-1428 and the I/O devices 1442 and 1452, which are all mounted on the variant module 1413. The auxiliary control system 1513 includes the interface modules 1429-1430 and the I/O devices 1443 and 1453, which may be mounted on either the chassis 1417 or the variant module 1413 or both.

The auxiliary control system 1513 may, for example, be used to control a subsystem that is disposed on the variant module but that is likely to be the same or similar for all variant modules (e.g., a lighting subsystem that includes headlights, tail lights, brake lights, and blinkers). The inclusion of interface modules 1420 within a particular control system may also be performed based on location rather than functionality. For example, if the variant module 1413 has an aerial device, it may be desirable to have one control system for the chassis, one control system for the aerial device, and one control system for the remainder of the variant module. Additionally, although each interface module 1420 is shown as being associated with only one of the control systems 1511-1513, it is possible to have interface modules that are associated with more than one control system. It should also be noted that the number of sub-control systems, as well as the number of interface modules, is likely to vary depending on the application. For example, a mobile command vehicle is likely to have more control subsystems than a wrecker variant, given the large number of I/O devices usually found on mobile command vehicles.

The power transmission link 1502 may comprise a single power line that is routed throughout the vehicle 1410 to each of the interface modules 1420, but preferably comprises redundant power lines. Again, in order to minimize wiring, the interface modules 1420 are placed so as to be located as closely as possible to the input devices 1440 from which input status information is received and the output devices 1450 that are controlled. This arrangement allows the previously-described advantages associated with distributed data collection and power distribution to be achieved. Dedicated communication links, which may for example be electric or photonic links, connect the interface modules 1421-1430 modules with respective ones of the I/O devices, as previously described.

Referring next to FIG. 7, the interconnection of the interface modules 1420 by way of the communication network 1460 is illustrated. As previously indicated, the control system 1412 is subdivided into three control systems 1511,1512 and 1513. In accordance with this arrangement, the communication network 1460 is likewise further subdivided into three communication networks 1661, 1662, and 1663. The communication network 1661 is associated with the chassis control system 1511 and interconnects the interface modules 1421-1425. The communication network 1662 is associated with the variant control system 1512 and interconnects the interface modules 1426-1428. The communication network 1663 is associated with the auxiliary control system 1513 and interconnects the interface modules 1429-1430. Communication between the control systems 1511-1513 occurs by way of interface modules that are connected to multiple ones of the networks 1661-1663. Advantageously, this arrangement also allows the interface modules to reconfigure themselves to communicate over another network in the event that part,or all of their primary network is lost.

In practice, each of the communication networks 1661-1663 may be formed of two or more communication networks to provide redundancy within each control system. Indeed, the connection of the various interface modules 1420 with different networks can be as complicated as necessary to obtain the desired level of redundancy. For simplicity, these potential additional levels of redundancy will be ignored in the discussion of FIG. 7 contained herein.

The communication networks 1661-1663 may be implemented in accordance with SAE J1708/1587 and/or J1939 standards, or some other network protocol, as previously described. The transmission medium is preferably fiber optic cable for robustness.

When the variant module 1413 is mounted on the chassis 1417, connecting the chassis control system 1511 and the variant control system 1512 is achieved simply through the use of two mating connectors 1681 and 1682 that include connections for one or more communication busses, power and ground. The chassis connector 1682 is also physically and functionally mateable with connectors for other variant modules, i.e., the chassis connector and the other variant connectors are not only capable of mating physically, but the mating also produces a workable vehicle system. A given set of switches or other control devices 1651 on the dash (see FIG. 5) may then operate differently depending on which variant is connected to the chassis. Advantageously, therefore, it is possible to provide a single interface between the chassis and the variant module (although multiple interfaces may also be provided for redundancy). This avoids the need for a separate connector on the chassis for each different type of variant module, along with the additional unutilized hardware and wiring, as has conventionally been the approach utilized.

Upon power up, the variant control system 1512 and the chassis control system 1511 exchange information that is of interest to each other. For example, the variant control system 1512 may communicate the variant type of the variant module 1413. Other parameters may also be communicated. For example, information about the weight distribution on the variant module 1413 may be passed along to the chassis control system 1511, so that the transmission shift schedule of the transmission 1493 can be adjusted in accordance with the weight of the variant module 1413, and so that a central tire inflation system can control the inflation of tires as a function of the weight distribution of the variant. Similarly, information about the chassis can be passed along to the variant. For example, where a variant module is capable of being used by multiple chassis with different engine sizes, engine information can be communicated to a wrecker variant module so that the wrecker variant knows how much weight the chassis is capable of pulling. Thus, an initial exchange of information in this manner allows the operation of the chassis control system 1511 to be optimized in accordance with parameters of the variant module 1413, and vice versa.

Referring next to FIG. 8, an exemplary one of the interface modules 1420 is shown in greater detail. The interface modules 1420 each include a microprocessor 1815 that is sufficiently powerful to allow each interface module to serve as a central control unit. The interface modules are identically programmed and each include a memory 1831 that further includes a program memory 1832 and a data memory 1834. The program memory 1832 includes BIOS (basic input/output system) firmware 1836, an operating system 1838, and application programs 1840, 1842 and 1844. The application programs include a chassis control program 1840, one or more variant control programs 1842, and an auxiliary control program 1844. The data memory 1834 includes configuration information 1846 and I/O status information 1848 for all of the modules 1420-1430 associated with the chassis 1417 and its variant module 1413, as well as configuration information for the interface modules (N+1 to Z in FIG. 8) of other variant modules that are capable of being mounted to the chassis 1417.

It is therefore seen that all of the interface modules 1420 that are used on the chassis 1417 and its variant module 1413, as well as the interface modules 1420 of other variant modules that are capable of being mounted to the chassis 1417, are identically programmed and contain the same information. Each interface module 1420 then utilizes its network address to decide when booting up which configuration information to utilize when configuring itself, and which portions of the application programs 1840-1844 to execute given its status as a master or non-master member of one of the control systems 1511-1513. A master interface module may be used to provide a nexus for interface operations with devices external to the control systems 1511-1513. The interface modules are both physically and functionally interchangeable because the interface modules are capable of being plugged in at any slot on the network, and are capable of performing any functions that are required at that slot on the network.

This arrangement is highly advantageous. Because all of the interface modules 1420 are identically programmed and store the same information, the interface modules are physically and functionally interchangeable within a given class of vehicles. The use of a single type of interface module makes it easier to find replacement interface modules and therefore enhances the field serviceability of the control system 1412.

Additionally, as previously noted, each interface module 1420 stores I/O status information for all of the modules 1420-1430 associated with the chassis 1417 and its variant module 1413. Therefore, each interface module 1420 has total system awareness. As a result, it is possible to have each interface module 1420 process its own inputs and outputs based on the I/O status information in order to increase system responsiveness and in order to reduce the amount of communication that is required with the central control unit. The main management responsibility of the central control unit or master interface module above and beyond the responsibilities of all the other interface modules 1420 then becomes, for example, to provide a nexus for interface operations with devices that are external to the control system of which the central control unit is a part.

Referring now to FIGS. 9-12, a preferred technique for transmitting I/O status information between the interface modules 1420 will now be described. Although this technique is primarily described in connection with the chassis control system 1511, this technique is preferably also applied to the variant control system 1512 and the auxiliary control system 1513, and/or in the control system 12.

Figure 9:
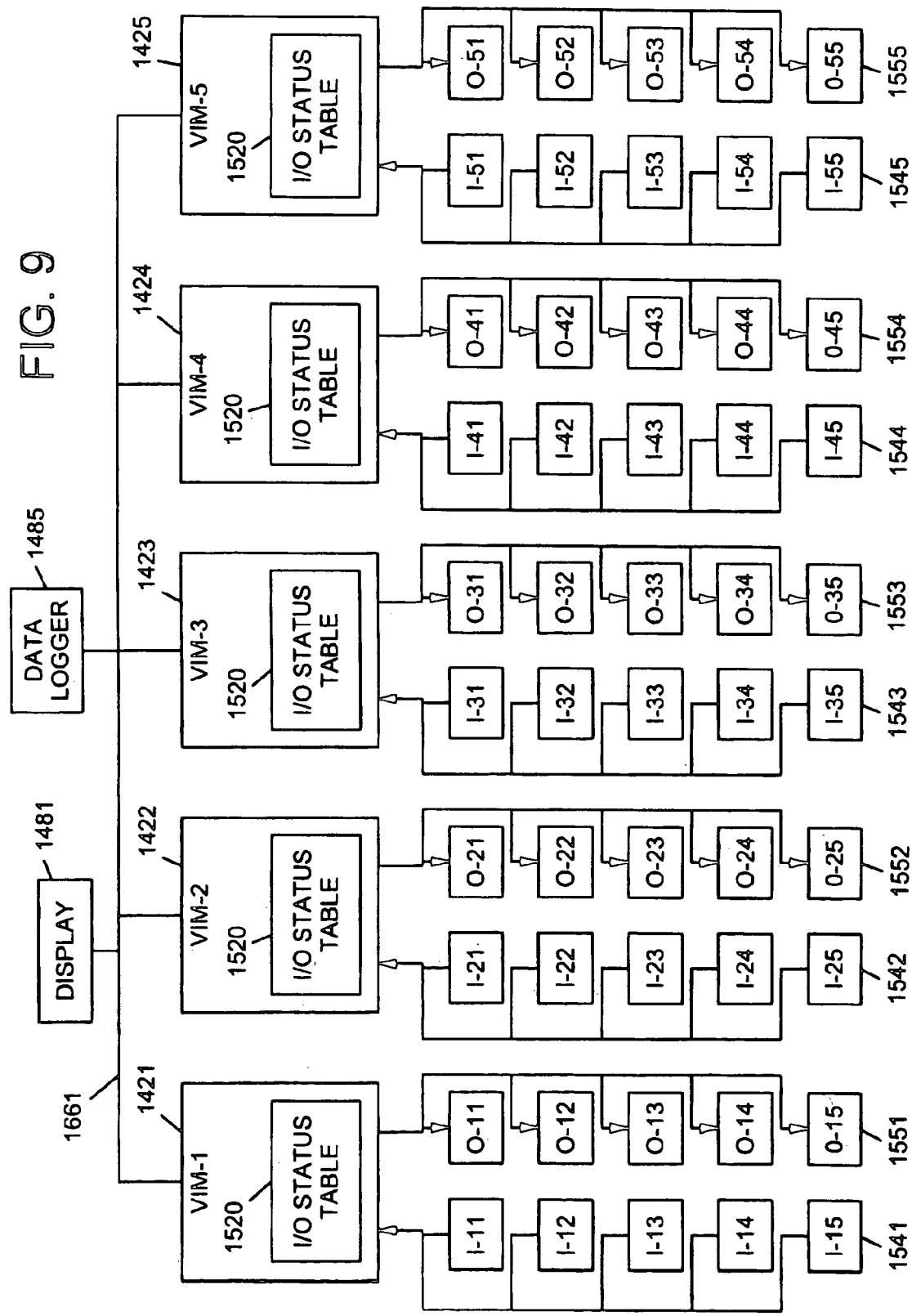
FIG. 9 is a block diagram of the control system of FIG. 5 showing selected aspects of the control system in greater detail.

Referring first to FIG. 9, as previously described, the chassis control system 1511 includes the interface modules 1421-1425, the input devices 1441, and the output devices 1451. Also shown in FIG. 9 are the display 1481, the data logger 1485, and the communication network 1661 which connects the interface modules 1421-1425. In practice, the system may include additional devices, such as a plurality of switch interface modules connected to additional I/O devices, which for simplicity are not shown. The switch interface modules may be the same as the switch interface modules 20 previously described and, for example, may be provided in the form of a separate enclosed unit or in the more simple form of a circuit board mounted with associated switches and low power output devices. In practice, the system may include other systems, such as a display interface used to drive one or more analog displays (such as gauges) using data received from the communication network 1661. Any additional modules that interface with I/O devices preferably broadcast and receive I/O status information and exert local control in the same manner as detailed below in connection with the interface modules 1421-1425. As previously noted, one or more additional communication networks may also be included which are preferably implemented in accordance with SAE J1708/1587 and/or J1939 standards. The communication networks may be used, for example, to receive I/O status information from other vehicle systems, such as an engine or transmission control system. Arbitration of I/O status broadcasts between the communication networks can be performed by one of the interface modules 1420.

To facilitate description, the input devices 1441 and the output devices 1451 have been further subdivided and more specifically labeled in FIG. 9. Thus, the subset of the input devices 1441 which are connected to the interface module 1421 are collectively labeled with the reference numeral 1541 and are individually labeled as having respective input states I-11 to I-15. Similarly, the subset of the output devices 1451 which are connected to the interface module 1421 are collectively labeled with the reference numeral 1551 and are individually labeled as having respective output states O-11 to O-15. A similar pattern has been followed for the interface modules 1422-1425, as summarized in Table I below:

TABLE I

| Interface Module | Input Devices | Input States | Output Devices | Output States |
|---|---|---|---|---|
| 1421 | 1541 | I-11 to I-15 | 1551 | O-11 to O-15 |
| 1422 | 1542 | I-21 to I-25 | 1552 | O-21 to O-25 |
| 1423 | 1543 | I-31 to I-35 | 1553 | O-31 to O-35 |
| 1424 | 1544 | I-41 to I-45 | 1554 | O-41 to O-45 |
| 1425 | 1545 | I-51 to I-55 | 1555 | O-51 to O-55 |

Of course, although five input devices 1441 and five output devices 1451 are connected to each of the interface modules 1420 in the illustrated embodiment, this number I/O devices is merely exemplary and a different number of devices could also be used, as previously described.

The interface modules 1420 each comprise a respective I/O status table 1520 that stores information pertaining to the I/O states of the input and output devices 1441 and 1451. Referring now to FIG. 10, an exemplary one of the I/O status tables 1520 is shown. As shown in FIG. 10, the I/O status table 1520 stores I/O status information pertaining to each of the input states I-11 to I-15, I-21 to I-25, I-31 to I-35, I-41 to I-45, and I-51 to I-55 of the input devices 1541-1545, respectively, and also stores I/O status information pertaining to each of the output states O-11 to O-15, O-21 to O-25, O-31 to O-35, O-41 to O-45, and O-51 to O-55 of the output devices 1551-1555, respectively. The I/O status tables 1520 are assumed to be identical, however, each I/O status table 1520 is individually maintained and updated by the corresponding interface module 1420. Therefore, temporary differences may exist between the I/O status tables 1520 as updated I/O status information is received and stored. Although not shown, the I/O status table 1520 also stores I/O status information for the interface modules 1426-1428 of the variant control system 1512 and the interface modules 1429-1430 of the auxiliary control system 1513.

In practice, although FIG. 10 shows the I/O status information being stored next to each other, the memory locations that store the I/O status information need not be contiguous and need not be located in the same physical media. It may also be noted that the I/O status table 1520 is, in practice, implemented such that different I/O states are stored using different amounts of memory. For example, some locations store a single bit of information (as in the case of a digital input device or digital output device) and other locations store multiple bits of information (as in the case of an analog input device or an analog output device). The manner in which the I/O status table is implemented is dependent on the programming language used and on the different data structures available within the programming language that is used. In general, the term I/O status table is broadly used herein to encompass any group of memory locations that are useable for storing I/O status information.

Also shown in FIG. 10 are a plurality of locations that store intermediate status information, labeled IM-11, IM-21, IM-22, and IM-41. The intermediate states IM-11, IM-21, IM-22, and IM-41 are processed versions of selected I/O states. For example, input signals may be processed for purposes of scaling, unit conversion and/or calibration, and it may be useful in some cases to store the processed I/O status information. Alternatively, the intermediate states IM-11, IM-21, IM-22, and IM-41 may be a function of a plurality of I/O states that in combination have some particular significance. The processed I/O status information is then transmitted to the remaining interface modules 1420.

Figure 11:
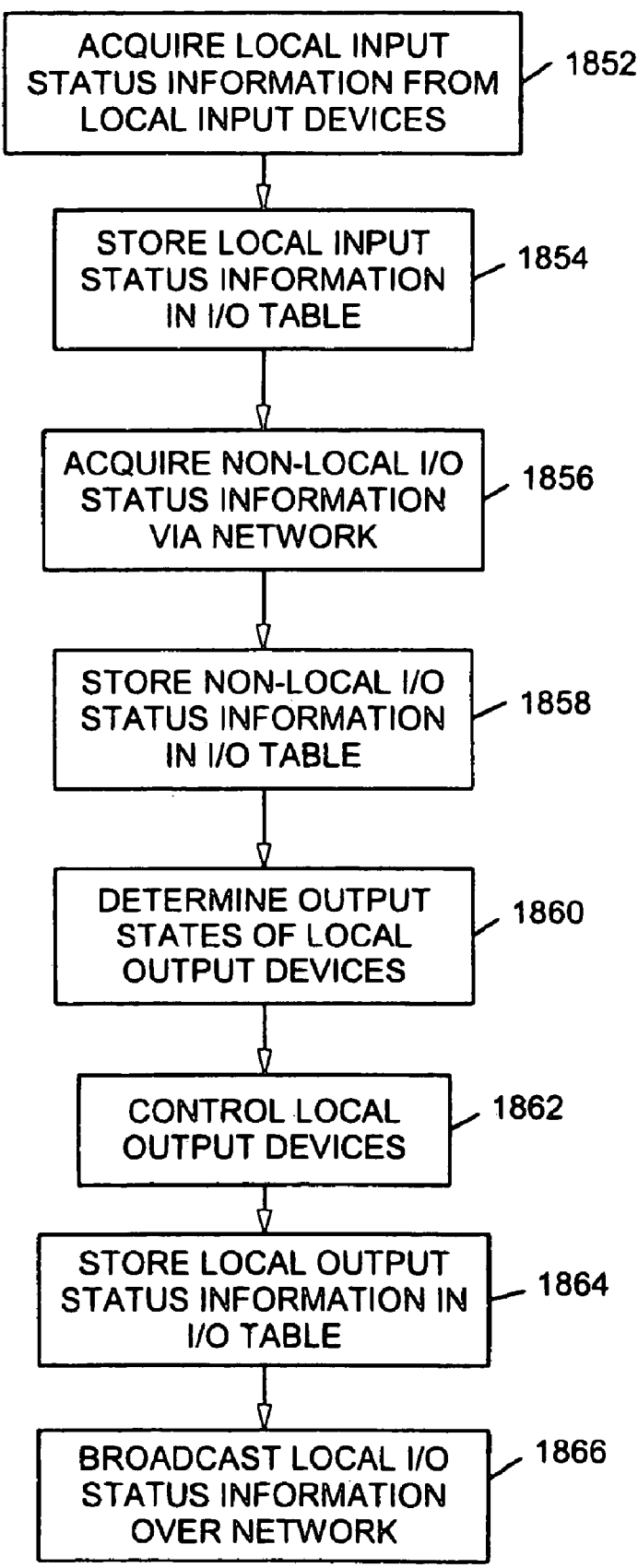
FIG. 11 is a flowchart describing the operation of the control system of FIG. 9 in greater detail.
Figure 12:
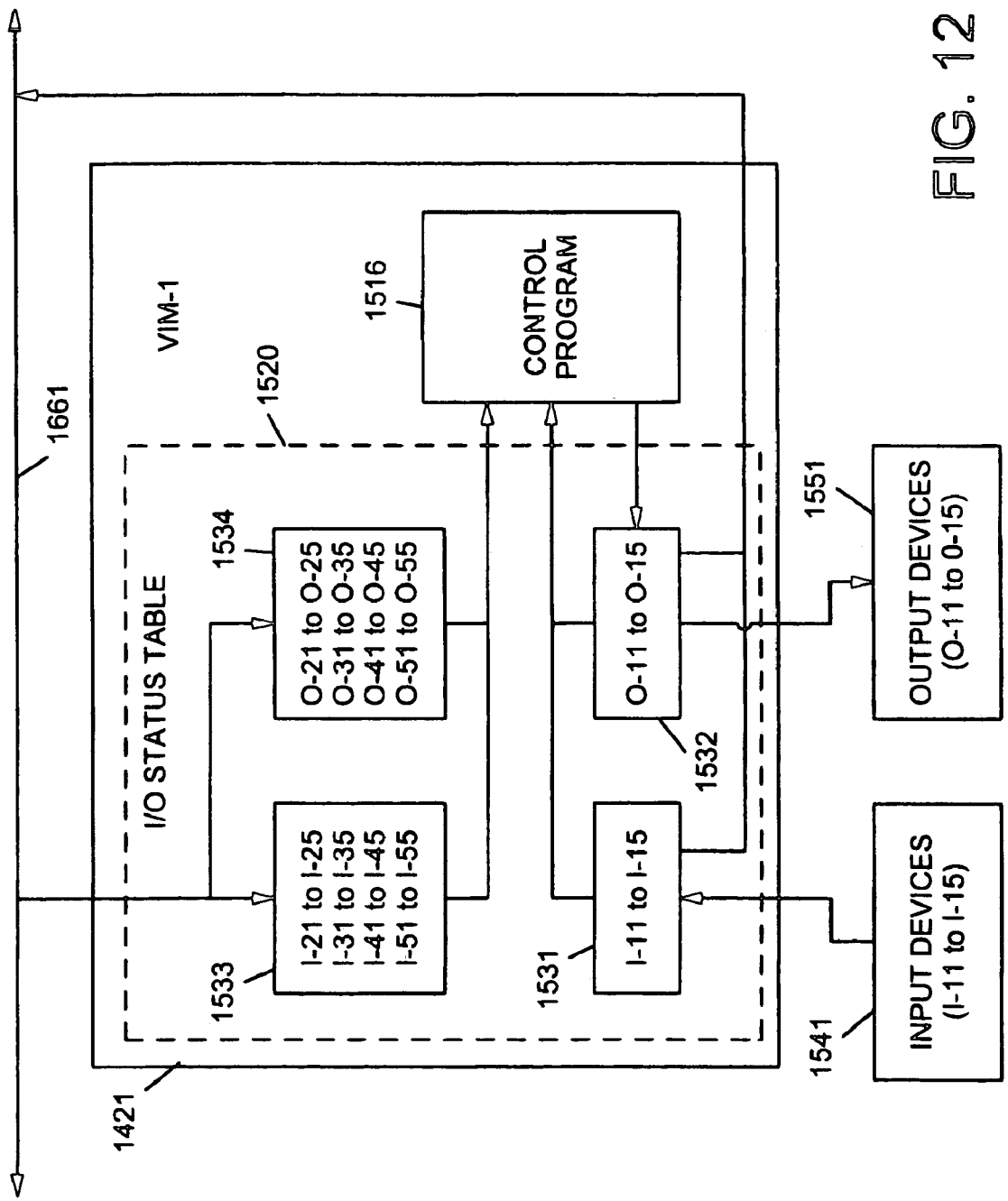
FIG. 12 is a data flow diagram describing data flow through an exemplary interface module during the process of FIG. 11.

Referring now to FIGS. 11-12, FIG. 11 is a flowchart describing the operation of the control system of FIG. 9, and FIG. 12 is a data flow diagram describing data flow through an exemplary interface module during the process of FIG. 11. As an initial matter, it should be noted that although FIG. 11 depicts a series of steps which are performed sequentially, the steps shown in FIG. 11 need not be performed in any particular order. In practice, for example, modular programming techniques are used and therefore some of the steps are performed essentially simultaneously. Additionally, it may be noted that the steps shown in FIG. 11 are performed repetitively during the operation of the interface module 1421, and some of the steps are in practice performed more frequently than others. For example, input information is acquired from the input devices more often than the input information is broadcast over the communication network. Although the process of FIG. 11 and the data flow diagram of FIG. 12 are primarily described in connection with the interface module 1421, the remaining interface modules 1422-1425 operate in the same manner.

At step 1852, the interface module 1421 acquires input status information from the local input devices 1541. The input status information, which pertains to the input states I-11 to I-15 of the input devices 1541, is transmitted from the input devices 1541 to the interface module 1421 by way of respective dedicated communication links. At step 1854, the input status information acquired from the local input devices 1541 is stored in the I/O status table 1520 at a location 1531. For the interface module 1421, the I/O devices 1541 and 1551 are referred to as local I/O devices since the I/O devices 1541 and 1551 are directly coupled to the interface module 1421 by way of respective dedicated communication links, as opposed to the remaining non-local I/O devices and 1542-1545 and 1552-1555 which are indirectly coupled to the interface module 1421 by way of the communication network 1661.

At step 1856, the interface module 1421 acquires I/O status information for the non-local input devices 1542-1545 and the non-local output devices 1552-1555 by way of the communication network 1661. Specifically, the interface module 1421 acquires input status information pertaining to the input states I-21 to I-25, I-31 to I-35, I-41 to I-45, I-51 to I-55 of the input devices 1542-1545, respectively, and acquires output status information pertaining to the output states O-21 to O-25, O-31 to O-35, O-41 to O-45, O-51 to O-55 of the output devices 1552-1555. The input status information and the output status information are stored in locations 1533 and 1534 of the I/O status table 1520, respectively.

At step 1860, the interface module 1421 determines desired output states O-11 to O-15 for the output devices 1551. As previously noted, each of the interface modules 1420 stores a chassis control program 1840, one or more variant control programs 1842, and an auxiliary control program 1844. The interface module 1421 is associated with the chassis control system 1511 and, therefore, executes a portion of the chassis control program 1840. (The portion of the chassis control program 1840 executed by the interface module 1421 is determined by the location of the interface module 1421 on the vehicle 1410, as previously described.) The interface module 1421 executes the chassis control program 1840 to determine the desired output states O-11 to O-15 based on the I/O status information stored in the I/O status table 1520. Preferably, each interface module 1420 has complete control of its local output devices 1450, such that only I/O status information is transmitted on the communication network 1460 between the interface modules 1420.

At step 1862, the interface module 1421 controls the output devices 1551 in accordance with the desired respective output states O-11 to O-15. Once the desired output state for a particular output device 1551 has been determined, control is achieved by transmitting a control signal to the particular output device 1551 by way of a dedicated communication link. For example, if the output is a digital output device (e.g., a headlight controlled in on/off fashion), then the control signal is provided by providing power to the headlight by way of the dedicated communication link. Ordinarily, the actual output state and the desired output state for a particular output device are the same, especially in the case of digital output devices. However, this is not always the case. For example, if the headlight mentioned above is burned out, the actual output state of the headlight may be "off," even though the desired output state of the light is "on." Alternatively, for an analog output device, the desired and actual output states may be different if the control signal is not properly calibrated for the output device.

At step 1864, the interface module 1421 stores output status information pertaining to the desired output states O-11 to O-15 for the output devices 1551 in the I/O status table 1520. This allows the output states O-11 to O-15 to be stored prior to being broadcast on the communication network 1661. At step 1866, the interface module 1421 broadcasts the input status information pertaining to the input states I-11 to I-15 of the input devices 1541 and the output status information pertaining to the output states O-11 to O-15 of the output devices 1551 over the communication network 1661. The I/O status information is received by the interface modules 1422-1425. Step 1866 is essentially the opposite of step 1856, in which non-local I/O status information is acquired by the interface module 1421 by way of the communication network 1661. In other words, each interface module 1420 broadcasts its portion of the I/O status table 1520 on the communication network 1661, and monitors the communication network 1661 for broadcasts from the remaining interface modules 1420 to update the I/O status table 1520 to reflect updated I/O states for the non-local I/O devices 1441 and 1451. In this way, each interface module 1420 is able to maintain a complete copy of the I/O status information for all of the I/O devices 1441 and 1451 in the system.

The interface modules 1423 and 1425 are used to transmit I/O status information between the various control systems 1511-1513. Specifically, as previously noted, the interface module 1423 is connected to both the communication network 1661 for the chassis control system 1511 and to the communication network 1662 for the variant control system 1512. The interface module 1423 is preferably utilized to relay broadcasts of I/O status information back and forth between the interface modules 1421-1425 of the chassis control system 1511 and the interface modules 1426-1428 of the variant control system 1512. Similarly, the interface module 1425 is connected to both the communication network 1661 for the chassis control system 1511 and the to the communication network 1663 for the auxiliary control system 1513, and the interface module 1425 is preferably utilized to relay broadcasts of I/O status information back and forth between the interface modules 1421-1425 of the chassis control system 1511 and the interface modules 1429-1430 of the auxiliary control system 1513.

The arrangement of FIGS. 9-12 is advantageous because it provides a fast and efficient mechanism for updating the I/O status information 1848 stored in the data memory 1834 of each of the interface modules 1420. Each interface module 1420 automatically receives, at regular intervals, complete I/O status updates from each of the remaining interface modules 1420. There is no need to transmit data request (polling) messages and data response messages (both of which require communication overhead) to communicate information pertaining to individual I/O states between individual I/O modules 1420. Although more I/O status data is transmitted, the transmissions require less overhead and therefore the overall communication bandwidth required is reduced.

This arrangement also increases system responsiveness. First, system responsiveness is improved because each interface module 1420 receives current I/O status information automatically, before the information is actually needed. When it is determined that a particular piece of I/O status information is needed, there is no need to request that information from another interface module 1420 and subsequently wait for the information to arrive via the communication network 1661. The most current I/O status information is already assumed to be stored in the local I/O status table 1520. Additionally, because the most recent I/O status information is always available, there is no need to make a preliminary determination whether a particular piece of I/O status information should be acquired. Boolean control laws or other control laws are applied in a small number of steps based on the I/O status information already stored in the I/O status table 1520. Conditional control loops designed to avoid unnecessarily acquiring I/O status information are avoided and, therefore, processing time is reduced.

It may also be noted that, according to this arrangement, there is no need to synchronize the broadcasts of the interface modules 1420. Each interface module 1420 monitors the communication network 1661 to determine if the communication network 1661 is available and, if so, then the interface module broadcasts the I/O status information for local I/O devices 1441 and 1451. (Standard automotive communication protocols such as SAE J1708 or J1939 provide the ability for each member of the network to monitor the network and broadcast when the network is available.) Although it is desirable that the interface modules rebroadcast I/O status information at predetermined minimum intervals, the broadcasts may occur asynchronously.

The technique described in connection with FIGS. 9-12 also provides an effective mechanism for detecting that an interface module 1420 has become inoperable. As just noted, the interface modules 1420 rebroadcast I/O status information at predetermined minimum intervals. Each interface module 1420 also monitors the amount of time elapsed since an update was received from each remaining interface module 1420. Therefore, when a particular interface module 1420 has become inoperable, the inoperability of the interface module 1420 can be detected by detecting the failure of the interface module 1420 to rebroadcast its I/O status information within a predetermined amount of time. Preferably, the elapsed time required for a particular interface module 1420 to be considered inoperable is several times the expected minimum rebroadcast time, so that each interface module 1420 is allowed a certain number of missed broadcasts before the interface module 1420 is considered inoperable. A particular interface module 1420 may be operable and may broadcast I/O status information, but the broadcast may not be received by the remaining interface modules 1420 due, for example, to noise on the communication network.

This arrangement also simplifies the operation of the data logger 1485 and automatically permits the data logger 1485 to store I/O status information for the entire control system 1412. The data logger 1485 monitors the communication network 1661 for I/O status broadcasts in the same way as the interface modules 1420. Therefore, the data logger 1485 automatically receives complete system updates and is able to store these updates for later use.

As previously noted, in the preferred embodiment, the interface modules 1423 and 1425 are used to transmit I/O status information between the various control systems 1511-1513. In an alternative arrangement, the interface module 1429 which is connected to all three of the communication networks 1661-1663 could be utilized instead. Although less preferred, the interface module 1429 may be utilized to receive I/O status information from each of the interface modules 1421-1428 and 1430, assemble the I/O status data into an updated I/O status table, and then rebroadcast the entire updated I/O status table 1520 to each of the remaining interface modules 1421-1428 and 1430 at periodic or aperiodic intervals. Therefore, in this embodiment, I/O status information for the all of the interface modules 1420 is routed through the interface module 1429 and the interface modules 1420 acquire I/O status information for non-local I/O devices 1440 and 1450 by way of the interface module 1429 rather than directly from the remaining interface modules 1420.

4. Additional Aspects

The preferred control systems and methods exhibit enhanced reliability and maintainability because it uses distributed power distribution and data collecting. The interface modules are interconnected by a network communication link instead of a hardwired link, thereby reducing the amount of wiring on the fire truck. Most wiring is localized wiring between the I/O devices and a particular interface module.

Additionally, the interface modules in the preferred systems are interchangeable units. If the control system were also applied to other types of equipment service vehicles (e.g., snow removal vehicles, refuse handling vehicles, cement/concrete mixers, military vehicles such as those of the multipurpose modular type, on/off road severe duty equipment service vehicles, and so on), the interface modules would even be made interchangeable across platforms since each interface module views the outside world in terms of generic inputs and outputs.

B. Turret Control

Referring to FIGS. 13-16, a turret 610 that is controlled by a fire fighting vehicle control system 612 according to another embodiment of the invention is illustrated. The turret control system 612 may be implemented as a stand-alone system or in combination with one of the control system architectures described above. Except as specifically noted, the following discussion is generally applicable to both types of embodiments.

Figure 13:
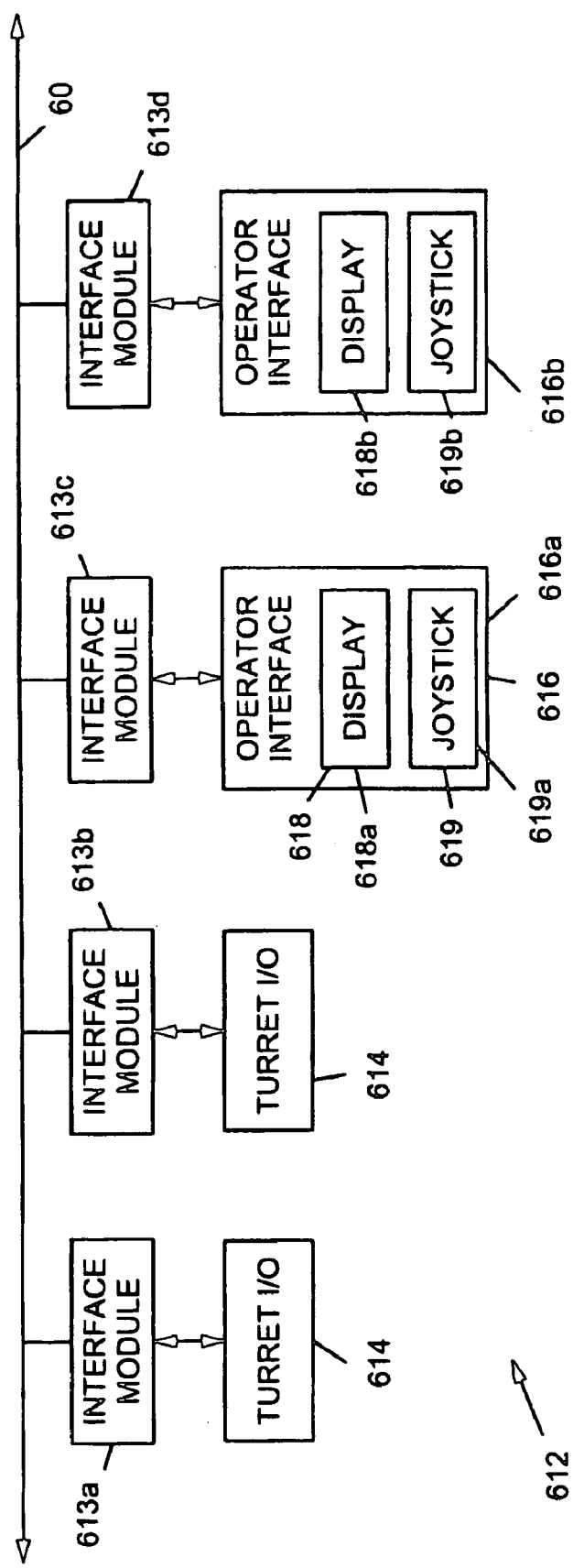
FIG. 13 is a block diagram of a fire fighting control system capable of controlling a turret.

Referring first to FIG. 13, FIG. 13 is an overview of the preferred control system 612 for controlling the turret 610. The control system 612 includes a plurality of interface modules 613a-613d (collectively, "the interface modules 613"), turret I/O devices 614, and one or more operator interfaces 616a and 616b (collectively, "the operator interfaces 616"). The control system 612 may be implemented using the interface modules 613 regardless whether the control system 612 is implemented in combination with the control system 12. If the control system 612 is implemented in combination with the control system-12, then other, non-turret I/O devices may also be coupled to the interface modules 613. If the control system 612 is implemented as a stand-alone control system, then it may be preferable to replace the interface modules 613 with a single stand-alone electronic control unit.

As discussed in greater detail in connection with FIGS. 14-15, the turret I/O devices 614 include actuators, position sensors, limit switches and other devices used to control the turret 610. The operator interfaces 616a and 616b each include display 618a and 618b (collectively, "the displays 618") and joysticks 619a and 619b (collectively, "the joysticks 619"). For example, the operator interface 616a may be located in a driver compartment of the fire fighting vehicle 620 and the other operator interface 616b may be located at another location, such as a rear or side vehicle location of the fire fighting vehicle 620, for example.

Assuming the control system 612 is implemented in combination with the control system 12 (with or without the enhancements of FIGS. 5-12), the interface modules 613 are connected to each other by way of the communication network 60, previously described in connection with FIGS. 1-4. Therefore, the interface modules shown in FIG. 13 are coupled to the same communication network 60 as the interface modules shown in FIGS. 1-4. For simplicity, in describing the turret control system 612, all of the interface modules in the turret control system 612 as well as the interface modules shown in FIGS. 1-4 will be referred to using the reference number 613. As previously described, the interface modules 613 are locally disposed with respect to the respective input and output devices to which each interface module is coupled so as to permit distributed data collection from the plurality of input devices and distributed power distribution to the plurality of output devices. Of course, each of the interface modules 613 may, in addition, be coupled to other non-local input devices and output devices. Further, the control system 612 can also include input devices and output devices which are not connected to the interface modules 613.

It may also be noted that if the control system 12 is employed, it is preferably implemented so as to incorporate the additional features described in connection with FIGS. 5-12. Therefore, all of the interface modules 613 are preferably identically constructed and programmed. Further, each of the interface modules 613 broadcasts I/O status information on the communication network 60, and each of the interface modules 613 uses the I/O status broadcasts to maintain an I/O status table 1520. Based on the I/O status information stored in the I/O status table 1520 maintained by each respective interface module 613, the respective interface module 613 executes pertinent portions of the control programs to control the output devices to which it is directly connected. It may also be noted that the fire fighting vehicle 620 may be implemented as an electric vehicle, as described in connection with FIGS. 25-33 of U.S. Prov. No. 60/360, 479 and U.S. Ser. No. 10/326,907, and/or include the network assisted scene management features of FIGS. 34-41 of U.S. Prov. No. 60/360,479 and U.S. Ser. No. 10/326,907, and/or be implemented to include the network-assisted monitoring, service and/or repair features described in connection with FIGS. 42-67 of U.S. Prov. No. 60/360,479 and U.S. Ser. No. 10/326,907.

Figure 14:
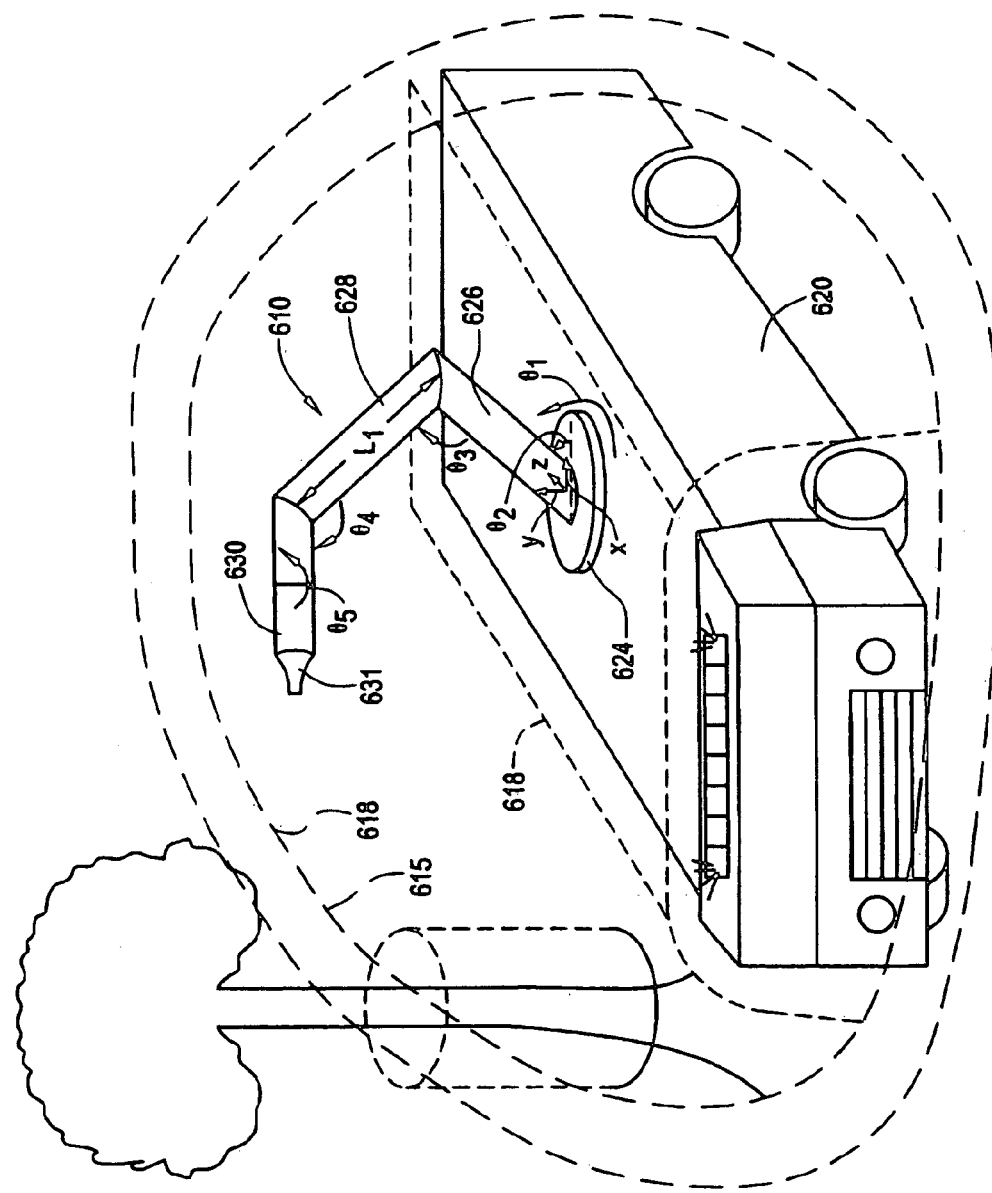
FIG. 14 is a schematic representation of a turret.

Referring now also to FIG. 14, FIG. 14 shows one embodiment of the turret 610, although it should be noted that the teachings herein do not depend on the exact configuration, construction, size or assembly of the turret 610. In this regard, it will be appreciated that the turret 610 is not necessarily drawn to scale in FIG. 14 relative to the fire fighting vehicle 620.

The turret 610 is shown to be of a type used on fire fighting vehicles such as municipal and airport fire trucks, crash trucks, emergency response vehicles, aerial platform trucks, ladder trucks, pumpers, tankers, and so on. Generally, such vehicles have a chassis and a vehicle body mounted on the chassis, with the chassis and vehicle body in combination including an operator compartment capable of receiving a human operator. The operator compartment further includes steering and throttle controls for receiving operator inputs to control movement of the fire fighting vehicle along a road. The turret 610 is mounted to a roof of the fire fighting vehicle 620, and is configured to deploy or dispense a fire fighting agent (i.e., water, foam, foaming agents, etc.). It should be understood that FIG. 15 merely illustrates one embodiment, and the turret 610 may be mounted anywhere and in any manner to the chassis/vehicle body of the fire fighting vehicle 620.

The turret 610 includes an adjustable mount assembly which includes a fire-extinguishing agent delivery system capable of transporting a fire-extinguishing agent through the mount assembly. In one embodiment, the adjustable mount assembly comprises a base 624, a first arm 626, a second arm 628, a third arm 630, and a nozzle 631. The arms 626-630 are hingedly moveable relative to each other and, in combination, form a boom for placing the nozzle 631 in a particular position and orientation. As will be appreciated, the arms 624-626 are not drawn to scale, and may have lengths which are significantly larger than those shown relative to the overall size of the fire fighting vehicle 620. Also, although three arms are shown which are movable in particular directions, fewer or more arms may be used which may be moveable in a different manner.

The base 624 is preferably configured to mount to the top of the fire fighting vehicle 620. In one embodiment, the base 624 is configured to swivel or rotate around an axis, as indicated by θ1. In another embodiment, the base 624 is fixed and is not able to rotate. Assuming that the base 624 is configured to rotate, and referring now also to FIG. 15, the base 624 may be coupled to a motor or other actuator (shown as actuator 632a) which causes the rotation of the base 624 in the direction of θ1. A position indicator or sensor 634a measures movement of the base 624 in the θ1 direction, and a pair of limit switches 636a ascertain whether the base 624 is at one of the boundaries of movement in the θ1 direction.

The first arm 626 is rotatably coupled to the base 624, and is mounted for hinged movement, as indicated by θ2. The first arm 626 may be coupled to a motor or other actuator (shown as actuator 632b) which causes the rotation of the first arm 626 around θ2. A position sensor 634b measures movement of the first arm 626 in the θ2 direction, and a pair of limit switches 636b ascertain whether the first arm 626 is at one of the boundaries of movement in the θ2 direction.

The second arm 628 is rotatably coupled to the first arm 626 and is mounted for hinged movement, as indicated by θ3. The second arm 628 may be coupled to a motor or other actuator (shown as actuator 632c) which causes the rotation of the second arm 628 around θ3. A position sensor 634c measures movement of the second arm 628 in the θ3 direction, and a pair of limit switches 636c ascertain whether the second arm 628 is at the one of the boundaries of movement in the θ3 direction.

The second arm 628 may also have a length which is adjustable (i.e., extendable or retractable) as indicated by L1. The second arm 628 may further be coupled to a motor or other actuator (shown as actuator 632d) which causes the extension of the second arm 628 along L1. Adjustments along L1 allow for changes in the height of the turret 610 without requiring the rotation of any arm. A position sensor 634d measures movement of the second arm 628 in the L1 direction, and a pair of limit switches 636d ascertain whether the second arm 628 is at one of the boundaries of movement in the L1 direction.

The third arm 630 is rotatably coupled to the second arm 628, and is mounted for hinged movement, as indicated by θ4. The third arm 630 may be coupled to a motor or other actuator (shown as actuator 632e) which causes the rotation of the third arm 630 around θ4. A position sensor 634e measures movement of the third arm 630 in the θ4 direction, and a pair of limit switches 636e ascertain whether the third arm 630 is at the one of the boundaries of movement in the θ4 direction.

The third arm 630 may also swivel around a vertical axis, as indicated by θ5. The third arm 630 may further be coupled to a motor or other actuator (shown as actuator 632f) which causes the rotation of the third arm 630 around θ5. A position sensor 634f measures movement of the third arm 630 in the θ5 direction, and a pair of limit switches 636f ascertain whether the third arm 630 is at the one of the boundaries of movement in the θ5 direction.

The base 624, the first arm 626, the second arm 628, and the third arm 630 are fluidly connected, allowing the flow of a fire fighting agent to pass from the base 624 to the third arm 630. Fire fighting agent enters the base 624 from a source such as a pump, hydrant, pipe, etc. The nozzle 631 is mounted on a free end of the third arm 630 and receives the fire-extinguishing agent transported by the arms 626-630. The position and orientation of the nozzle 631 are controlled by a turret controller 660 (discussed below in connection with FIG. 16) to direct the flow of fire fighting agent toward an intended target or other region of interest such as a fire, chemical spill, etc. Furthermore, the nozzle 631 may be capable of controlling the flow rate of fire fighting agent (as indicated by F1). The nozzle 631 may further be coupled to a motor or actuator (shown as actuator 632g) which controls the flow rate setting for the nozzle 631. A position or flow rate sensor 634g measures the nozzle setting, and a set of switches or other sensors 636g provide information regarding whether the setting of the nozzle 631 is at particular levels (e.g., full on, full off). The flow rate sensor 634g may measure the flow rate at the nozzle 631, or may measure the amount of fire fighting agent remaining in an on-board storage tank and deduce flow rate by calculating the rate of change in the amount of remaining fire fighting agent.

In an exemplary embodiment, the turret 610 is a Snozzle Model C-50 or 50A available from Crash Rescue Equipment Service, Inc. of Dallas, Tex. In an alternative embodiment, the turret 610 is a Snozzle Model P-50 or 50A also available from Crash Rescue Equipment Service, Inc. of Dallas, Tex. In another alternative embodiment, the turret 610 may be a Rhino Bumper Turret available from Crash Rescue Equipment Service, Inc. of Dallas, Tex. As previously indicated, however, the particular configuration of the turret is not important and other turret systems from other manufacturers could also be used.

Figure 15:
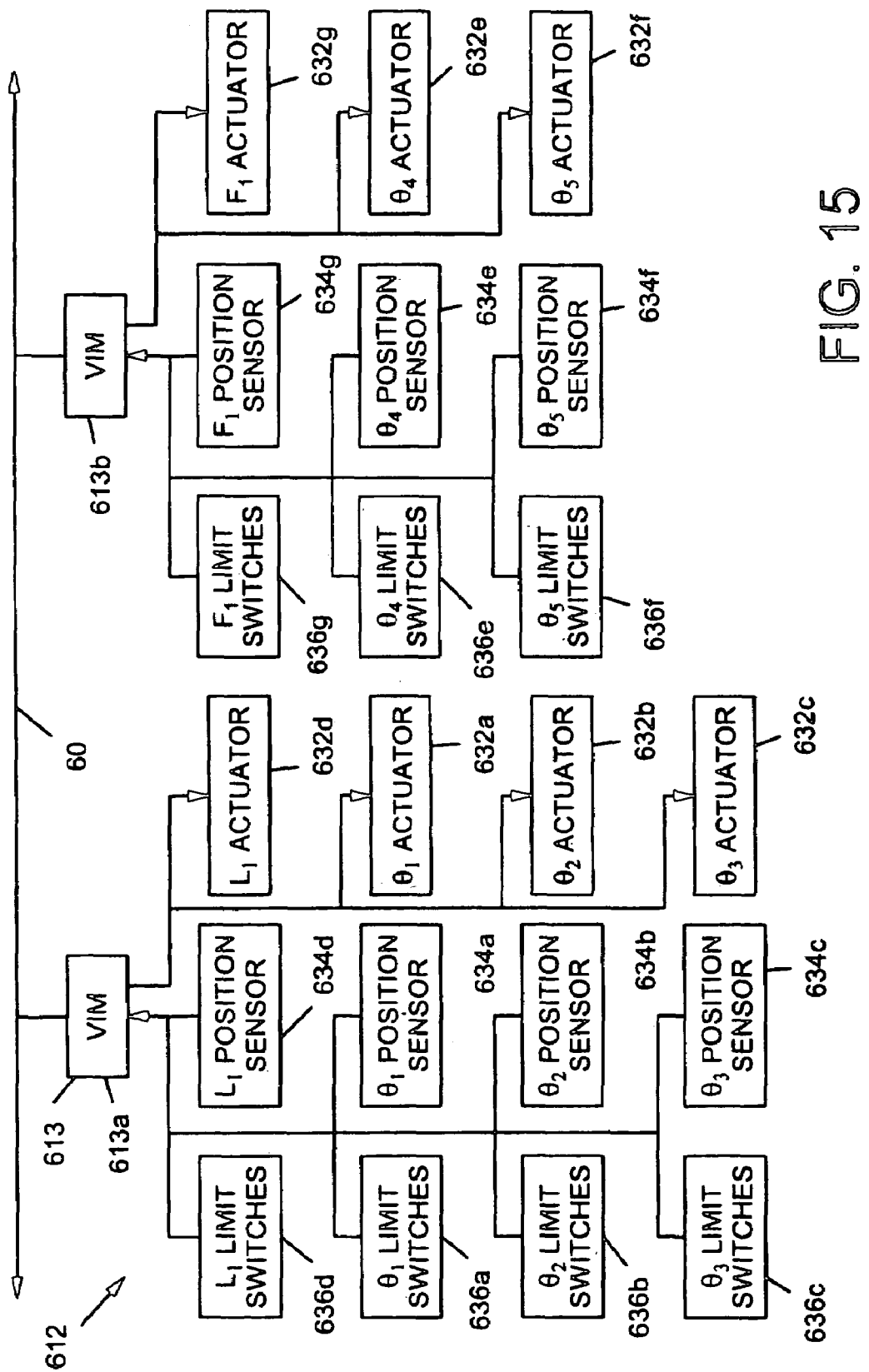
FIG. 15 is a block diagram of turret I/O devices connected to interface modules in the control system of FIG. 13.

As shown in FIG. 15, the position indicators or sensors 634a-634g (collectively, "the position sensors 634") and the limit switches 636a-636g (collectively, "the limit switches 636") are connected as input devices to the interface modules 613a-613b. The interface modules 613a-613b thereby receive the position information pertaining to the position and orientation of the nozzle 631. The actuators 632a-632g (collectively, "the actuators 632") are connected as output devices to the interface modules 613a-613b. The interface modules 613a-613b provide the actuators 632 with control signals to adjust the base 624 and the arms 626-630 to thereby adjust the position and orientation of the nozzle 631. The actuators 632, the position sensors 634 and the limit switches 636 collectively correspond to "the turret I/O devices" which are labeled with the reference number 614 in FIG. 13. Other I/O devices may also be used. The interface module 613a may be located near the nozzle 631 of the turret 610 and the interface module 613b may be located near the base 624 of the turret 610, with the turret I/O devices 614 preferably being connected to a particular interface module 613a, 613b based on location.

In one embodiment, the portion of the communication network that connects the interface module 613a to the remainder of the control system 612 is implemented using a wireless link. The wireless link may be implemented by providing the interface module 613a with a wireless RF communication interface such as a Bluetooth interface. A wireless link may be advantageous in some instances in order to eliminate maintenance associated with a network harness that extends from the main vehicle body along the articulated arms 626-630. Also, given that portions of the network harness can be positioned at significant distances from the center of gravity of the vehicle 620, the use of a wireless link is advantageous in that it reduces the weight of the articulated arm, thereby enhancing the mechanical stability of the vehicle 620. Again, it may also be noted that it is possible to provide all of the interface modules on the vehicle 620 with the ability to communicate wirelessly with each other (e.g., using Bluetooth), thereby completely eliminating the need for a separate network harness.

The position sensors 634 may be encoders, resolvers or other suitable position measuring devices. The actuators 632 may be electric motors, especially if the fire fighting vehicle is implemented as an electric vehicle (for example, the electric vehicle 1910 described in connection with FIGS. 25-33 of U.S. Prov. No. 60/360,479 and U.S. Ser. No. 10/326,907). Alternatively, the actuators 632 may for example be electrically controlled valves that control the flow of hydraulic power to the turret if turret movement is hydraulically driven. Other arrangements could also be used.

The joysticks 619 are preferably multi-axis joysticks, with the control system 612 being capable of receiving operator inputs from either joystick 619*a*, 619*b* and using the operator inputs to control the turret 610, as detailed below. In one embodiment, the joysticks are three-axis joysticks, with left to right corresponding to boom up and boom down (θ2 and θ3 control), forward and back corresponding to nozzle up and nozzle down (θ4 control), and twist corresponding to nozzle left and nozzle right (θ5 control). In this configuration, the base 624 is held stationary. Additional or alternative operator input devices may be used if the base 624 is not held stationary, if the joysticks 619 are implemented using two-axis joysticks rather than three-axis joysticks, or if a different type of operator input device is desired. In practice, the configuration of the joysticks may vary from system to system depending on user preferences. As described in greater detail below, in an alternative embodiment, the fire fighting vehicle 620 includes two turrets, with each of the joysticks 619*a* and 619*b* being useable to control either or both turrets, depending on how the turret controller 660 is configured.

Because the joysticks 619 are coupled to the actuators 632 through the turret controller 660, the turret controller 660 can process the operator inputs from the joysticks 619 to provide user-friendly control of the actuators 632. For example, the turret controller 660 may be programmed to increase the speed of movement of the turret 610 as the operator maintains a particular joystick position. For example, if the operator holds the joystick 619*a* or 619*b* in the left position, the speed of upward movement of the boom may be programmed to increase the longer the joystick-left position is maintained.

Figure 16:
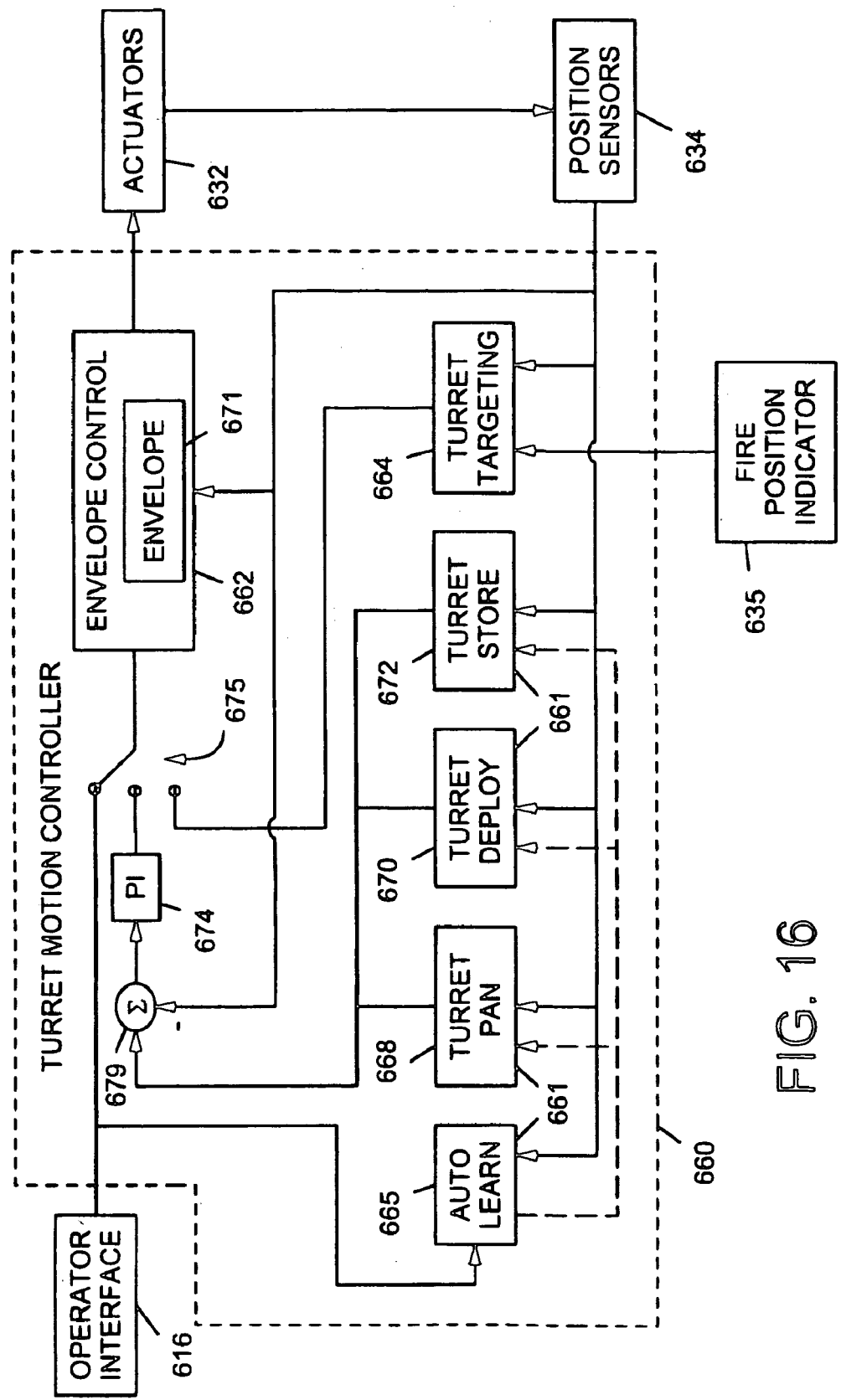
FIG. 16 is a block diagram showing selected aspects functions of the control system of FIG. 13 in greater detail.

Referring now to FIG. 16, the arrangement of FIGS. 13-15 can be used to implement a variety of advantageous features, such as turret envelope control, turret targeting, turret pan, turret deploy, turret store and other features. FIG. 16 is a block diagram of a turret control system that implements such features. The turret control system 612 comprises the operator interface 616, a turret motion controller 660, the actuators 632, the position sensors 634, and a plurality of other input devices such as a fire position indicator 635, described in greater detail below.

In the preferred embodiment, the turret motion controller 660 is implemented using interface modules, and preferably comprises the interface modules 613*a* and 613*b* of FIG. 13. According to this arrangement, and as previously indicated, all of the interface modules 613 are preferably identically programmed, and the interface modules 613 each include control programs which implement a plurality of control modules 661 including an envelope control module 662, a turret targeting module 664, a turret learn module 665, a turret pan module 668, a turret deploy module 670, and a turret store module 672. The interface module 613*a* then receives I/O status information from other interface modules 613 through I/O status broadcasts, and maintains an I/O status table 1520 based on the I/O status broadcasts and based on locally acquired/determined I/O status information. The interface module 613*a* then controls the actuators 632*a*-632*d* by executing those portions of the control programs pertinent to the actuators 632*a*-632*d* and using the I/O status information stored in its I/O status table 1520. The interface module 613*b* operates in the same manner, except that it controls the actuators 632*g*-632*f* by executing those portions of the control programs pertinent to the actuators 632*g*-632*f*. As a practical matter, there is a significant of overlap between the portions of the control program pertinent to the actuators 632*a*-632*d* and the portions of the control program pertinent to the actuators 632*e*-632*g*. The interface modules 613*c* and 613*d* are not shown in FIG. 16, although it is to be understood that the input information from the operator interfaces 616 is received by the interface modules 613*c* and 613*d* and transmitted from the interface modules 613*c* and 613*d* to the interface modules 613*a* and 613*b* in the form of an I/O status broadcast over the communication network 60.

The envelope control, turret targeting, turret pan, turret deploy, turret store and other features will now be described in greater detail.

1. Envelope Control

As shown in FIG. 16, the motion controller 660 has an envelope control module 662 that provides envelope control to improve turret guidance, safety, and crash avoidance. The motion controller 660 assists a human turret operator who may have obscured vision from smoke, debris, buildings, etc., and who is susceptible to controlling the turret 610 so as to inadvertently cause the turret 610 to collide with an object within the range of motion of the turret 610. Thus, as shown in FIG. 13, the turret 610 has a maximum overall range of motion (i.e., a limit or the maximum extent which the turret can physically extend) shown as a boundary 615. Within the boundary 615 are obstructions that the turret 610 is susceptible to impacting. The obstructions may include, for example, portions of the vehicle 620. A permissible travel envelope 618, shown in FIG. 14, shows the three-dimensional space within the overall range of motion which does not include the obstructions, and therefore within which the turret 610 may safely be positioned and move. It should be noted that the shape of the range of motion as well as the envelope 618 are shown only as examples, and that a wide variety of shapes, configurations, and arrangements may be used according to these teachings. The control system 612 provides capabilities to identify the location of objects within the range of motion of the turret 610 (such as the cab or chassis of the fire fighting vehicle, as well as other objects) to avoid collision with those objects.

In describing operation of the envelope control module 662, it is initially assumed that the envelope control module 662 is used when a human operator is controlling the turret 610 using the operator interface 616 (although, as detailed below, the envelope control module 662 is also useable when the turret 610 is under control of one of the modules 664, 668, 670, or 672). In this case, the modules 664, 665, 668, 670, 672 and 674 and the fire position indicator 635 are not active.

Figure 17:
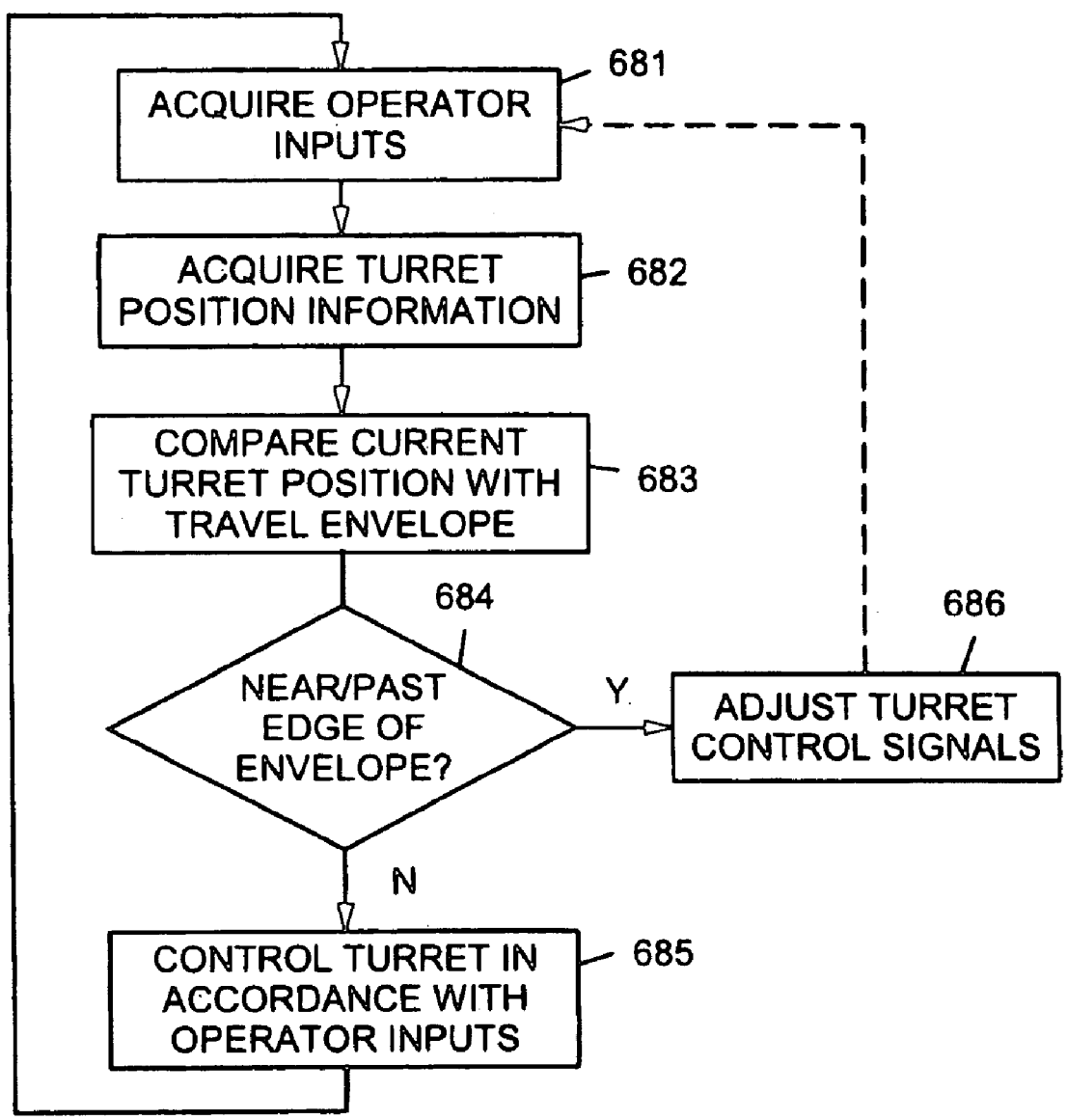
FIG. 17 is a flowchart showing a method for constraining a turret to a permissible travel envelope.

The operation of the turret controller 660 and particularly the envelope control module 662 is described in greater detail in connection with the flowcharts of FIGS. 17-19. Referring first to FIG. 17, at step 681, operator inputs are received from one of the operator interfaces 616 and transmitted by the appropriate interface module 613c or 613d in the form of an I/O status broadcast to all of the interface modules including the interface modules 613a-613b, which form the turret motion controller 660. The turret motion controller 660 acquires the operator inputs and processes (e.g., scales, amplifies, power conditions, etc.) the inputs to generate control signals to control motion of the turret 610. As originally acquired, the operator inputs may direct movement of the turret 610 in such a way that the turret 610 is susceptible to impacting the fire fighting vehicle 620. The operator inputs are also provided to the envelope control module 660 (the above-mentioned processing may be performed before and/or after the operator inputs are provided to the envelope control module 660). Schematically, a selector switch 675 is shown in FIG. 16 to indicate that the envelope control module 662 uses inputs from one of the operator interfaces 616 as opposed to inputs from one of the modules 664, 668, 670, 672, but it will be understood that the selector switch 675 is representative of logic that is implemented the control program executed by the turret motion controller 660.

At the same time, at step 682, the position of the actuators 632 is monitored by the position sensors 634, and the current position of the actuators 632 is fed back to the envelope control module 662. At step 683, the envelope control module 662 compares the current position of the turret 610 with a representation 671 of the permissible travel envelope for the turret 610 and, at step 684, it is determined whether the turret 610 is near/past the edge of the envelope or is otherwise susceptible to impacting the vehicle 620. Steps 683-84 are described in greater detail below. At step 685, when the turret 610 is not near/past the edge of the envelope, the turret motion controller 660 operates essentially as a pass-through device, and passes the inputs received from the joystick 619a or 619b along to the actuators 632 without intervention. Alternatively, at step 686, when the turret 610 is near the edge of the operating envelope, or is past the edge of the operating envelope (depending on how steps 683-84 are implemented, as described below), the envelope control module 662 becomes active and provides the actuators 632 with different control signals to alter a path of travel of the turret 610, e.g., to prevent the turret 610 from traveling outside the permissible travel envelope and thus prevent the turret 610 from impacting the vehicle 620.

The specific manner of operation of the envelope control module 662 at steps 683-84 depends in part on the scheme that is used to store the representation 671 of the permissible travel envelope. The representation 671 may be a data set of positions, coordinates, positional/axis limits, boundaries, and so on. According to one preferred embodiment, the representation 671 is stored in the form of permissible or impermissible combinations of values for the parameters $\theta 1$, $\theta 2$, $\theta 3$, $\theta 4$, $\theta 5$ and L1. Thus, the ranges of values of the parameters $\theta 1$, $\theta 2$, $\theta 3$, $\theta 4$, $\theta 5$ and L1 that would cause a portion of the turret 610 to occupy the same space as part of the fire fighting vehicle 620, as well as a buffer zone surrounding the fire fighting vehicle 620, are determined and stored to form the representation 671. For example, the representation may store limit information such that, when the turret 610 is near the store position (the position where the turret 610 is stored during vehicle travel) as indicated by the $\theta 1$, $\theta 2$, $\theta 3$, and $\theta 4$ values, the $\theta 5$ value must be approximately zero (i.e., the turret nozzle 631 must not be angularly displaced to the left or the right) to avoid the turret nozzle 631 colliding with other structure (e.g., emergency lights) on the roof of the fire fighting vehicle 620. The turret 610 may then be controlled so as to avoid these combinations of values for the parameters $\theta 1$, $\theta 2$, $\theta 3$, $\theta 4$, $\theta 5$ and L1 and thereby avoid impacting the fire fighting vehicle 620.

According to another preferred embodiment, the representation 662 is a data set containing (X,Y,Z) coordinates that the turret may safely/permissibly occupy or not occupy. Specifically, an XYZ vehicle coordinate system is established for the fire fighting vehicle 620 with the base 624 at the origin of the coordinate system (see FIG. 13). The overall range of motion of the turret 610 around the fire fighting vehicle 620 is determined based on the lengths and relative angles of the arms 626-630 of the turret 610. The space around the fire fighting vehicle 620 is then divided into volume elements, with each X,Y,Z coordinate being located within a respective volume element. The representation 671 is then constructed by defining which volume elements are inside the permissible travel envelope and which volume elements are outside the permissible travel envelope. Assuming initially that the main obstruction to be avoided is the fire fighting vehicle 620, the permissible travel envelope may be defined (typically, in advance of vehicle deployment) based on the known dimensions of the fire fighting vehicle 620 relative to the origin of the vehicle coordinate system.

Figure 18:
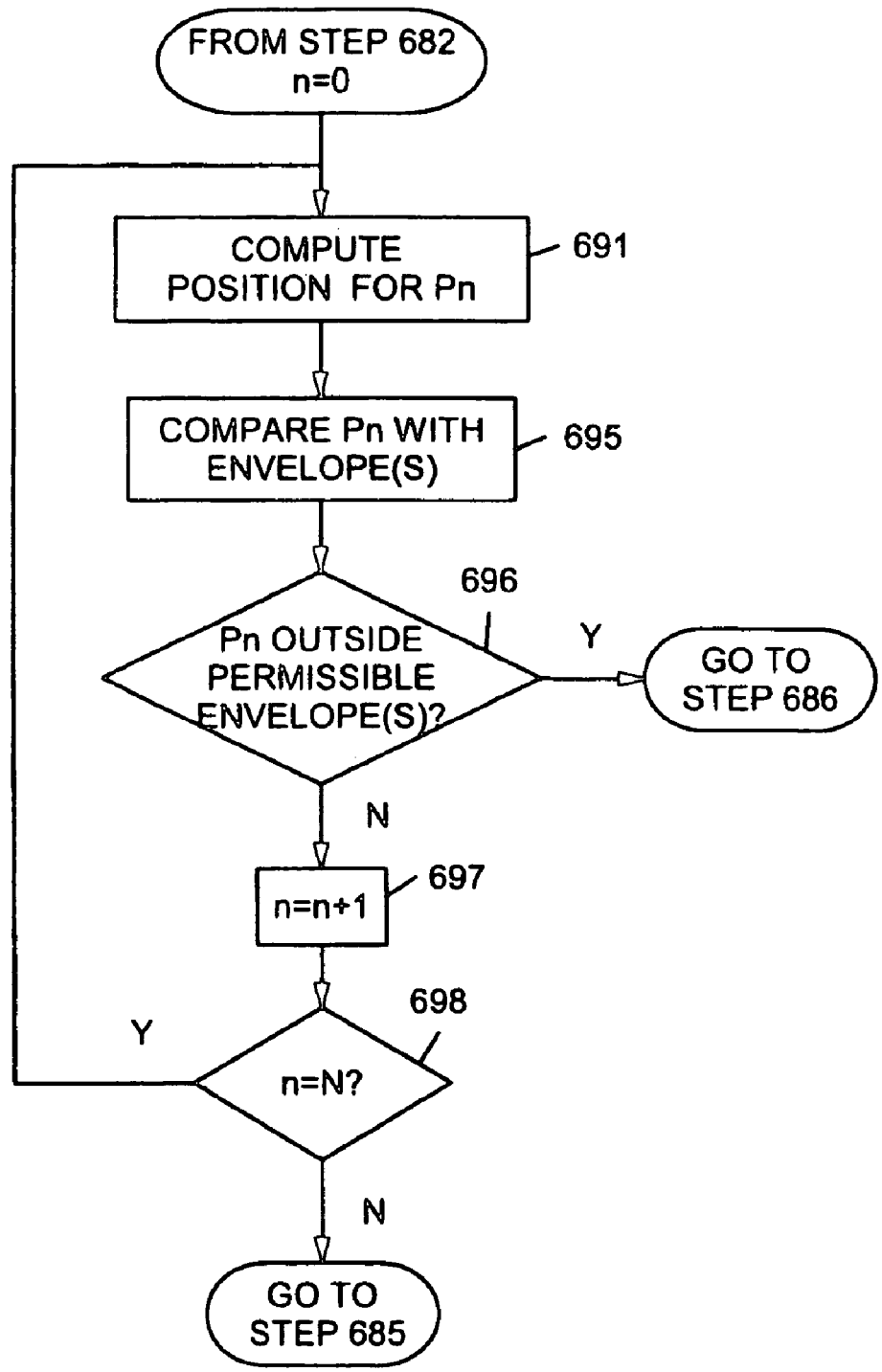
FIG. 18 is a flowchart showing a method for determining the position of the turret relative to the permissible travel envelope in connection with the method of FIG. 17.
Figure 19:
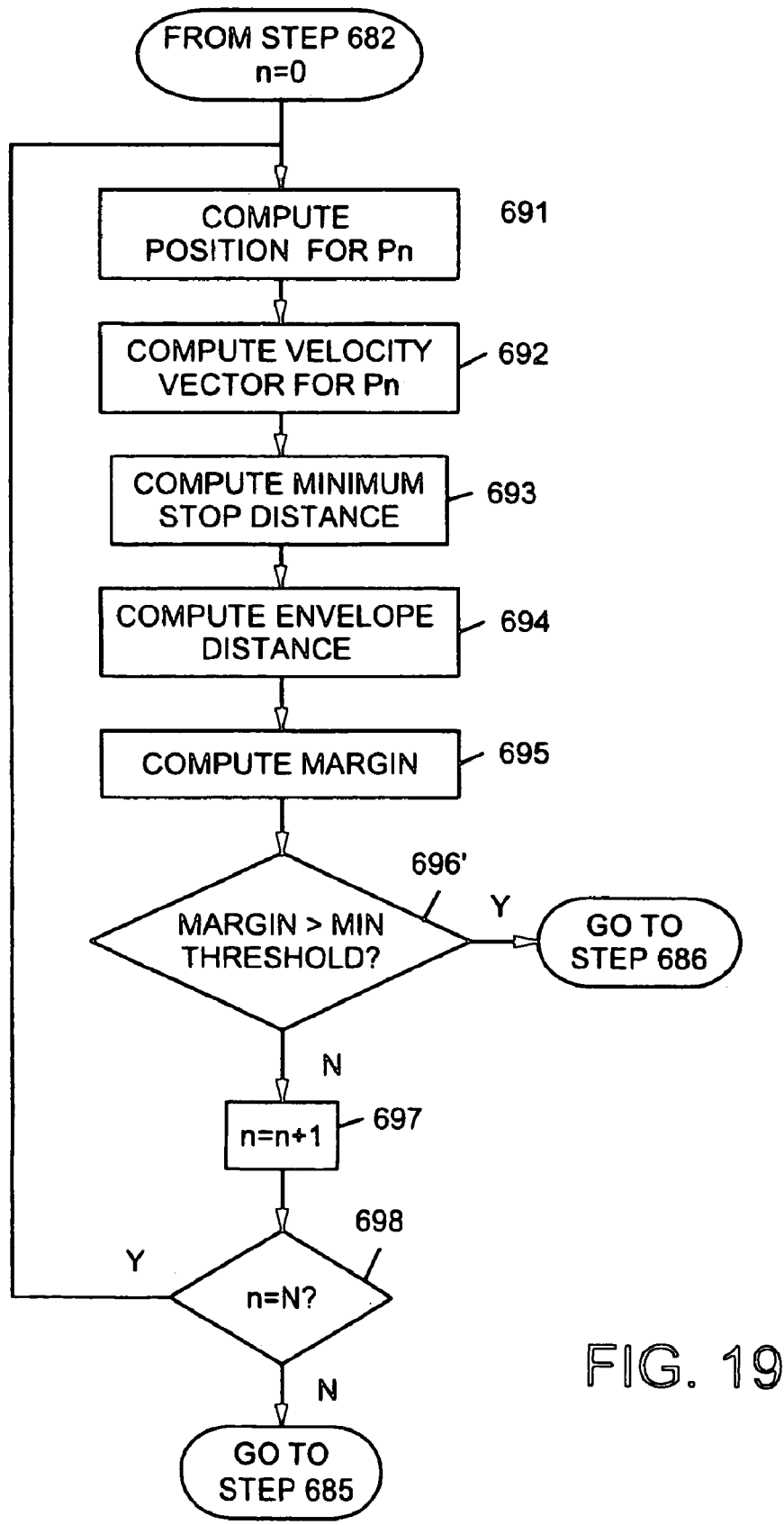
FIG. 19 is a flowchart showing a method for determining the position of the turret relative to the permissible travel envelope in connection with the method of FIG. 17.

Assuming the representation 671 is constructed in this manner, then FIGS. 18-19 show exemplary techniques for performing steps 683-684 in FIG. 17, although of course other techniques may also be used. For the techniques of FIGS. 18-19, the turret 610 is modeled as a series of points P0 . . . PN. For example, the point P0 may be at the base. 624, and the point PN may be located at a tip of the nozzle 631 with additional points (e.g., in the range of tens or hundreds) located along the arms 626-630 between the base 624 and the nozzle 631. Because the overall geometry of the turret 610 is known (including the lengths of the arms 626-630), and because the angles $\theta 1$, $\theta 2$, $\theta 3$, $\theta 4$, $\theta 5$ and L1 are measured by the position sensors 634, and because the position of the points P0 . . . PN is defined relative to the turret arms 626-630 (that is, the position of a given point along a particular one of the arms 626-630 is defined), the position of each point P0 . . . PN in the vehicle coordinate system can be calculated at any time.

Referring first to FIG. 18, at step 691, the envelope control module 662 computes the position for a particular point Pn (initially P0 and incrementing through PN). After being calculated, the position of each point Pn is then compared with the representation 671 of the permissible travel envelope to assess the position of the turret 610 relative to the permissible travel envelope. In one embodiment (FIG. 18), the position of point Pn is simply compared at step 695 with the representation 671 to assess whether the point Pn is inside or outside the permissible travel envelope. In this embodiment, the permissible travel envelope is defined sufficiently small such that a buffer zone exists between the permissible travel envelope and the fire fighting vehicle 620. The buffer zone is made sufficiently large that enough time exists for the turret 610 to come to a complete stop after it has been detected that the turret 610 has left the permissible travel envelope and after the control signals to the actuators 632 have been adjusted to stop movement of the turret 610, and further taking into account the maximum speed/momentum of the turret 610. Therefore, in this embodiment, once it is determined at step 696 that the point Pn is outside the envelope, the control signals transmitted to the actuators 632 are adjusted so as to cause the turret 610 to slow to a stop as soon as possible. Once the turret 610 comes to a stop, a warning is provided to the operator (e.g., a flashing red light), and the operator is then permitted to manually override the envelope control module 662 and move the turret 610 back into the permissible travel envelope. Alternatively, the turret motion controller 660 may provide control signals to the actuators 632 which cause the actuators 632 to retrace their values before leaving the permissible travel envelope, so that the turret 610 is automatically returned to the permissible travel envelope. If the point Pn is not outside the permissible travel envelope, then n increments and the process is performed again for the next point Pn+1 along the turret 610 (steps 697 and 698).

In another embodiment, the envelope control module 662 takes into account the velocity of the turret 610 and causes the turret 610 to slow down before reaching the edge of the permissible travel envelope. This allows the permissible travel envelope to be defined so as to encompass more of the overall range of motion of the turret 610, because it is not necessary to define the permissible travel envelope with a large buffer zone between the permissible travel envelope and the fire fighting vehicle 620.

To this end, a turret velocity is calculated, for example, by subtracting the previous position from the current position and dividing by the amount of time elapsed (e.g., a control logic update cycle) since the position for the point Pn was previously calculated. Preferably, the turret controller 660 is implemented such that the processes of FIGS. 17-18 (as well as FIG. 17 and FIG. 19) is performed once per update cycle of the control logic that implements the turret controller 660, with the update cycles occurring at fixed intervals, e.g., every few hundred microseconds or less. The foregoing calculation results in a velocity vector since the turret position is known in three dimensions. It may also be desired to calculate an average velocity vector by averaging the instantaneous velocity vector over numerous update cycles to reduce the effects of noise. Further, it may also be desirable to calculate an acceleration vector if a higher level of sophistication is required.

Based on the velocity, multiple representations 671 of the permissible travel envelope are then used and compared against the actual position of the turret 610. For example, a multi-tier comparison scheme may be used wherein each point is compared to multiple representations 671 of the permissible travel envelope at step 695. Depending on which envelopes a given point Pn is determined to have exited at step 696, a warning may be provided to the operator (e.g., a flashing yellow light) and the turret 610 may be caused to slow down (for an inner envelope), or the turret 610 may be brought to an immediate stop (for an outer envelope). Whether a particular envelope merely causes a warning light or instead causes the turret 610 to be brought to a stop is then varied as a function of the speed of the turret 610.

FIG. 19 shows another embodiment in which the velocity and acceleration of the turret 610 are computed in real time to obtain a dynamic assessment of the motion of the turret 610 relative to the permissible travel envelope. FIG. 19 is similar to FIG. 18 and includes many of the same steps of FIG. 18. Only the steps that are different will be discussed.

Thus, in FIG. 19, at step 692, the velocity and acceleration of the turret 610 are computed for each of the points P0 . . . PN. For each point, at step 693, the turret motion controller 662 then computes a stop distance, or the minimum amount of distance that would be traveled by the point Pn were the turret 610 brought to a stop, based on the current velocity and acceleration of the point Pn. At step 694, the distance between the turret 610 and the permissible travel envelope is then computed along the current trajectory of the point Pn, and this stop distance is then compared at step 695 to the envelope distance to the determine a margin therebetween. At step 696,' if the margin is below a predetermined threshold, then the turret motion controller 662 brings the turret 610 to an immediate stop and operates in generally the same manner as described in the above when the turret 610 enters the buffer zone. Alternatively, the turret motion controller 660 may adjust the motion of the turret 610 to permit the turret 610 to continue moving without leaving the permissible travel envelope. For example, if the operator is commanding the turret 610 to move down and to the left, but motion to the left would cause the turret 610 to collide with a portion of the fire fighting vehicle 620, then the turret motion controller 660 may operate so as to cause downward but not leftward movement of the turret 610. In another alternative embodiment, when the turret 610 is traveling towards an edge of the permissible travel envelope, multi-tiered threshold levels may be used to cause the turret 610 to slow as the turret 610 nears the edge of the permissible travel envelope, in a manner akin to the multi-tiered envelopes described above.

It may be noted that the permissible travel envelope is smaller than the size of the overall range of motion of the turret 610. Any range of motion beyond the overall range of motion is inherently excluded in the permissible travel envelope. Because the turret 610 cannot physically travel beyond the range of motion, the permissible travel envelope already inherently excludes this space and there is no need to model this space. To the extent that certain ranges of motion are excluded (e.g., certain combinations of angles or XYZ positions are not allowed) the permissible travel envelope is necessarily smaller than the overall range of motion.

According to another embodiment, the permissible travel envelope may be determined and stored in real time. For example, a plurality of sensors (e.g., ultrasonic sensors) may be mounted to the turret 610 to provide the turret controller 660 with information regarding approaching obstructions. This permits the permissible travel envelope to be defined in a manner which takes into account obstructions 625 that are not part of the vehicle 620 and therefore are not necessarily known in advance of when the vehicle 620 arrives at the scene of a fire. Thus, if the turret controller 660 detects an obstruction within a predetermined distance of the turret 610, the turret controller 660 may bring the turret 610 to a stop or alter the path of movement of the turret 610. A combination of this approach and the approaches described above may also be used. Other embodiments and combinations are also possible.

2. Turret Targeting

The turret controller 660 preferably also assists turret targeting. For example, a human operator controlling a turret at the scene of a fire may not be able to identify the location of the "hot spot" (i.e. the center of a fire). The operator may have obscured vision from smoke, debris, buildings, etc, thereby reducing the effectiveness of the turret and the fire fighting agent. The turret controller 660 provides capabilities to identify the location of a hot spot or other desired location in a fire, and target the turret 610 on that spot when the turret operator may not be able to do so. Also, the operator may not be able to view the orientation of the nozzle, nor the direction nozzle is pointing towards due to smoke, debris, buildings, or other such obstacles. The turret controller 660 identifies the desired location in a fire, and targets the turret 610 on that spot when the operator of the turret 610 may not be able to do so.

The turret control system 612 includes the fire position indicator 635, as shown in FIG. 16. The fire position indicator 635 provides information indicative of a spatial location or position of a selected region of a fire or other region of interest. In an exemplary embodiment, the fire position indicator 635 is indicative of the spatial position of a selected region of a fire provided in coordinates (i.e. height, width, and depth coordinates such as X, Y, and Z Cartesian coordinates, or other such position indication systems) using a vehicle frame of reference. Alternatively, the fire position indicator 635 may be provided in two dimensional coordinates such as X, Y coordinates. Other non-Cartesian coordinate systems or other position indicators using other frames of reference may alternatively be used.

Various devices may be used to implemented the fire position indicator 635. In an exemplary embodiment, the fire position indicator 635 indicates the hottest region within a fire (typically the center or hot spot) and is implemented using a heat detection device. Alternatively, the fire position indicator 635 may use a laser detection device for laser-guided tracking. According to this latter approach, an area of interest may be identified (e.g., by directing the laser at a portion of a building immediately adjacent the region of interest), and the nozzle 631 can be targeted on, and can track, the area of interest of a fire. The heat detection and laser tracking approaches are now described in greater detail, although it will be appreciated that these approaches are merely exemplary embodiments of the fire position indicator 635 in the system of FIG. 16.

Figure 20:
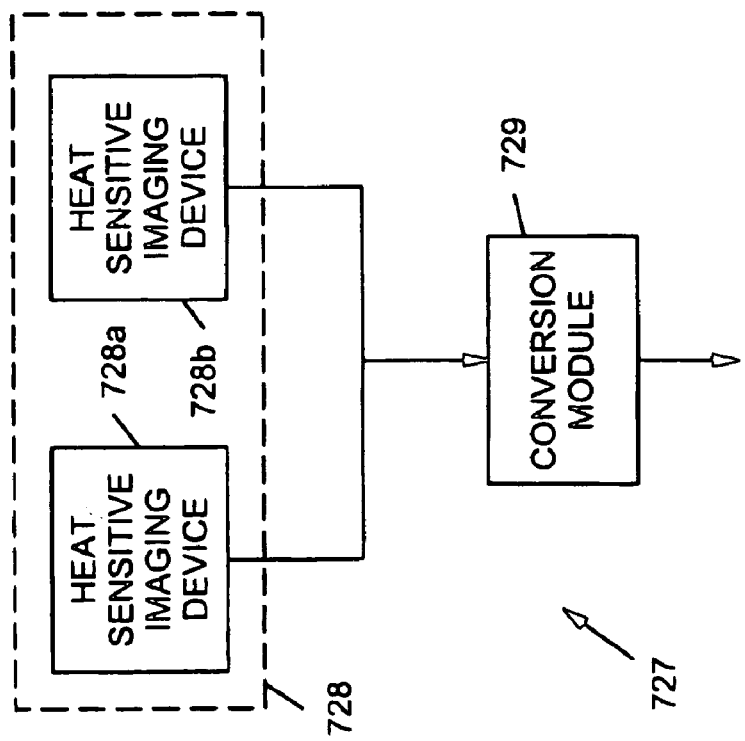
FIG. 20 is a block diagram of a first embodiment of a fire position indicator in the block diagram of FIG. 16.

Referring first to FIG. 20, in one embodiment, the fire position indicator 635 is implemented using a heat detection system 727. The heat detection system 727 includes one or more heat sensitive cameras 728. In an exemplary embodiment, the camera 728 is an infrared camera or other infrared imaging device which produces two dimensional (2-D) image data, although other heat sensitive devices may also be used. The image is comprised of individual pixels, each pixel having a pixel intensity or color that is a function of temperature or temperature differential for a corresponding location in the 2-D field of view. Infrared heat camera(s) advantageously offer the ability to penetrate smoke to locate the fire source. For example, the location of the fire may not be visible with the naked eye due to the amount of smoke, debris, buildings, or other things which may obscure a visual sighting of the fire location. The infrared camera 728 is used to allow the turret controller 660 to "see" a hot spot or other area of interest.

The heat sensitive camera 728 may be placed in a variety of locations on the fire fighting vehicle 620. In an exemplary embodiment, the heat sensitive camera 728 is mounted to the fire fighting vehicle 620. In other exemplary embodiments, the heat sensitive camera 728 may be provided proximate the nozzle 631 of the turret 610, or on the roof of the fire fighting vehicle 620.

In a preferred embodiment, two heat sensitive cameras, 728a and 728b, are used. The heat sensitive camera 728a is used to provide a wide field of view for the targeting system, i.e., to identify the general location of the fire or trouble spot. The camera 728a has a wide field of view and is used to determine the general area where turret should be pointed ("gross positioning"). Preferably, the camera 728a is mounted on the vehicle chassis in a manner such that the coordinate system of the camera 728a is aligned with the vehicle coordinate system described above in connection with the envelope control module 662 and shown in FIG. 13. Specifically, in the vehicle coordinate system shown in FIG. 13, the X-axis is aligned along the width of the vehicle 620, the Y-axis is aligned along the height of the vehicle 620, and the Z-axis is aligned along the length of the vehicle 620. The camera 728a preferably has an imaging plane which is parallel with the plane defined by the X axis and the Y-axis of the vehicle coordinate system. For example, the origin of the vehicle coordinate system is defined to be the same location on the vehicle 620 where the camera 728a is mounted. For gross positioning, this allows the image data from the camera 728a to be processed to obtain a quick assessment of the location of the hot spot. For example, if the hot spot appears in the middle of the image data, then the nozzle 631 should be pointing straight ahead. Conversely, if the hot spot appears on the left side or right side of the image data, then the nozzle 631 should be pointed to the left or right, respectively.

The heat sensitive camera 728b is used to fine tune the position or location indication of the hot spot of the fire ("fine positioning"). Preferably, the camera 728b is mounted on or near the nozzle 631 of the turret 610, and is mounted so as to be aligned with the flow direction of the fire fighting agent from the nozzle 631. Specifically, the fire fighting agent flowing from the nozzle 631 preferably travels along an axis (Z-axis) which is perpendicular to the 2-D (X-Y) imaging plane of the camera 728b. (The camera 728b is assumed to have an XYZ coordinate system which is, in general, not aligned with the XYZ coordinate system of the vehicle 620, although the two may be considered aligned when the turret nozzle 631 is level and pointing straight forward.) Given that the distance between the center of the 2-D image plane of the camera 728b and the center of the stream of fire fighting agent is small relative to the distance between the camera 728b and the fire, it may be assumed that the center of the 2-D image plane of the camera 728b and the center of the stream of fire fighting agent are located at the same point. Therefore, when the hot spot appears on the left side of the image data, the turret needs to be moved to the left to be aimed at the hot spot. With this configuration, it is known that the turret is pointed at the hot spot of the fire so long as the hot spot appears in the center of the image data. It may be noted that conventional turrets dispense fire extinguishing agent at a sufficiently high velocity such that it may be assumed that fire extinguishing agent dispensed from a horizontally oriented turret will not travel appreciably downwardly before reaching the target. Therefore, fire extinguishing agent reaches the hot spot if the turret 610 is pointed at the hot spot. As detailed below, a control algorithm may then be executed which maintains the hot spot located at the center of the image data for the camera 728b.

In an alternative embodiment, in addition to the camera 728b, one or more additional cameras may be mounted around the perimeter of the nozzle 631. The use of multiple cameras on the nozzle 631 allows portions of image data from the multiple cameras to be processed as a single image, so that the any obstructions caused by the presence of the nozzle 631 and the stream of fire fighting agent may be avoided.

Once the heat detection system 727 has identified the location of the area of interest in the fire in the image data, the heat detection system 727 uses a conversion module 729 to convert the location of the area of interest in the image data into position information for use by the turret controller 660 in controlling the turret 610, as will be described in greater detail below. For each of the cameras 728a and 728b, the conversion module 729 provides the turret controller with X,Y values indicative of the distance (magnitude and polarity) of the hot spot from the center of the image data produced by the respective camera 728a, 728b (with the X,Y values being provided in the respective coordinate systems of the cameras 728a and 728b). The conversion module 729 may also be integrated into the turret controller 660, such that the cameras 728a and 728b provide the turret controller 660 with raw image data an the turret controller 660 determines the above-mentioned distances. The operation of the turret targeting module 664 is discussed in greater detail below.

Use of the heat detection system 727 permits a hot spot of the fire to be continuously tracked and allows the aiming of the turret 610 to be adjusted in accordance with movement of the hot spot. This increases the efficiency of the fire fighting agent by placing the fire fighting agent on the area that may need it the most (i.e. the active hot spot of the fire) rather than being placed on a cold or less active region of the fire.

Figure 21:
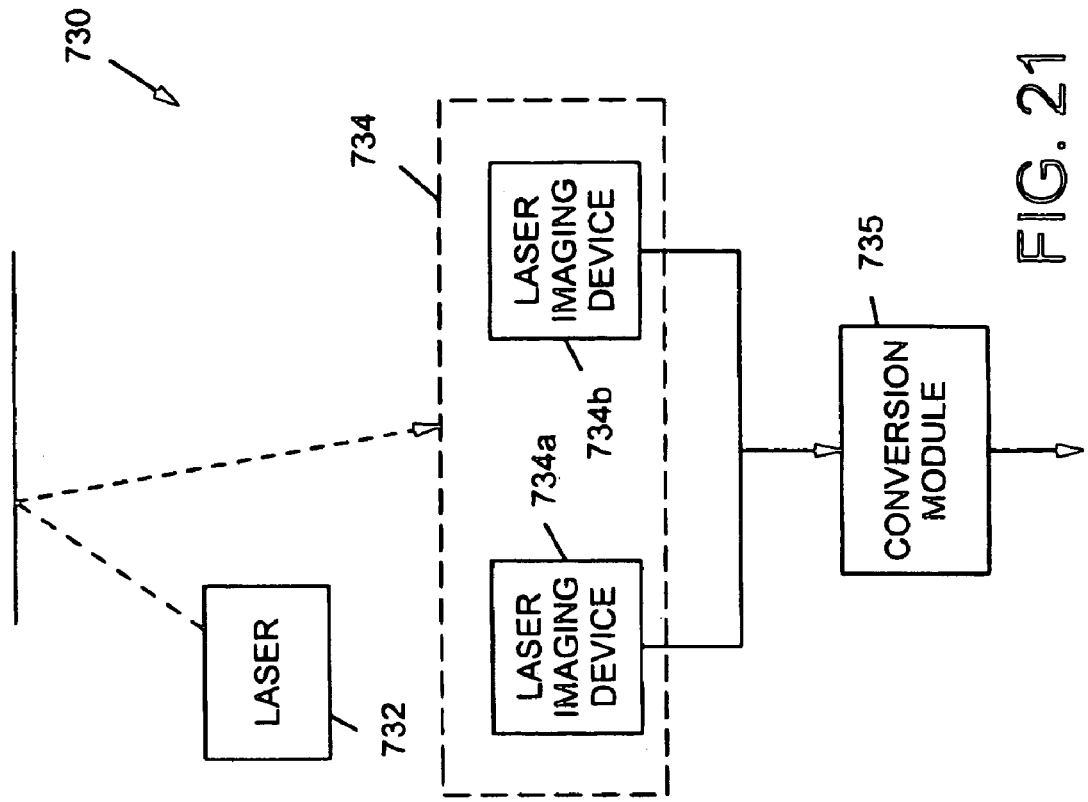
FIG. 21 is a block diagram of a second embodiment of a fire position indicator in the block diagram of FIG. 16.

Referring now to FIG. 21, in another embodiment, the fire position indicator 635 is implemented using a laser tracking system 730. In an exemplary embodiment, the laser system 730 includes a laser designator 732 and a laser detector 734 as shown in FIG. 21.

The laser tracking system 730 is similar in concept to those used in guidance systems such as missile guidance systems. The laser designator 732 is a handheld pointing device capable of being held by an operator and pointed at region of interest, e.g., at or near a desired target area of a fire. The laser designator 732 provides an area or spot of laser light on or near the target. The target reflects and scatters the laser light spot. The laser detector 734 is preferably a camera which is sensitive to particular wavelengths of light (i.e. the wavelengths associated with the laser designator 732), and excluding other wavelengths. The laser detector 734 is capable of receiving the laser light designating the region of interest after the laser light is reflected from the region of interest. When the laser detector 734 detects the laser light, the laser light spot appears at a particular location in the image data acquired by the laser detector 734, with the location of the laser light spot in the image data being a function of the position of the reflected laser light spot relative to the laser detector 734.

In a preferred embodiment, two laser detectors, 734a and 734b, are used. The preferred configuration is generally the same as that described in connection with the cameras 728a and 728b. Thus, the laser detector 734a is used for gross positioning and is mounted to the fire fighting vehicle so as to be aligned with the vehicle coordinate system shown in FIG. 13. The laser detector 734b is mounted to the nozzle 631 and has an imaging plane which is perpendicular to the stream of fire fighting agent dispensed by the nozzle 631. Alternatively, multiple laser detectors may be mounted to the nozzle 631, similar to the arrangement described above. Once the laser detection system 730 has identified the location of the area of interest in the fire in the image data, the laser detection system 730 uses a conversion module 735 to convert the location of the area of interest in the image data into position information for use by the turret controller 660 in controlling the turret 610, as will be described in greater detail below. For each of the detectors 730a and 730b, the conversion module 735 provides the turret controller with X,Y values indicative of the distance (magnitude and polarity) of the laser spot from the center of the image data produced by the respective camera 730a, 730b. The conversion module 735 may also be integrated into the turret controller 660.

Referring back to FIG. 16, the operation of the turret targeting module 664 will now be described. In the turret targeting mode of operation, the turret targeting module 664 and the envelope control module 662 in FIG. 16 are active, and the remaining modules 665, 668, 670, 672, and 674 are inactive. The targeting module 664 module receives the position information from the fire position indicator 635 and, based on the position information, determines whether the nozzle 631 should be moved up, down, to the left, to the right, or some combination thereof. The turret targeting module 635 then generates signals that simulate input signals from the joysticks 619, and these signals are provided to the envelope control module 662. The envelope control module 662 operates in the manner previously described, except that inputs are received from the turret targeting module 664 rather than from one of the operator interfaces 616. Thus, assuming the turret 610 is within the permissible travel envelope, the envelope control module 662 relays these signals to the actuators 632; otherwise, the envelope control module 662 intervenes to cause the turret 610 from leaving the permissible travel envelope.

Figure 22:
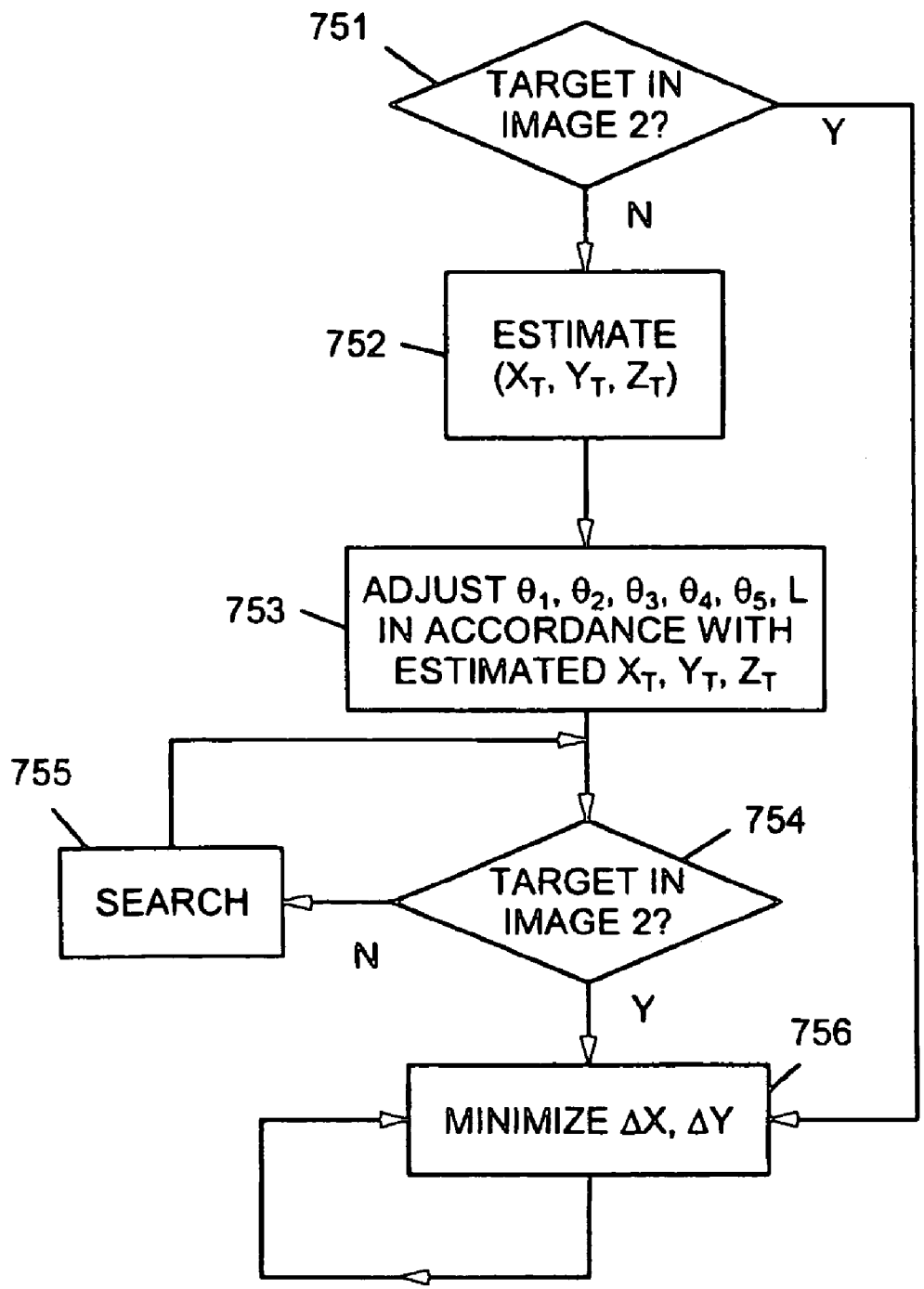
FIG. 22 is a flowchart showing operation of a turret targeting module in the block diagram of FIG. 16.

Referring now to FIG. 22, a flowchart describing the operation of the turret targeting module 664 is illustrated. For simplicity, it is assumed in the following discussion that θ1 is fixed (the base 624 is held stationary) and θ5 is allowed to vary (the third arm 630 is hingedly moveable). Of course, a non-stationary base 624 may also be used.

At step 751 it is determined whether the target is in the image generated by the turret mounted camera (either the camera 728b or 734b). If the target happens to be within the field of view of the turret mounted camera, then the process proceeds directly to step 756, described in greater detail below.

Assuming the target is not within the field of view of the turret mounted camera, then the process proceeds to step 752. At step 752, an estimate of the position $(X_T, Y_T, Z_T)$ of the target is developed based on the image data from the gross positioning camera 728a or 734a. The $(X_T, Y_T, Z_T)$ value is considered to be an estimate because the accuracy of the value is limited by the fact that the value is generated based on information from a single camera and therefore depth perception is limited. In an alternative embodiment, it may be desirable to use multiple cameras mounted on the vehicle body in order to allow a more accurate $(X_T, Y_T, Z_T)$ value to be obtained and/or to allow the turret mounted cameras to be eliminated. It is assumed that the fire fighting vehicle 620 is pointed generally in the direction of the target, and that the field of view of the camera 728a or 734a is sufficiently large that the target will be within the field of view of the camera 728a or 734a. However, if the target is not within the field of view of the camera 728a or 734a, then an error is issued and it is necessary to reposition the fire fighting vehicle 620 if it is desired to use the turret targeting module 664. In an alternative embodiment, the camera 728a or 734a is mounted for rotation and/or other movement to improve the target-locating ability of the camera 728a or 734a.

Assuming the target is within the field of view of the gross positioning camera 728a or 734a, then, at step 753, the turret 610 is brought to a position $(θ_1, θ_2, θ_3, θ_4, θ_5,$ and L$)$ at which it is expected that the turret 610 will be aimed at the target. At this point, the target should be within the field of view of the fine positioning camera 728b or 734b. At step 754, it is determined whether the target is in fact within the field of view of the fine positioning camera 728b or 734b. For example, for the heat detection system 727, it may be ascertained whether the fine positioning camera 728b is viewing a region of the same temperature as the hot spot identified by the camera 728a. For the laser tracking system 730, it may be ascertained whether the fine positioning camera 734b is viewing light within the range of wavelengths of the laser light emitted by the laser designator 732. If the target is not within the field of view of the fine positioning camera 728b or 734b, the turret controller 660 is programmed to enter a search mode (step 755) in which the turret controller 660 causes the turret 610 to move in a region surrounding the position ($\theta_1$, $\theta_2$, $\theta_3$, $\theta_4$, $\theta_5$, and L) at which it is expected that the turret 610 will be aimed at the target. The turret controller 660 then keeps moving the turret 610 until the target enters the field of view of the fine positioning camera 728b or 734b.

Once the target is within the field of view of the fine positioning camera 728b or 734b, the turret controller 660 attempts to center the target within the field of view of the fine positioning camera 728b or 734b. For example, if it is assumed that $\Delta X$ is the deviation of the target from the center of the field of view of the fine positioning camera 728b or 734b in the X dimension, and that $\Delta Y$ is the deviation of the target from the center of the field of view of the fine positioning camera 728b or 734b in the Y dimension (where the X dimension and the Y dimension are defined in terms of the coordinate system of the fine positioning camera 728b or 734b), then $\Delta X$ and $\Delta Y$ may be used as feedback values in two respective feedback control loops. For example, if $\theta_1$, $\theta_2$, $\theta_3$, and L are held constant, then a feedback control loop which varies $\theta_5$ (nozzle left/right) to minimize $\Delta X$ and another feedback control loop which varies $\theta_4$ (nozzle up/down) to minimize $\Delta Y$ may be employed. Thus, the position and orientation of the nozzle 631 is adjusted such that the nozzle 631 is aimed at the region of interest and, at the same time, fire extinguishing agent is dispensed toward the region of interest. Because this arrangement is implemented in the form of feedback control loops, the location of the region of interest may be continuously tracked and the position and orientation of the nozzle 631 may be continuously adjusted in response to movement of the region of interest (for example, due to cooling of a hot spot when fire extinguishing agent is dispensed on the hot spot). Therefore, the nozzle 631 may remain pointed at the region of interest during movement of the region of interest.

When the turret targeting module 664 is used, expanded fire fighting capabilities for the turret 610 are achieved. Using the fire position indicator 635 to view the fire, and determine the location of the area of interest of the fire, improves the aim and effectiveness of the turret 610 in many situations.

3. Turret Pan, Turret Deploy, and Turret Store

Referring again to FIG. 16, in addition to the envelope control module 662 and the turret targeting module 664, the turret motion controller 660 further includes a learn module 665 which is used in connection with a turret pan module 668, a turret deploy module 670, and a turret store module 672. The modules 665, 668, 670, 672 permit the turret controller 660 to store information such as position information and then control movement of the turret 610 in accordance with the stored information.

First, the learn module 665 and the turret pan module 668 will be described. At the scene of a fire, it is sometimes desirable to simply pan a turret back and forth across a general region. The turret pan module 668 causes the turret 610 to move in a predetermined pattern while the turret 610 dispenses a fire fighting agent toward the fire. In the pan mode of operation, the modules 665, 670, 672, and 664 as well as the fire position indicator 635 are not active in FIG. 16. The envelope control module 662 may be active as previously described.

In one embodiment, panning may be implemented by programming the pan module 668 to simulate inputs from the operator interface 616. For example, for a simple back and forth pattern, the operator may be permitted to bring the turret 610 to a region of interest, and then the turret pan module 668 may generate signals based on stored information that cause the actuator 632f to oscillate left and right. For a circular pattern, the actuator 632e may also be Used. To provide flexibility, operator inputs may be received that are used to control the amount of angular displacement and/or the amount of time the turret moves in one direction (and therefore the distance traveled) before reversing course. Alternatively, operator inputs may be simulated by storing operator inputs as the operator moves the turret 610 in a desired pattern, and then retrieving the stored operator inputs and using the stored operator inputs to generate additional control signals for the actuators 632 so as to cause the turret to repeat the pattern created in response to the original inputs. In these embodiment, in FIG. 16, the summation element 679 and the gain block 674 are not used (that is, the signals from the turret pan module 668 feed through directly to the envelope control module 662 as simulated joystick signals).

Figure 23:
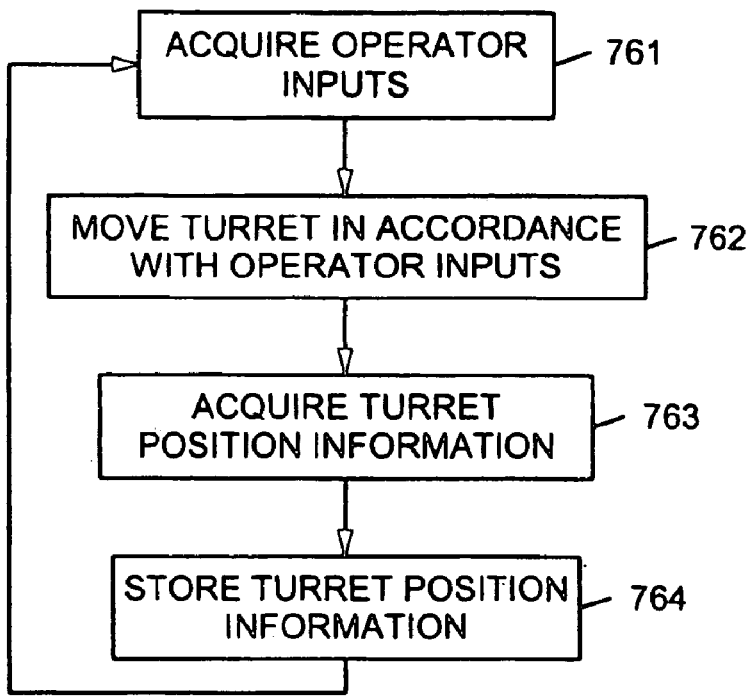
FIGS. 23-24 are flowcharts showing operation of turret learn and turret pan modules in the block diagram of FIG. 16.

In another embodiment, for maximum flexibility, the operator is allowed to program a pan pattern into the turret pan module 668, and feedback control is used to ensure that the turret 610 conforms to the programmed pattern. To this end, in an initial "learn" mode of operation, the turret controller 660 first learns the predetermined pattern by monitoring operator inputs used to control movement of the turret 610. Specifically, and referring now to FIG. 23, FIG. 23 is a flowchart showing the learning mode of the turret controller 660. At step 761, operator inputs are acquired by one of the operator interfaces 616. At step 762, the turret controller 660 moves the turret 610 in real time in accordance with the operator inputs. At step 763, the position of the turret 610 is measured using the position sensors 634. At step 764, the position information acquired during step 763 is stored in the turret pan module 668. The position information is stored as a series of waypoints formed of simultaneously measured θ1, θ2, θ3, θ4, θ5 and L1 values. Step 764 may occur in response to operator inputs or may occur at regular intervals. For example, if step 764 occurs in response to operator inputs, the operator may periodically press a "store" button to indicate to the turret controller 660 that the operator wants the turret 610 to periodically return to its current position. In this embodiment, the waypoints are stored in the form of θ1, θ2, θ3, θ4, θ5 and L1 values which are measured by the position sensors 634 at the time the operator input is received. The operator moves from position to position and presses the store button until a series of waypoints are defined. For back and forth movement, as few as two waypoints may be used. For a more complex motion profile, such as a figure eight motion profile, a series of waypoints may be used. Alternatively, in another embodiment, the turret controller 660 may automatically store the position information at periodic intervals as the turret 610 is controlled in response to operator inputs. The process of FIG. 23 is then repeated until an operator input is received indicating that the operator has completed defining the predetermined pattern. It may be noted that, as is the case elsewhere throughout this description, although steps 761-764 are shown as a series of steps to be performed, the steps 761-764 need not necessarily be performed at the same update rate and therefore need not necessarily be sequentially performed.

In one embodiment, the operator is provided with a user interface that allows the operator to program an oscillate range and that also provides visual feedback regarding the selected oscillate range. For example, the display 618 may display one or more bars that indicate a programmed range of oscillation. For example, if the nozzle 631 is to remain level but oscillate back and forth to the left and right, one bar may be used to indicate a range of oscillation to the right from center and another bar may be used to indicate a range of oscillation to the left from center. Alternatively a single bar centered about zero degrees may be used. Operator inputs (e.g., operator touches on a keypad) may be then received that cause the turret pan module 668 to vary the range of oscillation in accordance with the operator inputs, and also to update the status bars to reflect the newly programmed range of oscillation. If desired, this information may be stored in non-volatile memory and available upon system power up, and reset and default buttons may also be provided to allow the turret pan module 668 to revert to a default setting. Control of turret movement may then be effected, for example, through the use of simulated joystick inputs or position waypoints, as previously described.

Figure 24:
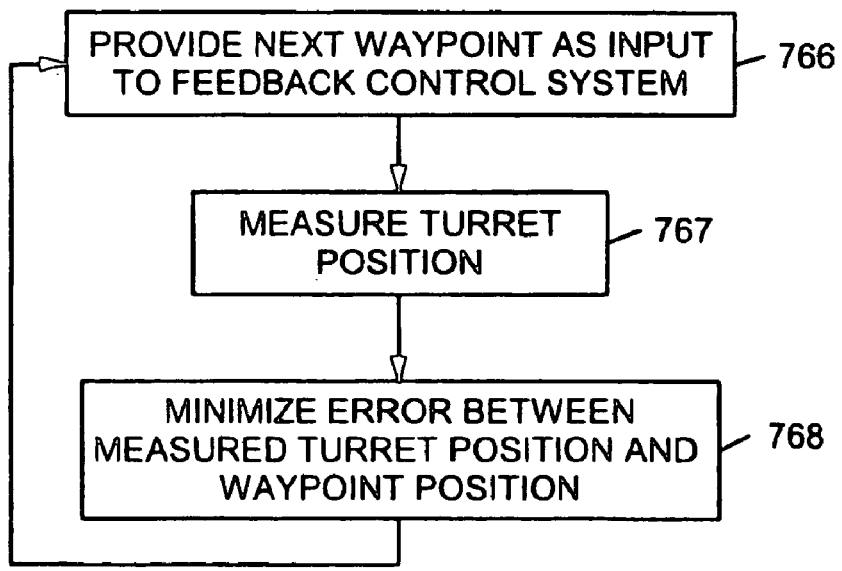
Figure 25:
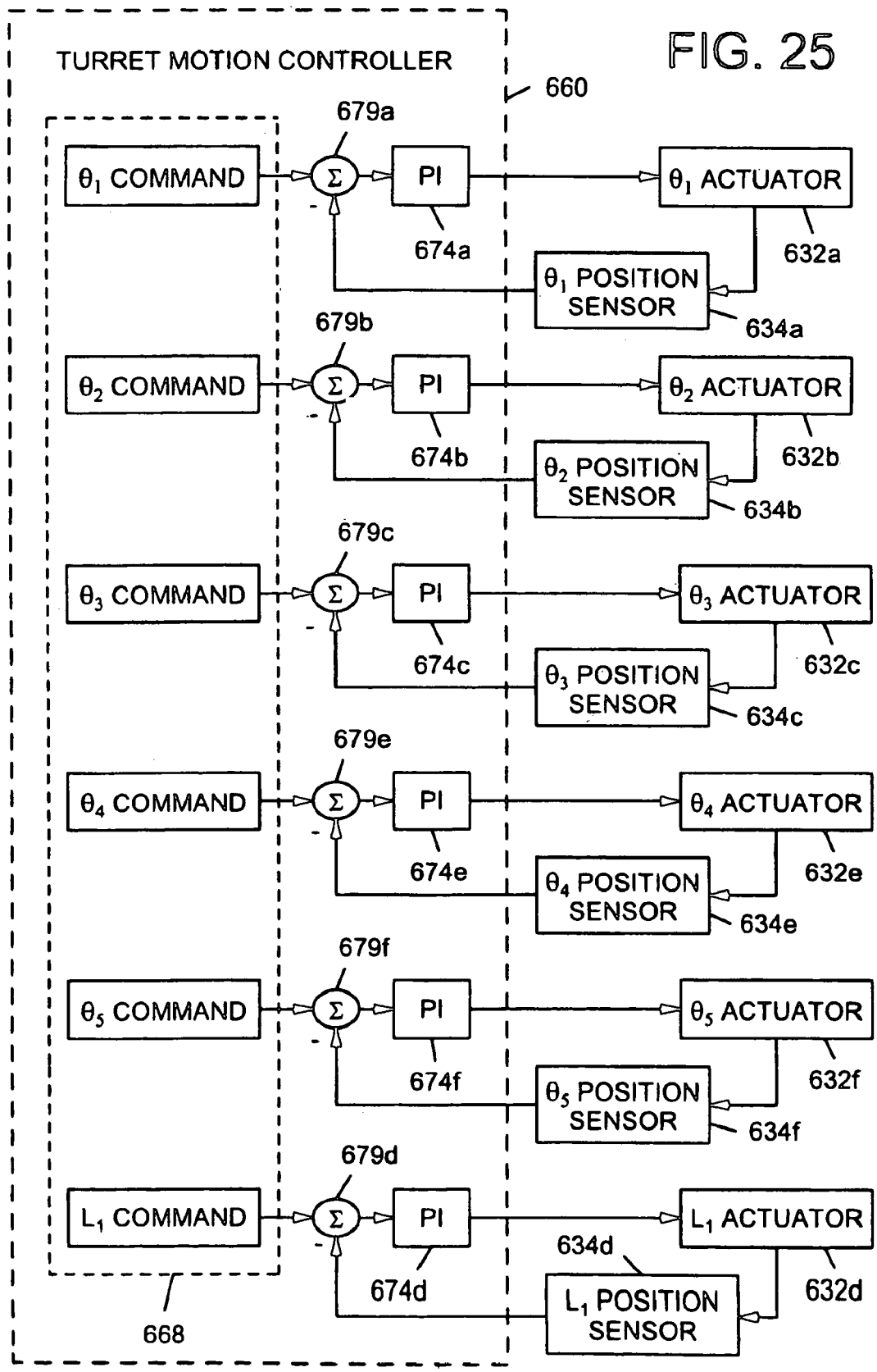
FIG. 25 is a block diagram showing a feedback control system of FIG. 16 in greater detail.

Referring now also to FIG. 24, in a second mode of operation, the turret controller 660 causes the turret 610 to repetitively move in accordance with the predetermined pattern programmed during steps 761-764. Thus, at step 766, one of the series of waypoints stored during step 764 is provided as input to a feedback control system. The θ1, θ2, θ3, θ4, θ5 and L1 values of the active waypoint are used as position command inputs in a position feedback control loop implemented in part by the turret motion controller 660. Referring to FIG. 25, FIG. 25 shows the feedback control system of FIG. 16 in greater detail. For simplicity, the modules 662, 664, 665, 670, and 672 are not shown in FIG. 25. The feedback control system comprises one feedback control loop for each axis of movement. The θ1, θ2, θ3, θ4, θ5 and L1 values as position command inputs to a series of summation elements 679a-679f (shown collectively in FIG. 16 as the summation element 679). Each of the position sensors 634a-634f measures the θ1, θ2, θ3, θ4, θ5 and L1 values (step 727). These measurements are provided to the summation elements 679a-679f, which compare the measured turret position with the position information received from the turret pan module 668. The output of each summation element 679a-679f is a position error signal and is provided to a respective gain block (e.g., a proportional-integral block) 674a-674f. The outputs of the Pi blocks 674a-674f are used as output signal for a respective one of the actuators 632a-632f. The feedback control loop controls the turret so as to reduce a difference between the measured position of the turret and the active waypoint. When the turret 610 is beginning to approach the active waypoint, a new waypoint is provided by the turret pan module 668 to the summation elements 679a-679f, such that the turret 610 is successively delivered to the series of waypoints. When the final waypoint is reached, the process repeats starting with the first waypoint.

The arrangement of FIGS. 23-25 allows the shape and time-profile of the panning pattern to be fully configurable and fully programmable, especially if the waypoints are stored at regular intervals rather than in response to operator inputs. Specifically, the operator is permitted to move the turret 610 so as to aim the turret at a particular location (e.g., hot spot) of the fire, linger at the particular location, and then move the turret to the next location (e.g., another hot spot). The turret controller 660 is then able to move the turret 610 to each of the hot spots, regardless whether they are aligned with each other, and cause the turret 610 to linger at each hot spot in the same manner and for the same amount of time as originally programmed by the operator.

The turret deploy module 670 is used to deploy the turret from a store position in which the turret 610 is stored for vehicle travel to a deploy position in which the turret 610 deploys a fire fighting agent. Typically, the turret 610 is stored in a locked position during travel of the fire fighting vehicle 620. Upon arrival to the scene of a fire, the turret deploy module 670 allows the turret 610 to be deployed to a predetermined position with minimum operator involvement.

The turret deploy module 670 operates in a manner which is generally similar to the turret pan module 668. The turret deploy module 670 may store a sequence of control signals to be provided to the actuators 632 or may store a series of position waypoints that are sequentially provided to multiple feedback control loops, as previously described. The turret deploy module 670 may be preconfigured before vehicle deployment and/or may be configured by an operator. For example, if the turret deploy module is preconfigured, one or more deploy positions may be preprogrammed in the turret deploy module 670. If the turret deploy module 670 is configured by the operator, one or more deploy positions or deploy movement patterns may be stored by the operator as described above in connection with the turret pan module 668. The turret deploy module 670 may also provide the operator with the ability to enter a desired position and orientation of the nozzle 631 relative to the vehicle 620. This allows the operator to define the desired deploy position as the vehicle 620 approaches the scene of a fire in situations where information regarding the scene of the fire is known prior to vehicle arrival at the scene of the fire.

Upon arriving at the scene of a fire, an operator input is received indicating that the operator wishes to turret deploy the turret 610. Turret deployment may begin immediately or, for fire fighting vehicles with outrigger assemblies, turret deployment may be programmed to begin automatically after outrigger deployment is complete. If the turret deploy module 670 stores simulated joystick commands, the turret 610 may be deployed by retrieving the stored information and using the information to generate control signals provided to the actuators 632 by way of the envelope control module (with the summation element 679 and the PI gain block 674 being inactive). If the turret deploy module stores θ1, θ2, θ3, θ4, θ5 and L1 values for the deploy position, these values may be provided to the feedback control loops shown in FIG. 25 to cause the turret controller 660 to move the turret 610 to the deploy position in closed loop fashion. A series of θ1, θ2, θ3, θ4, θ5 and L1 values (waypoints) may also be used if a particular deploy trajectory is desired.

The turret store module 672 is used to move the turret 610 from a deploy position in which the turret is positioned to dispense a fire fighting agent on a region of interest to a store position in which the turret is stored for vehicle travel. Turrets mounted on top of fire fighting vehicles are often stored between the emergency lights. Therefore, the emergency lights are particularly susceptible to damage during the process of storing the turret, given the proximity of the turret to the emergency lights. The turret store module 672 avoids such damage assisting storage of the turret 610. For example, in one embodiment, the turret store module 672 stores the θ1, θ2, θ3, θ4, θ5 and L1 values for the store position, these values are provided to the feedback control loops shown in FIG. 25 to cause the turret controller 660 to move the turret 610 to the store position in closed loop fashion. A series of θ1, θ2, θ3, θ4, θ5 and L1 values (waypoints) may also be used if a particular store trajectory is desired which avoids damaging other structure on the vehicle 620. Once the turret 610 reaches the store position, the turret store module 672 causes an actuator to engage which is coupled to a lock mechanism. This allows the turret 610 to be locked in place after the turret 610 reaches the store position with minimal operator involvement.

The turret controller 660 may also be used to implement other features. For example, the turret controller 660 may be used to implement an nozzle leveling feature in which the nozzle 631 is maintained in the horizontal position regardless of boom angle. This allows the nozzle 631 to remain aimed at a fire during boom movement.

4. Operator Interface

Figure 26:
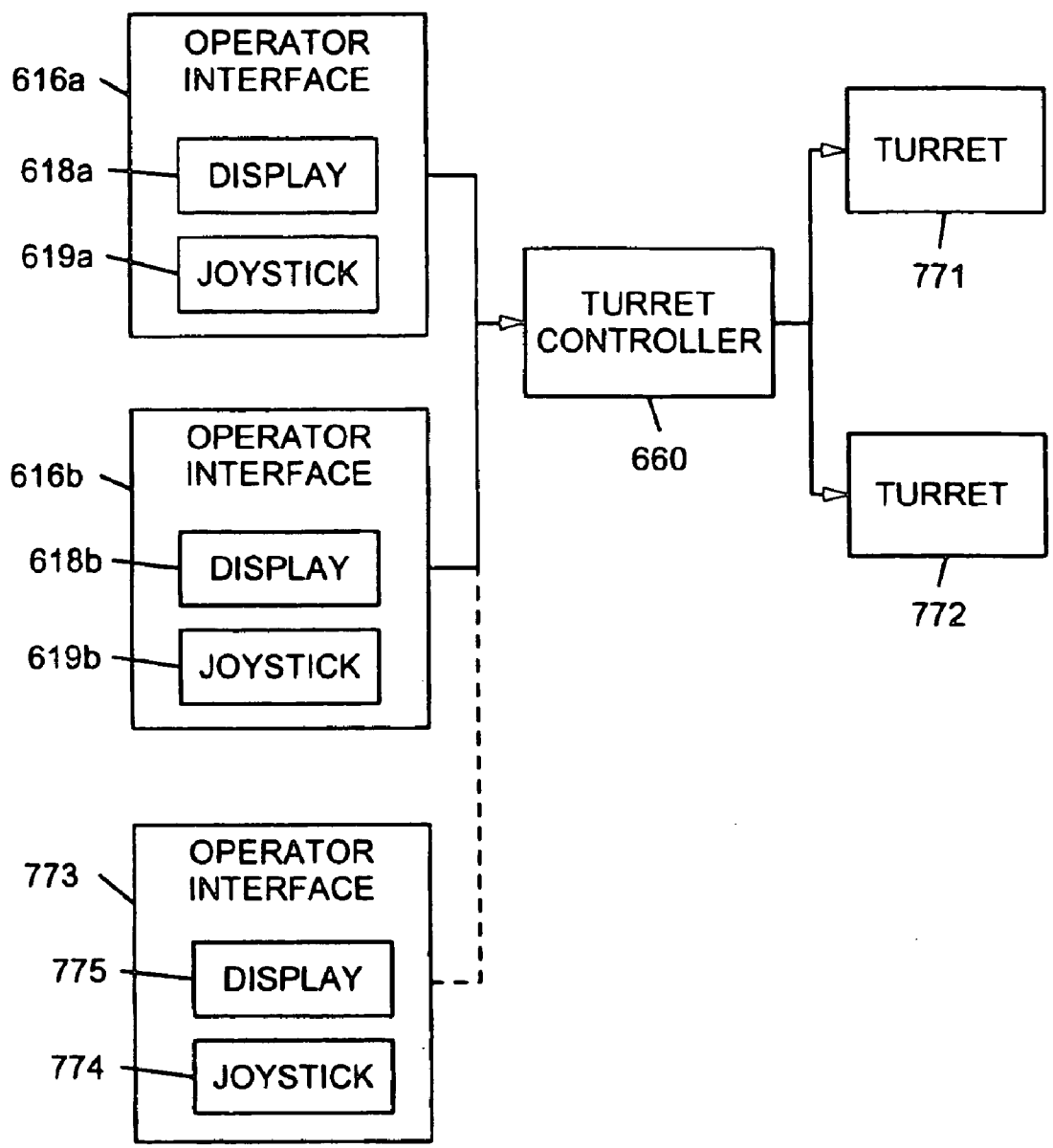
FIG. 26 is a block diagram of a turret control system that controls first and second turrets.

Referring now to FIG. 26, an embodiment of the control system 612 is shown wherein two turrets 731 and 732 are provided. Both turrets operate in the same manner as the turret 610, although at least one of the turrets 731, 732 may be constructed differently and may be mounted in a different location, such as a bumper turret mounted on a bumper of the fire fighting vehicle 620. Also shown are the operator interfaces 616 and the turret controller 660, which includes structure that duplicates the structure shown in FIG. 16 for the additional turret. (That is, duplicate turret controllers 660, operating in parallel and respectively coupled to the turrets 731, 732, are used. For simplicity, a single turret controller 660 is shown in FIG. 26.)

As previously noted, the operator interfaces 616 each include respective joysticks 619*a* and 619*b*. Typically, the joysticks 619*a*, 619*b* may be mounted at different locations on the vehicle (such as in the cab and at on operator panel elsewhere on the vehicle) and therefore one of the joysticks 619*a*, 619*b* may be at a location that has better visibility than the location of the other of the joysticks 619*a*, 619*b*. Each joystick 619*a*, 619*b* is coupled to respective interface modules 613*c* and 613*d*, and there is no inherent difference between the joysticks 619*a*, 619*b* other than vehicle location.

In order to take advantage of the multiple joysticks, the turret controller 660 is capable of reconfiguring itself (e.g., in response to operator inputs) to thereby provide the operator with the ability to use either of the joysticks 619 to control either of the turrets 771, 772. Thus, in a first mode of operation of the turret controller 660, the turret controller 660 controls the position and orientation of the nozzle of the turret 771 based on operator inputs acquired by the joystick 619*a*, and controls the position and orientation of the nozzle of the turret 772 based on operator inputs acquired by the joystick 619*b*. In a second mode of operation, an opposite arrangement may be used (wherein the turret controller 660 controls the position and orientation of the nozzle of the turret 771 based on operator inputs acquired by the joystick 619*b*, and controls the position and orientation of the nozzle of the turret 772 based on operator inputs acquired by the joystick 619*a*.) In a third mode of operation, the turret controller 660 controls the position and orientation of the nozzles of both the turrets 771 and 772 based on operator inputs acquired by a single one of the joysticks 619*a*, 619*b*. In other words, both turrets 771, 772 are synchronized to the same joystick 619*a* or 619*b*. This allows both turrets 771, 772 to be aimed at different areas but move in tandem in response to operator inputs from a single joystick 619*a* or 619*b*, for example, when panning the turrets back and forth near a region of the fire. Alternatively, the turret controller 660 may be configured to control a first one of the turrets 771, 772 directly in response to operator inputs and to control a second one of the turrets 771, 772 such that the second turret 771, 772 tracks movement of the first turret 771, 772 and dispenses fire fighting agent on the same location as the first turret 771, 772. The display 618*a*, 618*b* associated with each of the respective joysticks 619*a*, 619*b* is used to indicate to the operator the current configuration of the turret controller 660, that is, which joysticks 619*a*, 619*b* are useable to control which turrets 771, 772.

Also shown in FIG. 26 is an additional operator interface 773 which includes an additional joystick 774 and an additional display 775. The operator interface 773 is identical to the operator interfaces 616, and operates in the same manner as the operator interfaces 616, except that it is coupled to the control system 612 by way of a wireless (e.g., radio-frequency) communication link. According to one embodiment, the additional operator interface 773 is implemented using a personal digital assistant or other handheld computer and joystick operation is simulated using a touch screen interface of the handheld computer. This allows an operator to have significant mobility at the scene of a fire while controlling one or both of the turrets 771, 772. Alternatively, if the network features described above in connection with FIGS. 34-67 are employed of U.S. Prov. No. 60/360,479 and U.S. Ser. No. 10/326,907, then the wireless communication link of FIG. 26 may be a wireless connection that is implemented using the Internet. For example, with reference to FIG. 34 of U.S. Prov. No. 60/360,479 and U.S. Ser. No. 10/326,907, this would allow an operator viewing the display 148 at the dispatch station 116 or fire fighting facility to view the fire in progress and use the remote operator interface 773 to control one or both of the turrets 771, 772. For municipalities with multiple fire stations, this allows the municipality to have a fire fighter from any fire station assist in the fire fighting effort without necessarily having the fire fighter travel to the scene of the fire.

Referring again to FIG. 16, in another embodiment, in order to provide improved operator feedback, the displays 618 provide a rendering of the position and orientation of turret 610 relative to the remainder of the vehicle 620. As previously noted, in some cases, it is difficult for an operator to see the exact location and orientation of the turret 610, for example, because smoke obscures the operator's vision, or because the operator is located inside an operator compartment of the fire fighting vehicle and the position/orientation of the turret 610 is not visible inside the operator compartment. This problem is exacerbated if the control system 612 cannot accurately respond to operator commands because the water pressure is so great that the actuators 632 do not have the power to overcome the water pressure and move the turret 610.

To address this problem, the real-time position of the turret 610 acquired by the position sensors 634 is used by the turret controller 660 to calculate the position and orientation of the arms 626-630 as well as the nozzle 631. Based on this information, the turret controller 660 generates image data for one or both of the displays 618 which causes the display 618 to provide a rendering of the position and orientation of each arm 626, 628, 630 of the turret 610 relative to the fire fighting vehicle 620. Multiple display regions may be used to display the position and orientation of the nozzle 631 and the position and orientation of the arms 626-630. Alternatively, a single 3-D rendering may be displayed. Preferably, operator inputs may be received that allow the turret 610 and the vehicle 620 to be viewed from different angles. A sensor (e.g., dual camera or ultrasonic array) may be used to gather data useable to depict other objects such as buildings (in the case of municipal fire fighting vehicles) or airplanes (in the case of ARFF vehicles) on the display 618.

Figure 27:
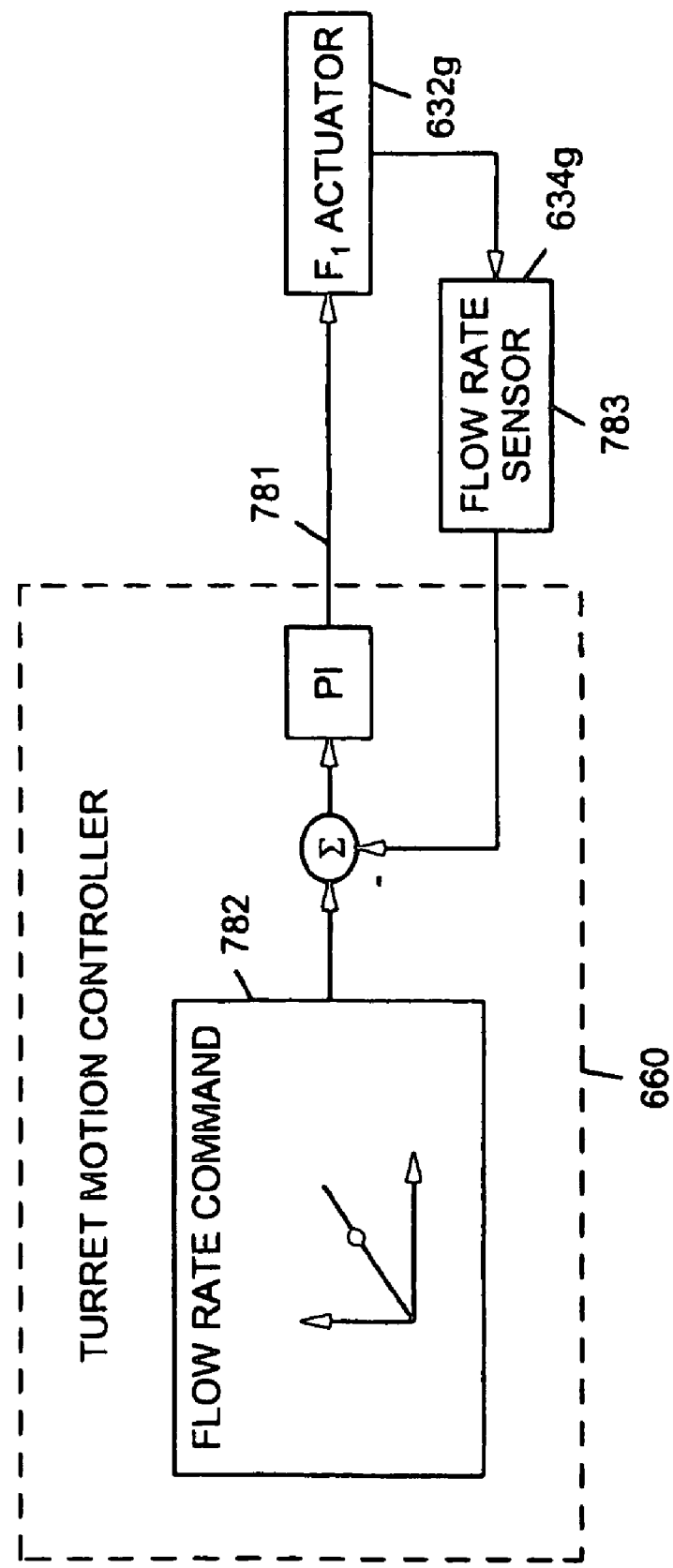
FIG. 27 is a block diagram of a flow rate control system for the turret of FIG. 14.

In another embodiment, shown in FIG. 27, the turret controller 660 includes a turret flow rate feedback control loop 781 as shown. The turret flow rate control loop 781 is used to maintain constant flow rate of fire extinguishing agent from the turret nozzle 631 by compensating for various vehicle parameters. A number of vehicle parameters may vary and, as a result, cause a variation in the flow rate of the fire extinguishing agent. For example, in a pump and roll situation, the fire truck is pumping water and moving at the same time (e.g., to move the fire truck closer to the fire). The varying engine RPM and diversion of power to the drive train causes variations in pressure which in turn cause significant variations in flow rate. The flow rate control loop 781 adjusts the flow rate to make the flow rate constant even when the engine RPM varies.

Block 782 stores information pertaining to an operator input pertaining to flow rate. As indicated by block 782, the desired flow rate is continuously adjustable to provide a wide range of available flow rates. A feedback sensor 783 obtains flow rate feedback. The feedback sensor 783 may be a flow rate sensor or a sensor that monitors a remaining amount of fire extinguishing agent, for example. Visual feedback (e.g., a displayed flow rate) may then be provided to the operator using one of the displays 618.

In another embodiment, the turret control system 612 is at least partially self-calibrating. When a mechanical component of the turret assembly is replaced (such as one of the arms 626-630, position sensors 634, or limit switches 636), the control system 612 recalibrates itself in the field with a minimal amount of equipment. For example, to calibrate a new position sensor 634, the turret controller 660 provides control signals to the corresponding actuator 632 to cause the actuator 632 to move the turret to both limits of motion for the axis in which the position sensor 634 was replaced. Thus, if the position sensor 634*f* is replaced, the turret controller 660 provides the actuator 632*f* with control signals that cause the actuator 632*f* to move the turret arm 630 full right and then full left. The new position sensor 634*f* is then calibrated by monitoring the output of the position sensor 634*f* at the limits of motion and storing this information.

In another embodiment, the operator interface 616 includes a voice recognition module comprising voice recognition software or embedded logic to allow user inputs to be provided by the user in the form of voice commands and received by a suitable microphone or other pickup device. The voice recognition logic then interprets the voice commands to produce suitable signals for controlling the turret 610. For example, rather than pushing up on the joystick 619, an operator may be provided with the ability to state the word "up," and the voice recognition logic then interprets the word "up" spoken by the operator and in response produces an output that mimics the output produced by the joystick 619 when the operator presses up on the joystick. The turret motion controller 660 then controls movement of the turret 619 in accordance with the voice commands provided by the operator. In general, such a voice recognition module may be used to replace or supplement any of the operator input devices described herein.

As previously indicated, the turret control system 612 of FIGS. 13-27 may be combined with the other features described in of U.S. Prov. No. 60/360,479 and U.S. Ser. No. 10/326,907. For example, in connection with parts ordering features, the limit switches 636 may be used to detect failure of one or more of the position sensors 634, and/or the position sensors 634 may be used to detect failure of one or more of the position switches 636. Upon detecting such failure, the control system 612 can proceed with ordering replacement parts.

C. Turret Positioning System

Figure 28:
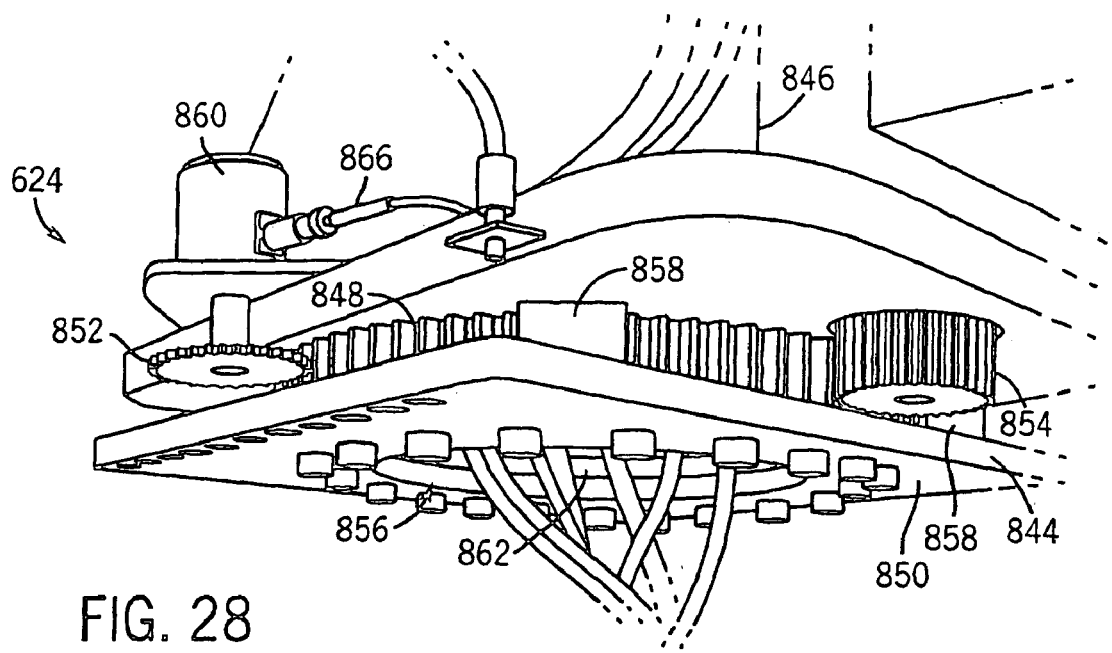
FIG. 28 is a bottom perspective view of a turret mounting assembly according to an exemplary embodiment.
Figure 29:
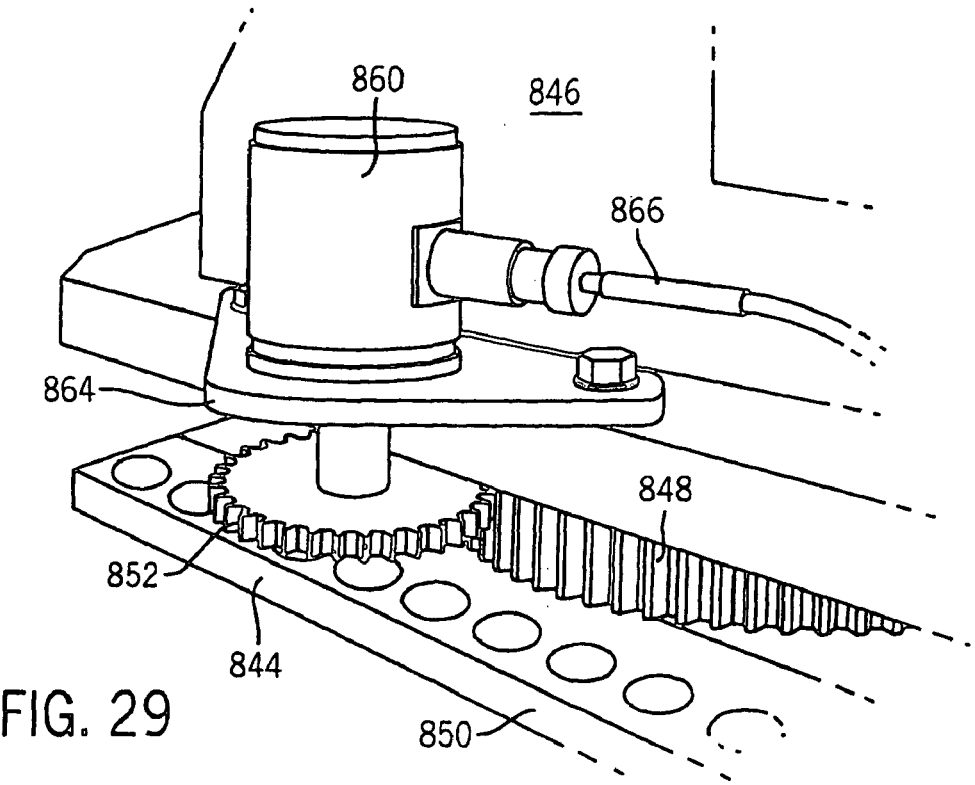
FIG. 29 is a top perspective view of the turret mounting assembly from FIG. 28 according to another exemplary embodiment.

Referring to FIGS. 14, 28, and 29, a system and method for positioning a turret 610 according to an exemplary embodiment is illustrated. A fire fighting vehicle 620 may be configured according to any previously described embodiments, unless specifically stated otherwise. Accordingly, fire fighting vehicle 620 may include any of a number of combinations and configurations of the control systems previously described. Also, the components (e.g., turret 610, nozzle 631, etc.) of fire fighting vehicle 620 may be configured according to any of the previously described embodiments, except as specifically noted. Thus, any one or combination of the previous embodiments may be employed in conjunction with fire fighting vehicle 620.

A turret positioning system as disclosed herein may be used on turrets for other equipment service vehicles such as vehicles with derricks, buckets for lifting a person, etc. For example, a military vehicle that has an attached pallet loading crane may be configured according to the present disclosure to control and determine the position of the crane. Accordingly, the teachings described herein should not be construed as only applying to fire fighting vehicles.

Referring to FIG. 28, an exemplary embodiment of a system for measuring the position of base 624 for turret 610 is shown. Base 624 includes stationary support 844 and rotatable apparatus 846. Base 624 is used to mount turret 610 to fire fighting vehicle 620 so that turret 610 may be rotated relative to fire fighting vehicle 620. In this embodiment, as shown in FIG. 28, support 844 is bolted to a corresponding portion of fire fighting vehicle 620 so that turret 610 rotates in a plane that is approximately horizontal. However, base 624 may be mounted to fire fighting vehicle 620 in any of number of ways such as by welding. Base 624 may also be formed as an integral part of fire fighting vehicle 620. In this situation, base 624 is generally the area where apparatus 846 is rotatably coupled to fire fighting vehicle 620. In an exemplary embodiment, base 624 is mounted to the frame or an extension of the frame of fire fighting vehicle 620. Mounting turret 610 to the frame of fire fighting vehicle 620 provides greater stability and strength to turret 610. This is especially useful if turret 610 includes a nozzle 631 that is used to pierce through the outer layer of a structure such as an airplane.

Support 844 and apparatus 846 are coupled together so that apparatus 846 can rotate relative to support 844. As shown in FIG. 28, apparatus 846 includes a sleeve 862 that is positioned on the inside of an aperture 856 located in support 844, thus coupling support 844 and apparatus 846 together. In order for apparatus 846 to be able to rotate, a bearing is provided at the interface of support 844 and sleeve 862. In another embodiment, support 844 may be provided with a sleeve that extends into a cavity of apparatus 846 in a similar manner. Other suitable configurations may also be used to allow apparatus 846 to rotate relative to support 844.

As shown in FIG. 28, support 844 includes a first or base gear 848, a bottom portion 850, aperture 856, and blocks 858. Base gear 848 is configured so that it does not move relative to support 844 and is fixedly mounted to bottom portion 850. Base gear 848 meshes with a second or sensor gear 852 and a third or drive gear 854, both of which rotate relative to base gear 848 and are mounted to apparatus 846. Aperture 856 may be used as a housing for power links, communication network lines, hydraulic lines, fire fighting agent lines, etc. that are used in turret 610. Blocks 858 are mounted (e.g., welded, bolted, etc.) to bottom portion 850 and act to limit the range of rotation of apparatus 846. In FIG. 28, blocks 858 are used to limit the range of rotation of apparatus 846 to approximately 30 degrees. Thus, apparatus 846 can rotate approximately 15 degrees to the right or to the left of a center position of turret 610. In another exemplary embodiment, blocks 858 are used to limit the range of rotation of apparatus 846 to approximately 60 degrees. In this embodiment, apparatus 846 can rotate approximately 30 degrees to the right or to the left of a center position of turret 610. In other exemplary embodiments, apparatus 846 may be configured to have a range of rotation not greater than approximately 90 degrees, and desirably between approximately 50 degrees and approximately 70 degrees. In further embodiments, apparatus 846 may be configured to rotate one or more full turns.

Apparatus 846 is generally the portion of turret 610 that rotates in relation to support 844 and/or fire fighting vehicle 620. As shown in FIGS. 28 and 29, apparatus 846 includes sensor gear 852, drive gear 854, and a position sensor 860. As previously described, sensor gear 852 and drive gear 854 mesh with base gear 848. Drive gear is coupled to a source of power for rotating apparatus 846. The source of power may be a hydraulic pump, electric motor, pneumatic drive, etc. Sensor gear 852 is coupled to position sensor 860, which measures the amount that sensor gear 852 and, by extension, apparatus 846 rotates.

In other embodiments, gears 848, 852, and 854 can be configured in a number of ways to facilitate rotation of apparatus 846. In the following embodiments, gears 848, 852, and 854 are referred to generically as gears because, depending on the configuration, the gears may be stationary or rotatable, coupled to the base or apparatus, etc. In one embodiment, gear 848 may be configured to rotate relative to bottom portion 850 of support 844. In this embodiment, gear 854 is stationary so that as gear 848 rotates, apparatus 846 also rotates. In another embodiment, gear 848 is fixedly mounted to apparatus 846 so that gear 848 does not rotate relative to apparatus 846. Gear 854 is coupled to support 844 and meshes with gear 848 so that as gear 854 rotates, apparatus 846 also rotates. Also, in any of these embodiments, sensor gear 852 may be configured to mesh with gear 854 or gear 848 or one or a number of gears that may be located between sensor gear 852 and gear 854 or gear 848. In general gear 852 can be configured in a number of ways so that as apparatus 846 rotates, sensor gear 852 also rotates, thus allowing position sensor 860 to measure the position of apparatus 846.

As shown in FIGS. 28 and 29, position sensor 860 is mounted to apparatus 846 using bracket 864. Position sensor 860 is also in communication with a communication network that is included as part of the above described control systems by way of communication link 866. In this manner, position sensor 860 can communicate the position of turret 610 to a control system that may be included with fire fighting vehicle 620 as described above. Position sensor 860 may also be configured to communicate the position of turret 610 to a stand alone display or control system that controls or displays the position and/or movement of turret 610. Of course, the number of uses for the position information provided by position sensor 860 is virtually unlimited.

Position sensor 860 may be any of a number of suitable rotary, linear, analog, digital, magnetic, etc. position sensors. In general, rotary position sensors, or position sensors that are particularly suited to measuring rotary movement are desirable to use as position sensor 860. In an exemplary embodiment, position sensor 860 is a rotary position sensor, model number IPS 6501 A502, available from Novotechnik of Southborough, Mass.

The present system for measuring the position of turret 610 may be used as described above. The present system may be particularly useful in conjunction with the operations described in section B(3), which describes turret pan, turret deploy, and turret store operations.

Throughout the specification, numerous advantages of preferred embodiments have been identified. It will be understood of course that it is possible to employ the teachings herein so as to without necessarily achieving the same advantages. Additionally, although many features have been described in the context of a vehicle control system comprising multiple modules connected by a network, it will be appreciated that such features could also be implemented in the context of other hardware configurations. Further, although various figures depict a series of steps which are performed sequentially, the steps shown in such figures generally need not be performed in any particular order. For example, in practice, modular programming techniques are used and therefore some of the steps may be performed essentially simultaneously. Additionally, some steps shown may be performed repetitively with particular ones of the steps being performed more frequently than others. Alternatively, it may be desirable in some situations to perform steps in a different order than shown., As previously noted, the construction and arrangement of the elements of the turret control system shown in the preferred and other exemplary embodiments are illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the scope of the present inventions as expressed in the appended claims.

What is claimed is:

1. A turret configured to be rotationally coupled to a vehicle which includes a first apparatus that is immovably coupled to the vehicle, the turret comprising:
a second apparatus coupled to the turret, the second apparatus being configured to be rotationally coupled to the first apparatus;
a turret controller which uses feedback control to control rotation of the turret relative to the vehicle; and
a position sensor coupled to the second apparatus, the position sensor being configured to provide information related to the position of the turret to the turret controller;
wherein the turret is configured to engage the first apparatus to rotate the turret relative to the vehicle.

2. The turret of claim 1 wherein the turret is rotationally coupled to the vehicle, wherein the vehicle is a fire fighting vehicle capable of dispensing a fire extinguishing agent from the turret.

3. The turret of claim 2 wherein the turret controller uses feedback control to control the movement of the turret from a first position to a predetermined position.

4. The turret of claim 3 wherein the first position corresponds to a deployed position where the turret is positioned to dispense the fire extinguishing agent on a region of interest and the second position corresponds to a stored position where the turret is stored for vehicle travel.

5. The turret of claim 4 comprising a locking mechanism that locks the turret in place after the turret reaches the stored position.

6. The turret of claim 3 wherein the first position corresponds to a stored position where the turret is stored for vehicle travel and the second position corresponds to a deployed position where the turret is positioned to dispense the fire extinguishing agent on a region of interest.

7. The turret of claim 1 wherein the turret controller is programmed to move the turret according to a predetermined pattern.

8. The turret according to claim 1 wherein the turret rotates in an approximately horizontal plane.

9. The turret according to claim 1 wherein the position sensor is a rotary potentiometer.

10. The turret according to claim 1 comprising a third apparatus rotationally coupled to the first apparatus, the third apparatus being configured to drive rotation of the turret relative to the vehicle.

11. The turret according to claim 10 wherein the third apparatus is driven hydraulically.

12. The turret according to claim 10 wherein the second apparatus meshes with the third apparatus.

13. The turret according to claim 1 wherein the second apparatus is configured to drive rotation of the turret.

14. The turret according to claim 1 wherein the turret is configured to dispense fire extinguishing agent.

15. The turret according to claim 1 wherein the turret is configured to rotate through a range of rotation that is not greater than approximately 90 degrees.

16. A vehicle comprising:
a first apparatus immovably coupled to the vehicle;
an apparatus rotationally coupled to the vehicle, the apparatus including a second apparatus which is rotationally coupled to the first apparatus and is configured to move with the apparatus as the apparatus rotates relative to the vehicle; and
a position sensor coupled to the second apparatus, the position sensor being used to determine the position of the apparatus based on the rotational motion of the second apparatus.

17. The vehicle according to claim 16 wherein the apparatus rotates in an approximately horizontal plane.

18. The vehicle according to claim 16 wherein the position sensor is a rotary potentiometer.

19. The vehicle according to claim 16 wherein the apparatus further comprises a third apparatus rotationally coupled to the first apparatus, the third apparatus being configured to drive rotation of the apparatus.

20. The vehicle according to claim 19 wherein the third apparatus is driven hydraulically.

21. The vehicle according to claim 16 wherein the apparatus is configured to dispense a fire extinguishing agent.

22. The vehicle according to claim 16 wherein the apparatus is configured to rotate through a range of rotation that is not greater than approximately 90 degrees.

23. The vehicle according to claim 16 wherein the first apparatus meshes with the second apparatus.

24. The vehicle according to claim 16 wherein at least a portion of the apparatus is extendable.

25. A vehicle comprising:
a turret rotationally coupled to the vehicle;
a first apparatus which is immovably coupled to the vehicle;
a second apparatus coupled to the turret, the second apparatus also being rotationally coupled to the first apparatus;
a drive apparatus which is separate from the second apparatus and is coupled to the turret, the drive apparatus being rotationally coupled to the first apparatus so that rotating the drive apparatus causes the turret to rotate relative to the vehicle; and
a position sensor coupled to the second apparatus, the position sensor being used to determine the position of the turret based on the rotational motion of the second apparatus.

26. The vehicle according to claim 25 wherein the turret rotates relative to the vehicle in an approximately horizontal plane.

27. The vehicle according to claim 25 wherein the position sensor is a rotary potentiometer.

28. The vehicle according to claim 25 wherein the drive apparatus is driven hydraulically.

29. The vehicle according to claim 25 wherein the turret is configured to dispense a fire extinguishing agent.

30. The vehicle according to claim 25 wherein the turret is configured to rotate through a range of rotation that is not greater than approximately 90 degrees.

31. The vehicle according to claim 25 wherein the vehicle is a fire fighting vehicle and the turret is used to dispense a fire extinguishing agent.

32. The vehicle according to claim 25 wherein at least a portion of the turret is extendable.

33. A vehicle comprising:
a turret rotationally coupled to the vehicle;
a first apparatus immovably coupled to the vehicle;
a second apparatus coupled to the turret so that the second apparatus moves with the turret as the turret rotates relative to the vehicle, the second apparatus also being rotationally coupled to the first apparatus; and
a position sensor coupled to the second apparatus, the position sensor being used to determine the position of the turret based on the rotational motion of the second apparatus.

34. The vehicle according to claim 33 wherein the position sensor is a rotary potentiometer.

35. The vehicle according to claim 33 comprising a drive apparatus rotationally coupled to the first apparatus, the drive apparatus being used to drive rotation of the turret relative to the vehicle.

36. The vehicle according to claim 33 wherein the turret is configured to rotate through a range of rotation that is no more than approximately 90 degrees.

37. The vehicle according to claim 33 wherein at least a portion of the turret is extendable.

38. The vehicle according to claim 33
wherein the turret comprises
an adjustable mount assembly, the adjustable mount assembly being rotationally coupled to the chassis and vehicle body combination, and the mount assembly including a fire-extinguishing agent delivery system capable of transporting the fire-extinguishing agent through the mount assembly; and a turret nozzle mounted to the adjustable mount assembly, the turret nozzle being capable of receiving the fire-extinguishing agent from the mount assembly; and wherein the fire fighting vehicle comprises a power distribution and control system, the power distribution and control system including a power source;

a power transmission link;

a plurality of output devices including a plurality of actuators capable of adjusting the mount assembly to adjust the position and orientation of the turret nozzle;

a plurality of input devices including a plurality of position sensors capable of providing position information pertaining to the position and orientation of the turret nozzle, the plurality of input devices further including an input device associated with an operator interface;

a communication network; and a plurality of microprocessor-based interface modules, the plurality of interface modules being coupled to the power source by way of the power transmission link, the plurality of interface modules being interconnected to each other by way of the communication network, the plurality of interface modules being coupled to the plurality of input devise and to the plurality of output devices by way of communication links, the plurality of interface modules including one or more interface modules that are coupled to the plurality of positions sensors, the plurality of actuators, and/or the input device associated with the operator interface;

wherein the plurality of interface modules, the plurality of input devices, and the plurality of output devices are distributed throughout the fire fighting vehicle;

wherein each respective interface module is locally disposed with respect to the respective input and output device to which the respective interface module is coupled so as to permit distributed data collection from the plurality of input devise and distributed power distribution to the plurality of output devices; and wherein each of the interface modules is configured to receive and store I/O status information pertaining to the input and/or output devices coupled to the remaining interface modules.

* * * * *